US012475523B2

(12) United States Patent
Vilim et al.

(10) Patent No.: US 12,475,523 B2
(45) Date of Patent: Nov. 18, 2025

(54) DATAFLOW ARCHITECTURE PROCESSOR STATICALLY RECONFIGURABLE TO PERFORM N-DIMENSIONAL AFFINE TRANSFORMATION

(71) Applicant: SambaNova Systems, Inc., Palo Alto, CA (US)

(72) Inventors: Matthew Vilim, Palo Alto, CA (US); Raghu Prabhakar, Palo Alto, CA (US); Matt Feldman, Palo Alto, CA (US); Yaqi Zhang, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 169 days.

(21) Appl. No.: 18/095,132

(22) Filed: Jan. 10, 2023

(65) Prior Publication Data

US 2024/0233068 A1    Jul. 11, 2024

(51) Int. Cl.
*G06T 3/02* (2024.01)
*G06F 15/78* (2006.01)
(Continued)

(52) U.S. Cl.
CPC .......... *G06T 3/02* (2024.01); *G06T 1/20* (2013.01); *G06T 1/60* (2013.01); *G06F 15/7871* (2013.01)

(58) Field of Classification Search
CPC ..... G06T 3/02; G06T 1/20; G06T 1/60; G06F 15/7871
See application file for complete search history.

(56) References Cited

U.S. PATENT DOCUMENTS 9,436,245 B2 * 9/2016 Bhandaru ............. G06F 1/3206
2018/0322607 A1 * 11/2018 Mellempudi ............. G06T 1/20
(Continued)

FOREIGN PATENT DOCUMENTS

WO    2010142987 A1    12/2010

OTHER PUBLICATIONS

Alias—Contributions to Program Optimization and High-Level Synthesis Christophe Alias—Dec. 8, 2021—HAL (Year: 2021).*
(Continued)

*Primary Examiner* — YuJang Tswei
(74) *Attorney, Agent, or Firm* — Flagship Patents; Sikander M. Khan; Bruce A. Young

(57) ABSTRACT

A statically reconfigurable dataflow architecture processor (SRDAP) performs an N-dimensional affine transform specified by a matrix on an input image to produce an output image includes pattern compute units (PCUs) and pattern memory units (PMUs) interconnected by switches. PCUs have vector pipelines of functional units that perform operations on operands received from previous pipeline stages, another PCU, and/or PMUs. PMUs have memories loadable with the input image. The PCUs and PMUs are statically reconfigurable to, for all the output pixels: apply the matrix to vectors of output pixel coordinates to calculate corresponding vectors of input pixel coordinates, flatten the vectors of input pixel coordinates into vectors of PMU addresses of the input pixels, read values of the input pixels from the PMUs at the calculated input pixel addresses, and write vectors of the input pixel values to PMUs to form the output image.

19 Claims, 26 Drawing Sheets

(51) Int. Cl.
G06T 1/20 (2006.01)
G06T 1/60 (2006.01)

(56) References Cited

U.S. PATENT DOCUMENTS

| | | |
|---|---|---|
| 2019/0266485 A1 | 8/2019 | Singh et al. |
| 2023/0222229 A1* | 7/2023 | Schwaderer .......... H04L 9/0668 726/26 |
| 2023/0305842 A1 | 9/2023 | Windh et al. |
| 2024/0232127 A1 | 7/2024 | Vilim et al. |
| 2024/0232128 A1 | 7/2024 | Vilim et al. |
| 2024/0233069 A1 | 7/2024 | Vilim et al. |

OTHER PUBLICATIONS

Naji—Reconfigurable Parallel Data Flow Architecture—Feb. 2010—IJCSIS (Year: 2010).*

Prabhakar et al—Plasticine A Reconfigurable Architecture For Parallel Patterns—2017—ACM (Year: 2017).*

Mohammadi—PMU-Based Adaptive Central Protection Unit (CPU) for Power Systems with High DG Penetration—2014—UTT (Year: 2014).*

Biswal, Parallel Architecture For Accelerating Affine Transform nl High-Speed Imaging Systems, Journal of Real-Time Image Processing, vol. 8, Mar. 2013, p. 69-79.

Bjorn De Sutter, Coarse-Grained Reconfigurable Aray Architectures, Handbook of Signal Processing Systems, 2019, p. 427-472.

Éricles Sousa, A reconfigurable memory architecture for system integration of coarse-grained reconfigurable arrays, Published in: 2017 International Conference on ReConFigurable Computing and FPGAs (ReConFig) Dec. 4-6, 2017 https://ieeexplore.ieee.org/document/8279768 (Year: 2017).

Koeplinger et al., Spatial: A Language and Compiler for Application Accelerators, PLDI '18, Jun. 18-22, 2018, Association for Computng Machinery, 16 pages.

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Yang, Memory-Aware Loop Paralleling For Coarse-Grained Reconfigurable Architectures, 2012 International Conference On V Computer Science and Service System, Aug. 2012, p. 2223-2226.

Yuge Chen, Reducing Memory Access Conflicts With Look Transformation and Data Reuse On Coarse-Grained Reconfigurable Architecture, 2021 Design, Automation & Test ni Europe Conference &Exhibition (Date), Feb. 2021, pp. 124-129.

* cited by examiner

For example, in Fig. 13 assume L = 64 (e.g., 16 lanes/PCU * 4 PCUs), img_out_width = 128 pixels, and img_out_height = 64 pixels

| CLK | | PCU lane 0 accumulator value | ... | PCU lane j accumulator value | ... | PCU lane 63 accumulator value |
|---|---|---|---|---|---|---|
| 0 | row 0 | m0*0 | | m0*j | | m0*63 |
| 1 | | m0*0+m1*0 i.e., x_in[0] of (0,0) | | m0*j+m1*0 i.e., x_in[j] of (j,0) | | m0*63+m1*0 i.e., x_in[63] of (63,0) |
| 2 | | m0*64 | | m0*(j+L) | | m0*127 |
| 3 | | m0*64+m1*0 i.e., x_in[0] of (64,0) | | m0*(j+L)+m1*0 i.e., x_in[j] of ((j+L),0) | | m0*127+m1*0 i.e., x_in[63] of (127,0) |
| 4 | row 1 | m0*0 | | m0*j | | m0*63 |
| 5 | | m0*0+m1*1 i.e., x_in[0] of (0,1) | | m0*j+m1*1 i.e., x_in[j] of (j,1) | | m0*63+m1*1 i.e., x_in[63] of (63,1) |
| 6 | | m0*64 | | m0*(j+L) | | m0*127 |
| 7 | | m0*64+m1*1 i.e., x_in[0] of (64,1) | | m0*(j+L)+m1*1 i.e., x_in[j] of ((j+L),1) | | m0*127+m1*1 i.e., x_in[63] of (127,1) |
| ... | | ... | | ... | | ... |
| 252 | row 63 | m0*0 | | m0*j | | m0*63 |
| 253 | | m0*0+m1*64 i.e., x_in[0] of (0,64) | | m0*j+m1*63 i.e., x_in[j] of (j,63) | | m0*63+m1*63 i.e., x_in[63] of (63,63) |
| 254 | | m0*64 | | m0*(j+L) | | m0*127 |
| 255 | | m0*64+m1*64 i.e., x_in[0] of (64,64) | | m0*(j+L)+m1*63 i.e., x_in[j] of ((j+L),63) | | m0*127+m1*63 i.e., x_in[63] of (127,63) |

DATAFLOW ARCHITECTURE PROCESSOR STATICALLY RECONFIGURABLE TO PERFORM N-DIMENSIONAL AFFINE TRANSFORMATION

RELATED APPLICATIONS

This application is related to U.S. Nonprovisional patent application Ser. No. 18/095,134 filed on Jan. 10, 2023, titled "DATAFLOW ARCHITECTURE PROCESSOR STATICALLY RECONFIGURABLE TO PERFORM N-DIMENSIONAL AFFINE TRANSFORMATION IN PARALLEL MANNER BY REPLICATING COPIES OF INPUT IMAGE ACROSS SCRATCHPAD MEMORY BANKS" which is hereby incorporated by reference for all purposes.

This application is related to U.S. Nonprovisional patent application Ser. No. 18/095,137 filed on Jan. 10, 2023, titled "DATAFLOW ARCHITECTURE PROCESSOR STATICALLY RECONFIGURABLE TO PERFORM N-DIMENSIONAL AFFINE TRANSFORMATION IN PARALLEL MANNER BY REPLICATING COPIES OF INPUT IMAGE ACROSS MULTIPLE SCRATCHPAD MEMORIES" which is hereby incorporated by reference for all purposes.

This application is related to U.S. Nonprovisional patent application Ser. No. 18/095,128 filed on Jan. 10, 2023, titled "DATAFLOW ARCHITECTURE PROCESSOR STATICALLY RECONFIGURABLE TO PERFORM N-DIMENSIONAL AFFINE TRANSFORMATION IN A TILED MANNER" which is hereby incorporated by reference for all purposes.

BACKGROUND

A 2-dimensional image may be rotated by performing a linear transformation on the image. The linear transformation may be performed by taking the (x, y) coordinates of each pixel of the image and applying (i.e., multiplying) a rotation matrix to the coordinates to produce the coordinates of each pixel of the rotated image. The following equation expresses a rotation for the coordinates of a single pixel:

$$\begin{bmatrix} \cos\theta & -\sin\theta \\ \sin\theta & \cos\theta \end{bmatrix} \begin{bmatrix} x \\ y \end{bmatrix} = \begin{bmatrix} x' \\ y' \end{bmatrix}$$

in which (x, y) represent the coordinates of the pixel in the original image, (x', y') represent the coordinates to which the pixel is rotated, and $\theta$ is the angle of rotation.

Rotation is but one possible form of linear transformation that may be applied to an image. Other examples of linear transformations include scaling, shearing, reflection, and homothety. Each of these linear transformations has a different transformation matrix. For example, the transformation matrix $$\begin{bmatrix} 1 & \tan\phi \\ 0 & 1 \end{bmatrix}$$

will shear the image parallel to the x-axis by an angle Ø relative to the y-axis. For another example, the transformation matrix $$\begin{bmatrix} W & 0 \\ 0 & H \end{bmatrix}$$

will scale the image in the x-direction by a factor of W and will scale the image in the y-direction by a factor of H.

Further, images may be translated. The following equation expresses the translation for the coordinates of a single pixel in the x-direction by X and in the y-direction by Y.

$$\begin{bmatrix} 1 & 0 & X \\ 0 & 1 & Y \end{bmatrix} \begin{bmatrix} x \\ y \\ 1 \end{bmatrix} = \begin{bmatrix} x' \\ y' \end{bmatrix}$$

The term affine transformation is used to encompass both linear transformations, translations, and combinations thereof. That is, a translation and one or more linear transformations may be fused, or combined, into a single affine transformation matrix and applied to an image to perform an affine transformation on the image concurrently.

Affine transformations may also be applied to higher dimensional images, such as 3-dimensional or higher images. For example, the following equation expresses a rotation for the coordinates of a single pixel:

$$\begin{bmatrix} \cos\theta & -\sin\theta & 0 \\ \sin\theta & \cos\theta & 0 \\ 0 & 0 & 1 \end{bmatrix} \begin{bmatrix} x \\ y \\ z \end{bmatrix} = \begin{bmatrix} x' \\ y' \\ z' \end{bmatrix}$$

in which (x, y, z) represent the coordinates of the pixel in the original 3-dimensional image, (x', y', z') represent the coordinates to which the pixel is rotated, and $\theta$ is the angle of rotation around the z-axis.

Affine transformations are performed in many applications. One example application is the training of neural networks. Generally, neural networks are trained by inputting a known sample, e.g., an image, to the neural network in response to which the neural network outputs an answer, e.g., a classification of the image, e.g., cat, dog, the digit '9'. Parameters, e.g., node weights, of the neural network are then tweaked slightly (e.g., using backpropagation) based on the correctness or incorrectness of the answer. The sample is provided repeatedly to the neural network until it outputs the correct answer. This cycle is performed for a library of samples, which may include regressing with images for which the neural network was previously trained to ensure the neural network still generates the correct answer for the previous images.

Typically, a large library of many samples is needed to effectively train the neural network. Various well-known neural networks have been trained with libraries on the order of a million samples. However, the collection of samples may be costly, both in terms of time and expense. One method used to increase the size of the library of samples available to train a neural network is to apply affine transformations on a smaller library of images. For example, assume tens of thousands of images are available to train a neural network that performs image recognition, e.g., approximately one thousand images each for the ten digits zero through nine. By performing a single slight affine transformation (e.g., rotate and/or translate and/or enlarge or shrink), the number of samples may be doubled. By performing a thousand different slight affine transformations (e.g., different rotation angles, translation and/or enlarge/shrink amounts), the number of samples may be increased into the tens of millions. Increasing the number of samples in the training library through affine transformations may be very helpful in increasing the prediction accuracy of the neural network.

Given the large number of affine transformations needed to be performed, the time required to perform each affine transformation on an image may be very important. Indeed, the time may be a determining factor in the feasibility and/or effectiveness of training a neural network for a given application or any other application that requires the performing of a large number of image affine transformations.

BRIEF DESCRIPTION OF THE DRAWINGS

FIG. 14 is an example timing diagram illustrating the operation of the calc_coord_x_in block of FIG. 13.

DETAILED DESCRIPTION

Figure 1:
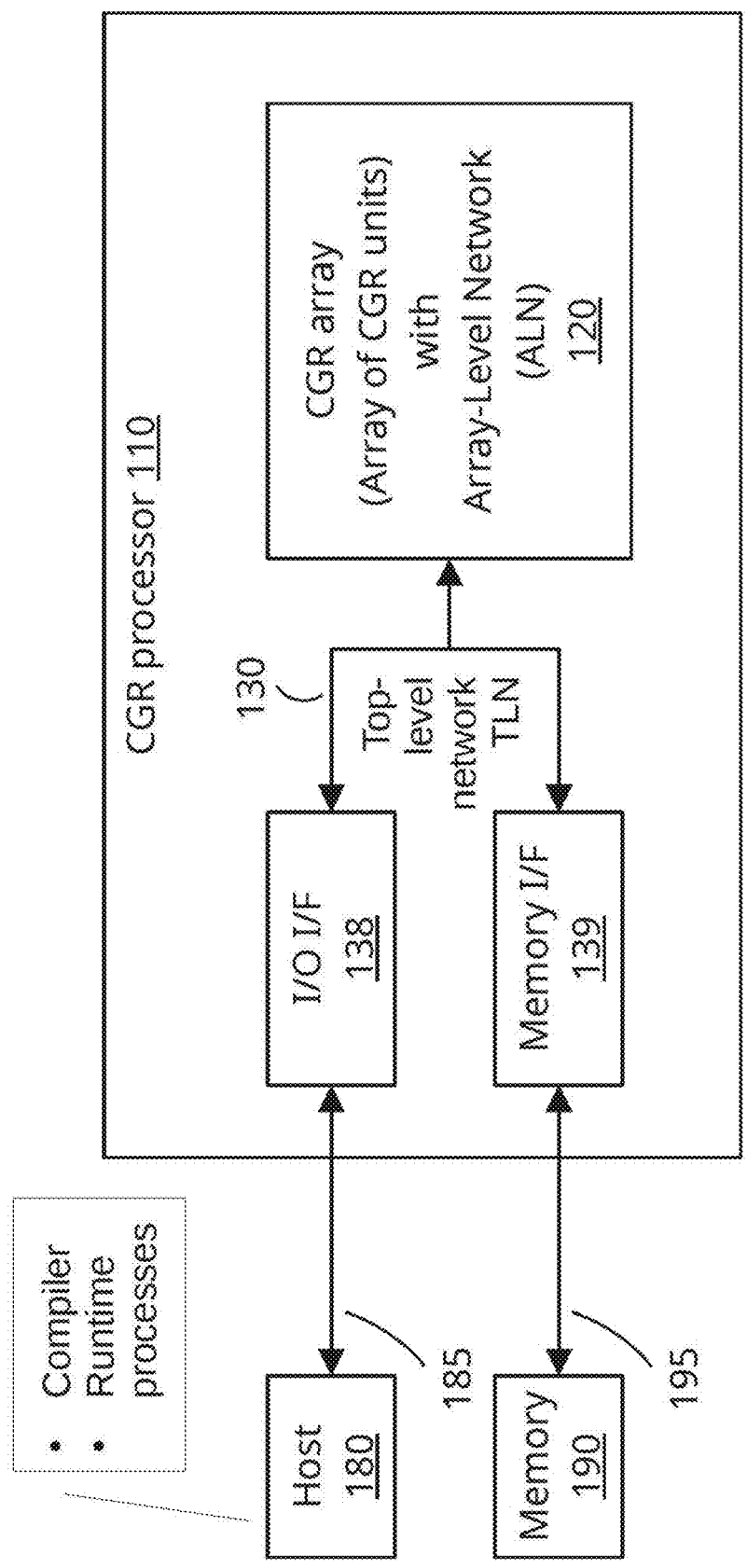
FIG. 1 illustrates an example system including an integrated circuit (IC), a host, and a memory.

Traditionally, the computations needed to accomplish affine transformations of images have been performed by central processing units (CPUs) and more recently by graphics processing units (GPUs). In this context, a program is typically written in a high-level programming language, such as the C or C++ languages, and compiled into machine language code of the CPU/GPU instruction set, e.g., the x86 ISA, and the machine language code is executed by the CPU/GPU. The ISA may include vector implementations, such as the AVX-512 or similar instruction set extensions. The machine language code is a sequence of instructions that the CPU/GPU fetches from a memory, e.g., from a level-1 instruction cache, which may consume gigabytes per second of bandwidth of the instruction cache. The instructions are fetched in time based on the value of a program counter (PC). The CPU/GPU executes the fetched instructions in time, incrementing the PC by the size of the currently fetched instruction to point to the next sequential instruction. Execution of control flow instructions, e.g., branch instructions, may cause the PC to be updated to a non-sequential memory address, e.g., to a target address of a taken conditional branch instruction, to a target of a subroutine call instruction, or to a return address that is the target of a return instruction. The CPU/GPU decodes the instruction stream to dynamically reconfigure the datapath of the CPU/GPU—e.g., the datapath to and from the general-purpose register (GPR) file and the datapath of the execution units—based on the information in each instruction, such as the opcode, source operand addresses, and destination operand address portions of the instruction. The machine language code may be compiled to execute on multiple cores in parallel, in which case communication between the multiple cores occurs through a memory/cache hierarchy, which requires a layer of indirection.

As may be observed from the above description, a CPU/GPU is dynamically reconfigured in time by the instruction stream as the CPU/GPU executes the instructions of the program. For example, the GPR file provides source operands to instructions and receives execution results of the instructions, also referred to as destination operands. The GPR file includes multiplexers, or muxes, that are controlled by the source operand address fields of the instruction. That is, the GPR file provides to the execution unit the source operands held in the GPRs specified by the source operand addresses of the instruction in order to perform the operation specified by the opcode of the instruction, e.g., multiply the source operands to generate a product, add the source operands to generate a sum, load/store data from/to a memory address calculated by the execution unit based on the source operands. The GPR file also includes demultiplexers, or demuxes, that are controlled by the destination operand address field of the instruction. That is, the GPR file writes the result of the operation performed by the execution unit to the GPR specified by the destination register address of the instruction, e.g., writes the product, sum, or data loaded from the calculated memory address. In this sense, the muxes and demuxes are dynamically reconfigured in time by execution of the instruction stream since the source operand fields of each instruction change the configuration of the muxes to provide source operands from different GPRs over time, and the destination operand field of each instruction changes the configuration of the demuxes to write results to different GPRs over time. Furthermore, the execution units themselves are dynamically reconfigured in time by the opcodes of the instruction stream. For example, an integer execution unit may be capable of performing various operations such as a multiply, add, subtract, divide, rotate, shift, Boolean AND, OR, XOR, NOT, etc. The opcode values of the different instructions of the instruction stream dynamically reconfigure muxes, demuxes, or similar logic in the integer unit datapath to perform different ones of the various operations over time. Still further, the fact that the logic is dynamically reconfigured requires the designers of the logic to account for propagation delay of the control signals to the muxes, demuxes, or similar logic.

Furthermore, the use of a GPR file in a CPU/GPU implies dependencies between the instructions. High performance CPU/GPU design generally involves pipelined, out-of-order and superscalar execution of instructions. That is, the CPU/GPU includes multiple execution units that may execute multiple instructions in parallel and, when possible, out of their order in the program. The CPU/GPU includes an instruction scheduler that looks ahead in the instruction stream to find instructions that are independent of one another so that it may keep the multiple execution units busy with instructions to execute. However, an instruction may be younger than another instruction in the program order, and the younger instruction may specify as one of its source operands the same GPR that the older instruction specifies as its destination operand, which is a common cause of instruction dependency. In this case, the scheduler must ensure that the younger instruction is not issued for execution to an execution unit to consume the result of the older instruction until the older instruction produces its result upon which the younger instruction is dependent, i.e., until the result is available. That is, when the producing execution unit that is executing the older instruction writes its result to the GPR, then a consuming execution unit may execute the younger instruction by reading the result from the GPR.

Because the CPU/GPU ISA does not impose restrictions between which instructions may read results from other instructions, the shared GPR file is necessary to provide global communication paths between any destination results and source operands for all instructions. To provide the necessary bandwidth to issue instructions each cycle, the large, monolithic GPR file is multi-ported to support concurrent access by in-flight instructions. The compiled machine language programs—which ignore instruction dependencies that must be detected by the CPU/GPU—are simple to write but are inefficient because the communication between operands is implicit.

Bypass muxes are a technique used by CPU/GPUs to reduce the latency incurred by instruction dependencies created by the use of a GPR file. Rather than waiting for the execution result to be written to the GPR by the producing execution unit and read from the GPR by the consuming execution unit, a bypass mux may be dynamically controlled (e.g., by the instruction scheduler) to receive the result from the producing execution unit and directly provide it as a source operand to the consuming execution unit. The bypass muxes are another example of a portion of the CPU/GPU datapath that is dynamically reconfigured in time as the conventional program instruction stream is decoded and executed. Bypass muxes also do not alleviate the need to detect and deal with the implicit instruction dependencies.

In the case of GPUs, the image affine transformation program is typically written in CUDA or a similar language derived from the C language. GPUs may group parallel work into a batch of threads that share an instruction stream and execute on a vector core. However, like CPUs, GPUs utilize a GPR file and consequently incur implicit instruction dependencies and are dynamically reconfigured in time as the instruction stream is executed.

In summary, a conventional CPU/GPU incurs overhead because it continually fetches instructions of an instruction stream that dynamically reconfigures the CPU/GPU as it executes the instruction stream over time. A conventional CPU/GPU also incurs overhead because the CPU/GPU must recognize and handle implicit instruction dependencies that are the result of a common GPR file shared by the instruction stream.

In contrast, embodiments are described in which a statically reconfigurable dataflow architecture processor (SRDAP) is statically reconfigured to perform an N-dimensional (N-D) affine transform on an N-D input image to produce an affine-transformed N-D output image. The SRDAP does not fetch and execute instructions in time that access a shared GPR file and therefore advantageously does not incur the associated overheads incurred by a CPU/GPU. Instead, the datapath of the SRDAP is statically reconfigured by configuration data loaded into configuration stores of the SRDAP, e.g., flip-slops, registers. The configuration data may be referred to as a dataflow "program." The dataflow program effectively maps a computation graph that represents the N-D image affine transformation to the hardware of the SRDAP in a static fashion, rather than in a dynamic fashion as would be accomplished by a CPU/GPU fetching and executing an instruction stream. The SRDAP dataflow program is loaded once into the configuration stores to statically reconfigure the SRDAP throughout the N-D affine transformation of the image by the SRDAP. That is, the dataflow program is loaded into the configuration stores prior to the flow of data through the SRDAP to perform the N-D affine transformation of the image and need not be reloaded until a different N-D affine transformation needs to be performed by the SRDAP.

The SRDAP includes statically reconfigurable vector compute datapaths, or pipelines, e.g., PCUs described below, and statically reconfigurable vector scratchpad memories, e.g., PMUs described below, interconnected by a network of statically reconfigurable switches. The PCUs are statically reconfigured to provide immediate communication between source and destination operands, without dynamic scheduling of instructions and without access through a shared GPR file. Instead, each PCU is statically reconfigured (e.g., muxes, demuxes, counters of the PCU) by the load of the dataflow program into the configuration stores to statically route source and destination operands between adjacent stages of the vector pipeline. That is, each PCU is statically reconfigured to route source operands from pipeline registers to consuming functional units, e.g., ALUs, of each stage of the vector pipeline and to route destination operands/results produced by the functional units of each stage of the vector pipeline to pipeline registers that in turn provide the source operands to the next stage of functional units. Additionally, each PMU may include memory addressing logic, counters and a control block that may be statically reconfigured by the dataflow program load.

Advantageously, the SRDAP has no instructions that read and write a GPR file that would result in implicit instruction dependencies, and therefore the SRDAP need not schedule or re-order instructions. Instead, the dataflow program—i.e., the configuration data statically loaded into the configuration stores—explicitly maps the N-D image affine transformation computation graph to the PCUs, PMUs, and switches of the SRDAP. For example, the dataflow program makes explicit the ordering dependencies in the PCU vector pipeline between each operation in the N-D image affine transformation computation graph, e.g., multiply-accumulates (MACCs) of a matrix dot-product computation.

Furthermore, operations of the N-D image affine transformation that would be expressed on a CPU/GPU as multiple instructions are processed in a dataflow fashion by the dedicated hardware of the SRDAP in a single clock. For example, as described in more detail below, the PCUs include counters that iterate over the pixels of the output image to generate their coordinates. In contrast, a conventional program fetched and executed by a CPU/GPU, the coordinates are variables stored in a GPR file and computed upon using load, store and add instructions. Advantageously, the statically reconfigurable nature of the SRDAP enables the coordinates to be generated by the counters and fed to the datapath deterministically every cycle without the overheads of instruction fetch/decode/execute/write-back. Additionally, the statically reconfigurable architecture of the SRDAP enables the N-D image affine transformation to be expressed using the explicit dependency graph between operations by mapping operations spatially across PCUs.

Still further, unlike a CPU/GPU that uses a cache hierarchy to provide communication between parallel instruction streams, the statically reconfigurable PMUs and switches of the SRDAP provide direct communication between dataflow pipelines. The on-chip interconnect of the SRDAP is statically reconfigured to deliver data between producer and consumer directly, unlike a conventional program fetched and executed by a CPU/GPU that uses its memory hierarchy to communicate between threads.

Additionally, the spatially distributed PMUs provide higher aggregate bandwidth than a monolithic data cache of a CPU/GPU, the described embodiments advantageously exploit the higher aggregate bandwidth by spatially mapping the N-D image affine transformation computation graph to the SRDAP hardware in a unique manner using knowledge of the memory access patterns of the computation graph to parallelize data accesses and computation operations. For example, as described below in more detail, the MACC operations used to compute each row of the transform matrix dot-product are mapped spatially, which enables the flattened address calculation described below to run at full throughput. More specifically, N different groups of PCUs perform the N dot-products associated with the N matrix dimensions in parallel, in contrast to a conventional CPU/GPU solution that performs them sequentially.

In the embodiments described, the PMUs comprise a vector of memory banks that correspond with the vector of pipelines of the PCUs. The PCU vector pipelines iterate (e.g., statically reconfigured counters) to generate vectors of output pixel coordinates, transform the output coordinates to vectors of input pixel coordinates, flatten the input pixel coordinates into vectors of addresses, and use the addresses to access vectors of the input image pixels that are pre-loaded into the PMU, i.e., prior to the PCUs commencing to generate the output pixel coordinates. The input image pixels could be loaded into the banks of the PMU such that adjacent pixels in the x-dimension lie in separate banks to facilitate parallel access (e.g., in a row major embodiment). However, because bank accesses are data-dependent, i.e., are dependent upon the particular affine transformation, the dense iteration of the output image coordinate space may yield a sparse iteration of the input image coordinate space—e.g., if the affine transformation includes rotation, expansion, or contraction—which could result in bank conflicts.

Advantageously, full throughput is accomplished via parallelization embodiments. In a first parallelization embodiment, a copy of the input image is pre-loaded into each bank of the PMU to facilitate vector reads of input pixels from the PMU using the vectors of flattened addresses to facilitate vector writes of the input pixels to an output PMU to sustain full throughput. In an alternate parallelization embodiment, a copy of the input image is pre-loaded into each of L PMUs to facilitate L parallel scalar reads of input pixels from the L PMUs using the flattened addresses. More specifically, a single input pixel is read from a different bank of each of the L different PMUs in parallel, in contrast to a read of a vector of L input pixels from a single PMU. The L scalar input pixels (i.e., the L single input pixels) are then coalesced by a tree of PCUs back into a vector of input pixels to facilitate the vector writes of the input pixels to sustain full throughput.

In some instances, the input image is too large to fit within the available on-chip SRDAP scratchpad memories (or within a PMU bank in the case of the first parallelization embodiment). Embodiments are described in which statically reconfigured counters of the SRDAP iterate over tiles of the output image and perform the N-D image affine transformation in a tiled manner, e.g., on a tile-by-tile basis in some ways similar to the manner employed with respect to an entire output image.

A graph is a collection of nodes connected by edges. Nodes may represent various kinds of items or operations, dependent on the type of graph. Edges may represent relationships, directions, dependencies, etc. Some algorithms can be represented as computation graphs. As used herein, computation graphs are a type of directed graph comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently. A dataflow graph is a computation graph that includes one or more loops that may be nested, and wherein nodes can send messages to nodes in earlier layers to control the dataflow between the layers.

The term coarse-grained reconfigurable (CGR) refers to a property of, for example, a system, a processor, an architecture, an array, or a unit in an array. The CGR property distinguishes the system, etc., from field-programmable gate arrays (FPGAs), which can implement digital circuits at the gate level and are therefore fine-grained configurable. A CGR architecture (CGRA) is a data processor architecture that includes one or more arrays of CGR units. A CGR array is an array of CGR units, coupled with each other through an array-level network (ALN), and coupled with external elements via a top-level network (TLN). A CGR array can physically implement the nodes and edges of a dataflow graph. A CGR unit is a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include an address generator (AG) and coalescing unit (CU), which may be combined in an address generator and coalescing unit (AGCU). Some implementations include CGR switches, whereas other implementations may include regular switches. A logical CGR array or logical CGR unit is a CGR array or a CGR unit that is physically realizable, but that may not have been assigned to a physical CGR array or to a physical CGR unit on an integrated circuit (IC). An integrated circuit may be monolithically integrated, i.e., a single semiconductor die that may be delivered as a bare die or as a packaged circuit. For the purposes of the present disclosure, the term integrated circuit also includes packaged circuits that include multiple semiconductor dies, stacked dies, or multiple-die substrates. A CGRA processor may also be referred to herein as a statically reconfigurable dataflow architecture processor (SRDAP).

The architecture, configurability, and dataflow capabilities of an array of CGR units enable increased compute power that supports both parallel and pipelined computation. A CGR processor, which includes one or more CGR arrays, can be statically reconfigured to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, machine learning (ML), artificial intelligence (AI), and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

A traditional compiler, e.g., for a CPU/GPU, sequentially maps, or translates, operations specified in a high-level language program to processor instructions that may be stored in an executable binary file. A traditional compiler typically performs the translation without regard to pipeline utilization and duration, tasks usually handled by the hardware. In contrast, an array of CGR units requires mapping operations to processor operations in both space (for parallelism) and time (for synchronization of interdependent computation graphs or dataflow graphs). The operation mapping requirement implies that a compiler for a CGRA must decide which operation of a computation graph or dataflow graph is statically assigned to which of the CGR units, and how both data and, related to the support of dataflow graphs, dataflow control information passes among CGR units and to and from external hosts and storage. The process of assigning logical CGR units and associated processing/operations to physical CGR units in an array and the configuration of communication paths between the physical CGR units may be referred to as "place and route" (PNR). Generally, a CGRA compiler is a translator that generates configuration data from to configure a processor. A CGRA compiler may receive statements written in a programming language. The programming language may be a high-level language or a relatively low-level language. A CGRA compiler may include multiple passes, as illustrated with reference to FIG. 9. Each pass may create or update an intermediate representation (IR) of the translated statements.

FIG. 1 illustrates an example system 100 including a CGR processor 110, a host 180, and a memory 190. CGR processor 110, also referred to as a SRDAP, has a coarse-grained reconfigurable architecture (CGRA) and includes an array of CGR units 120 such as a CGR array. CGR processor 110 further includes an IO interface 138, and a memory interface 139. Array of CGR units 120 is coupled with IO interface 138 and memory interface 139 via databus 130 which may be part of a top-level network (TLN). Host 180 communicates with IO interface 138 via system databus 185, and memory interface 139 communicates with memory 190 via memory bus 195. Array of CGR units 120 may further include compute units and memory units connected with an array-level network (ALN) to provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple units of CGR processor 110. In some implementations, CGR processor 110 may include one or more ICs. In other implementations, a single IC may span multiple coarsely reconfigurable data processors. In further implementations, CGR processor 110 may include one or more units of CGR array 120.

Host 180 may include a computer such as further described with reference to FIG. 2. Host 180 runs runtime processes, as further referenced herein, and may also be used to run computer programs, such as the compiler further described herein with reference to FIG. 9. In some implementations, the compiler may run on a computer that is similar to the computer described with reference to FIG. 2 but separate from host 180.

CGR processor 110 may accomplish computational tasks after being statically reconfigured by the loading of configuration data from a configuration file, for example, a processor-executable format (PEF) file, which is a file format suitable for configuring a SRDAP. For the purposes of the present description, a configuration file corresponds to a dataflow graph, or a translation of a dataflow graph, and may further include initialization data. A compiler compiles the high-level program to provide the configuration file. In some implementations described herein, a CGR array is configured by programming one or more configuration stores with all or parts of the configuration file. A single configuration store may be at the level of the CGR processor or the CGR array, or a CGR unit may include an individual configuration store. The configuration file may include configuration data for the CGR array and CGR units in the CGR array and link the computation graph to the CGR array. Execution of the configuration file by CGR processor 110 causes the CGR array to implement the user algorithms and functions in the dataflow graph.

CGR processor 110 can be implemented on a single IC die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
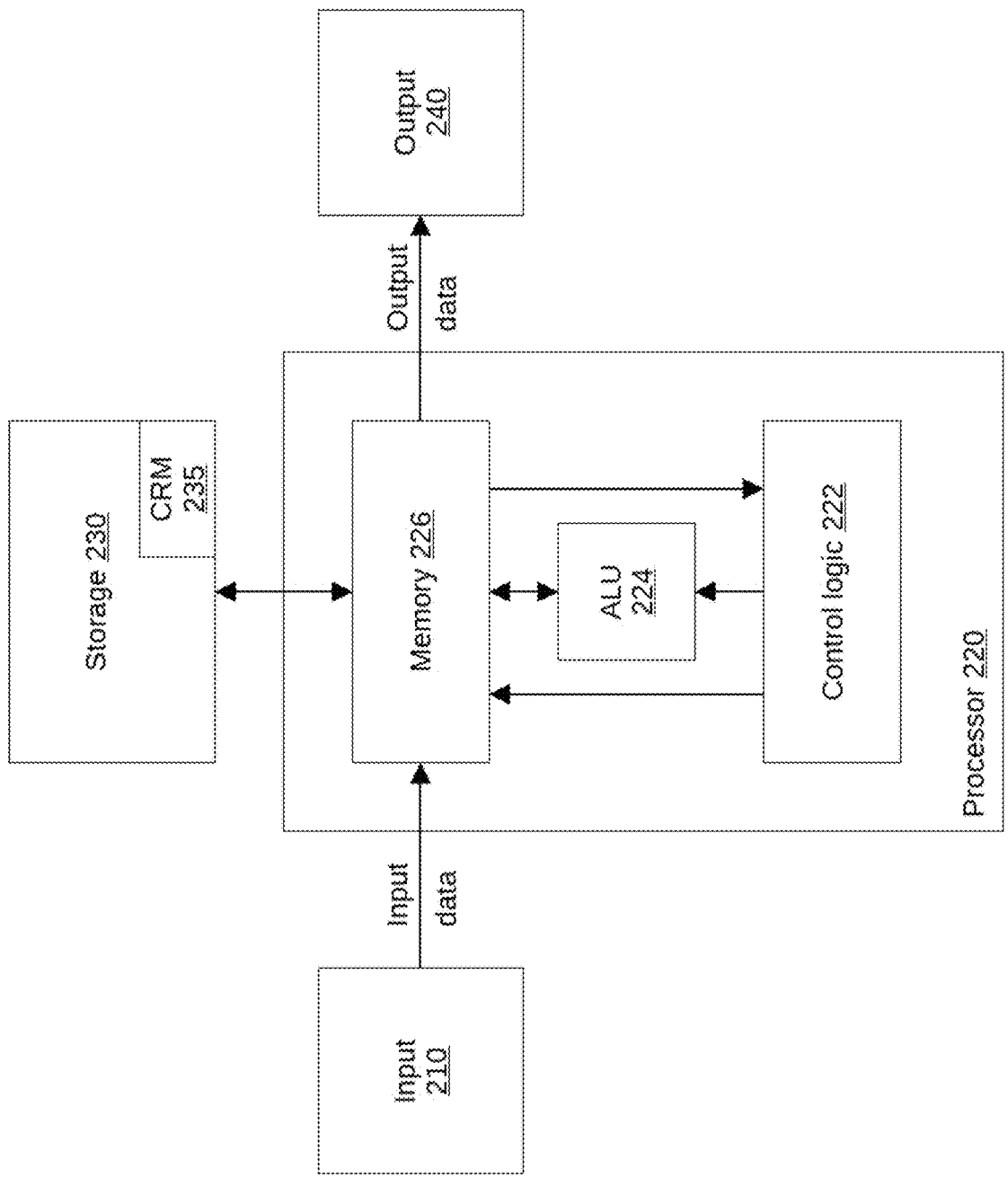
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and other input devices. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with a CGR processor 110 of FIG. 1. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
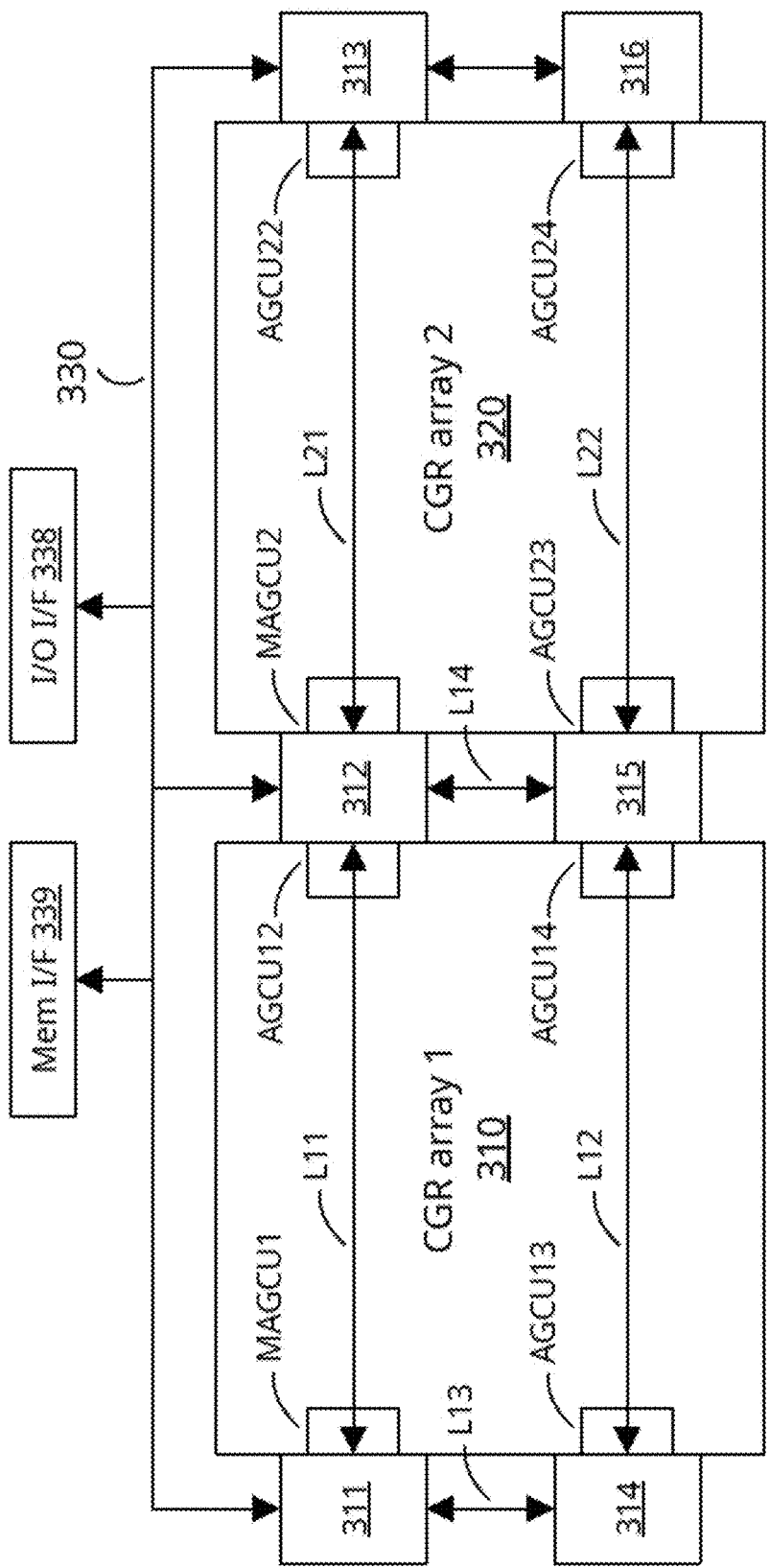
FIG. 3 illustrates example details of a coarse-grained reconfigurable architecture (CGRA) including a top-level network (TLN) and two reconfigurable dataflow units (RDUs).

FIG. 3 illustrates example details of a CGR architecture 300 including a top-level network (TLN 330) and two CGR arrays (CGR array 310 and CGR array 320). A CGR array comprises an array of CGR units coupled via an array-level network (ALN), e.g., abus system. The CGR units may include pattern memory units (PMUs), pattern compute units (PCUs), and fused compute and memory units (FC-MUs) that include both a memory unit and a compute unit, e.g., FCMU 530 of FIG. 5. The ALN is coupled with the TLN 330 through several AGCUs, and consequently with I/O interface 338 (or any number of interfaces) and memory interface 339. Other implementations may use different bus or communication architectures.

Circuits on the TLN in the example of FIG. 3 include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs, e.g., MAGCU1, AGCU12, AGCU13, and AGCU14 in CGR array 310. The AGCUs interface the TLN to the ALNs and route data from the TLN to the ALN or vice versa.

One of the AGCUs in each CGR array in the example of FIG. 3 is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
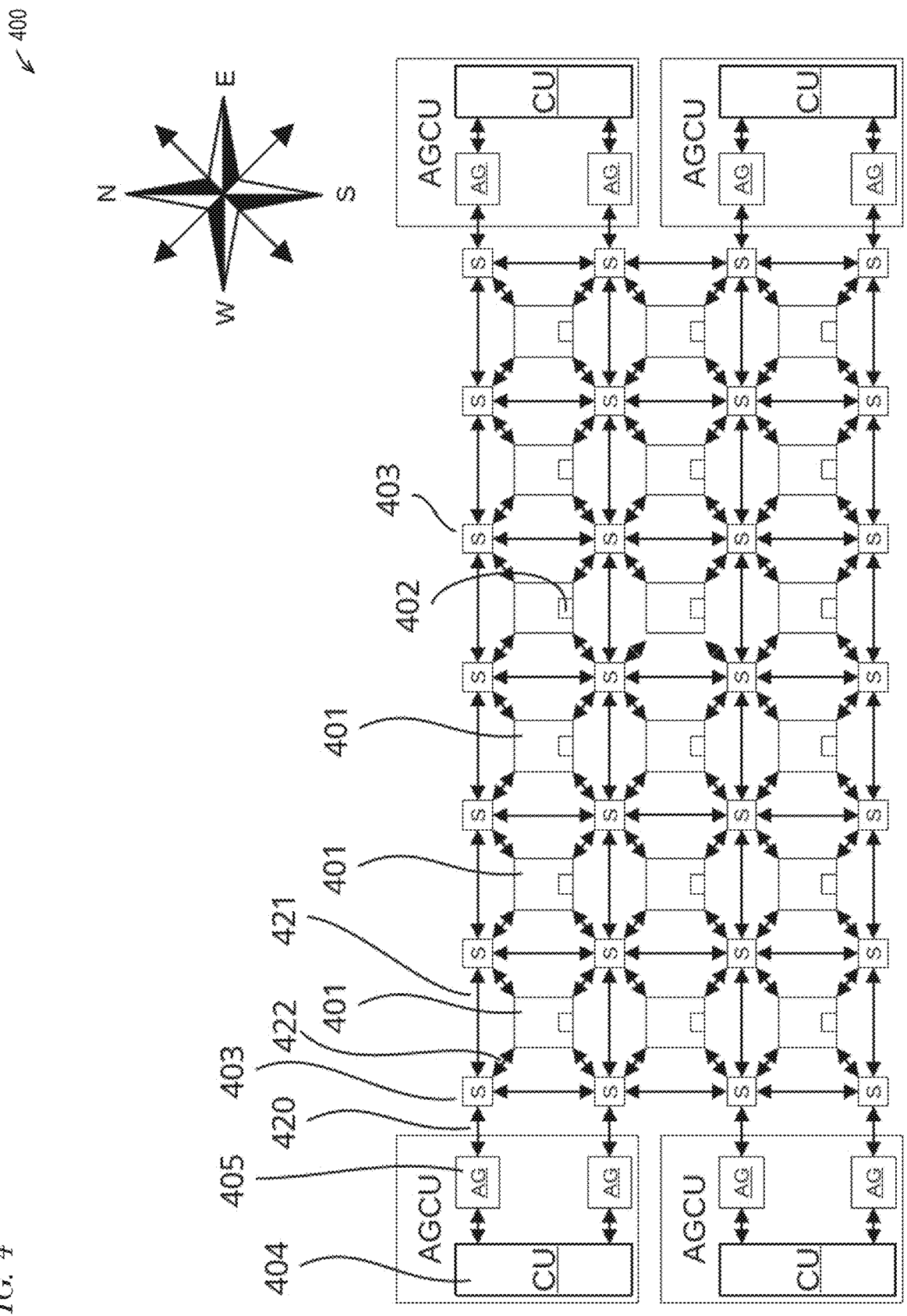
FIG. 4 illustrates an example RDU, including an array of configurable nodes in anarray-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada, which is incorporated by reference for all purposes. Each of the CGR units may include a configuration store 402 comprising a set of registers or flip-flops storing configuration data, also referred to as a dataflow program, that represents the setup and/or the sequence to run the dataflow program, and that can include the number of nested loops, the limits of each loop iterator, the operations to be performed by each pipeline stage, the source of operands, and the network parameters for the input and output interfaces. A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels established as and when needed.

Figure 5:
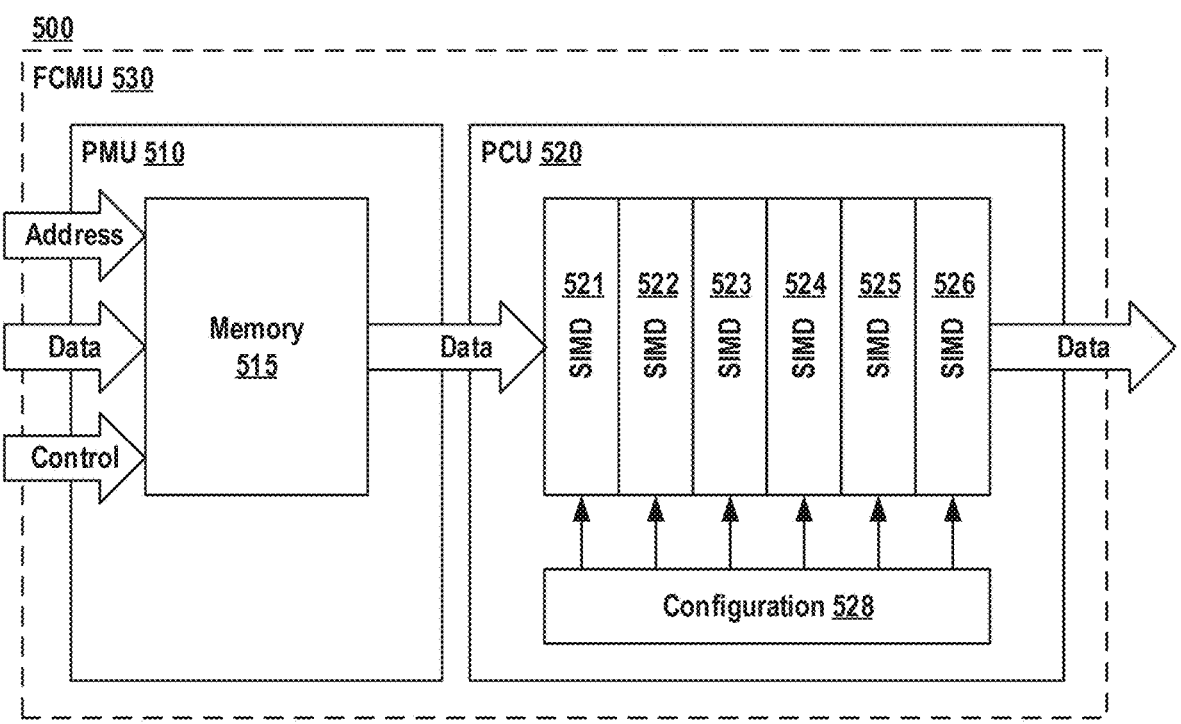
FIG. 5 illustrates an example of a pattern memory unit (PMU) and a pattern compute unit (PCU), which may be combined in a fused-control memory unit (FCMU).

The ALN includes one or more kinds of physical data buses, for example a chunk-level vector bus (e.g., 512 bits of data), a word-level scalar bus (e.g., 32 bits of data), and a control bus, e.g., as shown in FIG. 5. For instance, interconnects 421 between two switches may include a vector bus interconnect with a bus width of 512 bits, a scalar bus interconnect with a bus width of 32 bits, and a control bus. A control bus can comprise a configurable interconnect that carries multiple control bits on signal routes. The signal routes may be statically reconfigured by configuration data in the configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, e.g., functional units (FUs) 521 through 526, and configuration store 528. The processor stages may include ALUs or other reconfigurable stages that can process data.

Each stage in PCU 520 may also hold one or more registers (e.g., PRs 1002 of FIG. 10) for short-term storage of operands. Short-term storage, for example during one to several clock cycles or unit delays, allows for synchronization of data in the PCU pipeline.

Figure 6:
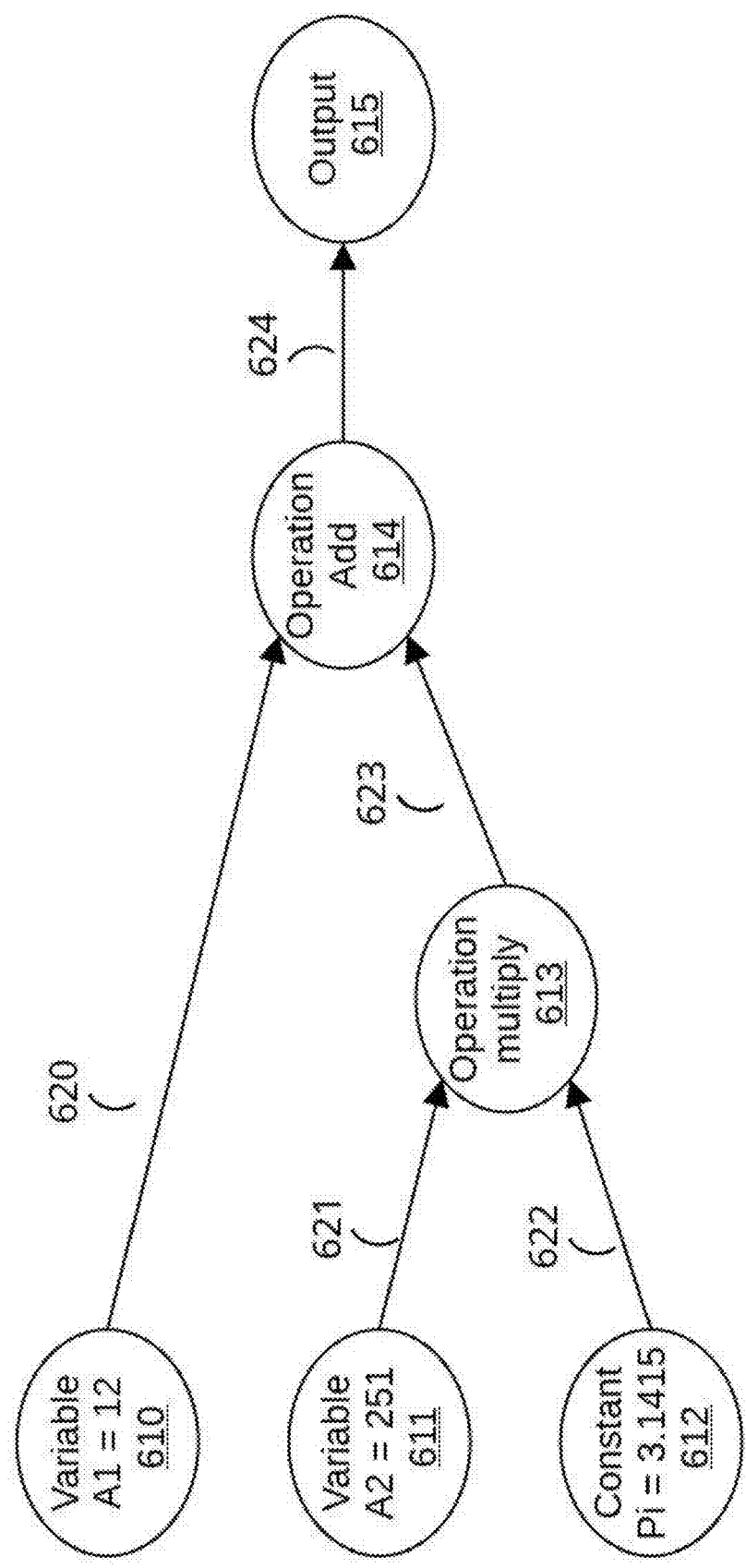
FIG. 6 shows an example of a computation graph.

FIG. 6 shows an example of a computation graph 600. Computation graphs represent mathematical expressions and comprise nodes and directed edges. In FIG. 6, nodes are drawn as circles and directed edges are drawn as arrows. A node can represent a constant, a variable, for example from an input, an operation, an equation, or an output value. A directed edge can represent a dependency. Node 610 represents a variable A1, whose present value equals 12. Node 611 represents a variable A2, whose present value equals 251. Node 612 represents the constant 7E. Node 613 represents a multiplication operation. Node 613 receives its input data from node 611 via directed edge 621 and from node 612 via directed edge 622. Node 614 represents an addition operation. Node 614 receives its input data from node 610 via directed edge 620 and from node 613 via directed edge 623. Node 614 outputs its result in output node 615 via directed edge 624. Computation graph 600 as a whole represents the equation Output=A1+pi*A2.

The depicted computation graph 600 is very simple and could be implemented electronically in many ways. For example, computation graph 600 could be hardwired as a circuit of digital gates in an application-specific IC (ASIC), or an FPGA could be configured to emulate the circuit of digital gates, or a CGR processor could be configured to perform the addition and multiplication functions, or a CPU could run a conventional computer program to perform the functions. In all implementations, the timing is important. Node 614 is not able to calculate a valid output value until all its input values are valid. That means node 613 must be finished first. Most digital circuits are implemented as pipelines of clocked stages. If the add operation of node 614 is in a later stage than the multiplication operation of node 613, then a fixed-delay buffer may need to be inserted between node 610 and node 614 to synchronize the value of variable A1 with the result of the multiplication in node 613. The fixed-delay buffer can be added to the graph to make it physically implementable.

Most computation graphs are a-cyclic, i.e., do not include loops. One class of computation graphs, dataflow graphs, may include loops, and even nested loops, which can make variable the delay of an operation performed by a node, dependent on the data flowing through a pipeline of operations. When a high-level program includes multiple pipelines of parallel, interdependent operations, then synchronization can become highly complex. Synchronization can be further complicated when directed edges are implemented as data channels in a network, since the data channels can become congested. A CGR processor, may resolve both problems by using dataflow control information, sent as messages from consuming nodes to producing nodes to indicate that the consuming node is ready to receive the information, and a credit token system that prevents congestion of the data channels between the producing and consuming nodes.

Figure 7:
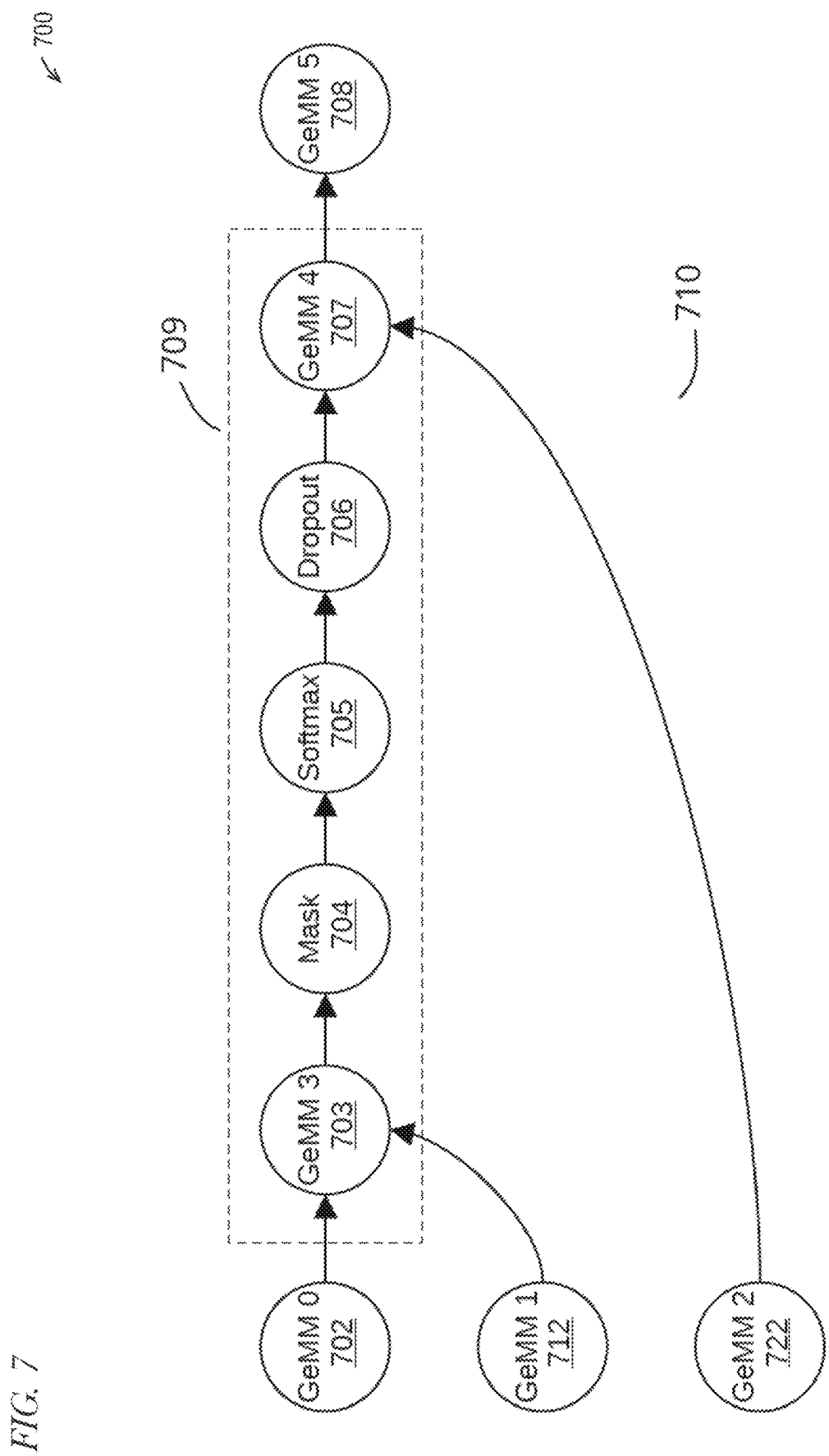
FIG. 7 shows an example of a dataflow graph.

FIG. 7 shows an example of a dataflow graph 700. The example, one head of a multi-head attention module in the Transformer model first published by Vaswani, et al., "Attention Is All You Need," 31st Conference on Neural Information Processing Systems, 2017, is well known in the industry. Dataflow graph 700 includes a loop 709 within a loop 710. Loop 710 includes four general matrix multiplications, GeMM 702, GeMM 712, GeMM 722, and GeMM 708. Loop 709 includes an ingress matrix multiplication GeMM 703, mask fill node 704, softmax node 705, dropout node 706, and egress matrix multiplication node 707.

To physically implement dataflow graph 700, an implementation may insert three types of stage buffers: (1) inter-stage buffers, (2) intra-stage buffers, and (3) interface buffers. The interface buffers are used because the granularity of communication (i.e., the size of tensors or data produced or consumed) varies between loops at different levels. Further, an implementation must add dataflow control information, to synchronize the various stages of asynchronous computation.

Figure 8:
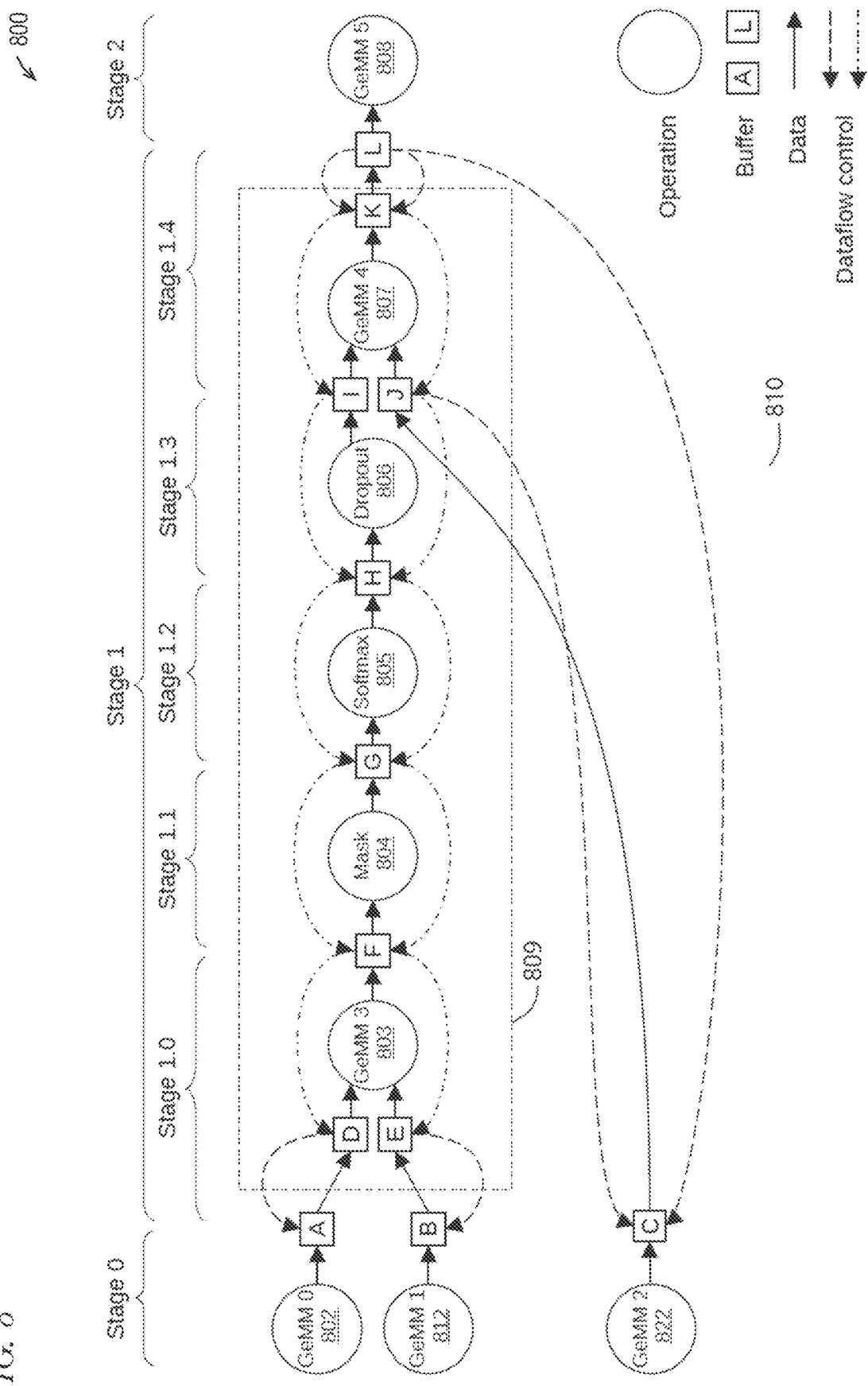
FIG. 8 shows the dataflow graph of FIG. 7 with buffers and dataflow control information added.

FIG. 8 shows the dataflow graph of FIG. 7 with buffers and dataflow control information added. A compiler in the technology presented herein can create graph 800 from dataflow graph 700, assign the nodes to compute units and memory units in a CGR array, and assign edges and dataflow control information to data channels in an array-level network that connects the compute units and memory units.

To get from dataflow graph 700 to graph 800, one compiler implementation divides the dataflow graph in stages (stages 0, 1, and 2 are shown in the example of FIG. 7), and where there are nested loops also in substages (substages 1.0 through 1.4 are shown). The implementation inserts buffers between the stages to allow for pipelined processing in one or more parallel meta-pipelines—configured at the CGR processor, CGR array level, and/or GCR unit level—that may interact at the graph execution level to enable correct timing of node-level operations of the configured graph. The buffers are shown as blocks labeled A through L and are different from buffers at the gate level, which may be single or double inverters used to boost the energy level of digital signals that need to travel through long wires or that need to drive high-capacitance loads, or which may be flip-flops operated by a system clock and used to implement synchronous logic. The buffers at the meta-pipeline level may be memories, register files, shift registers, or first-in-first-out (FIFO) memories of fixed or variable length, storing one or more data items, e.g., scalars, vectors, or tensors. The buffers may be clocked by a producer node to store data or by a consumer node to release data. The buffers may further be controlled by dataflow control information coming from, for example, downstream nodes. FIG. 8 shows the same operation nodes as FIG. 7 (with like numbering), but the edges (solid arrows), where data flows, are interrupted by the buffers to partition the graph into stages, and dataflow control information is added, shown as dashed arrows for loop 810 and dash-dot arrows for loop 809. In the example shown, data travels downstream (solid arrows from the left to the right) and dataflow control information travels upstream (dashed arrows from the right to the left).

In further preparation for a physical implementation of graph 800, an implementation may assign each operation node to one or more logical compute units or memory units, and each buffer to one or more logical memory units. Some implementations may perform further preparations and optimizations. All implementations proceed to place and route, i.e., assign the logical units to physical units in a layout of a coarsely reconfigurable array, and in some implementations assign the data connections and the dataflow control information connections to data channels in the ALN in the CGR array.

Figure 9:
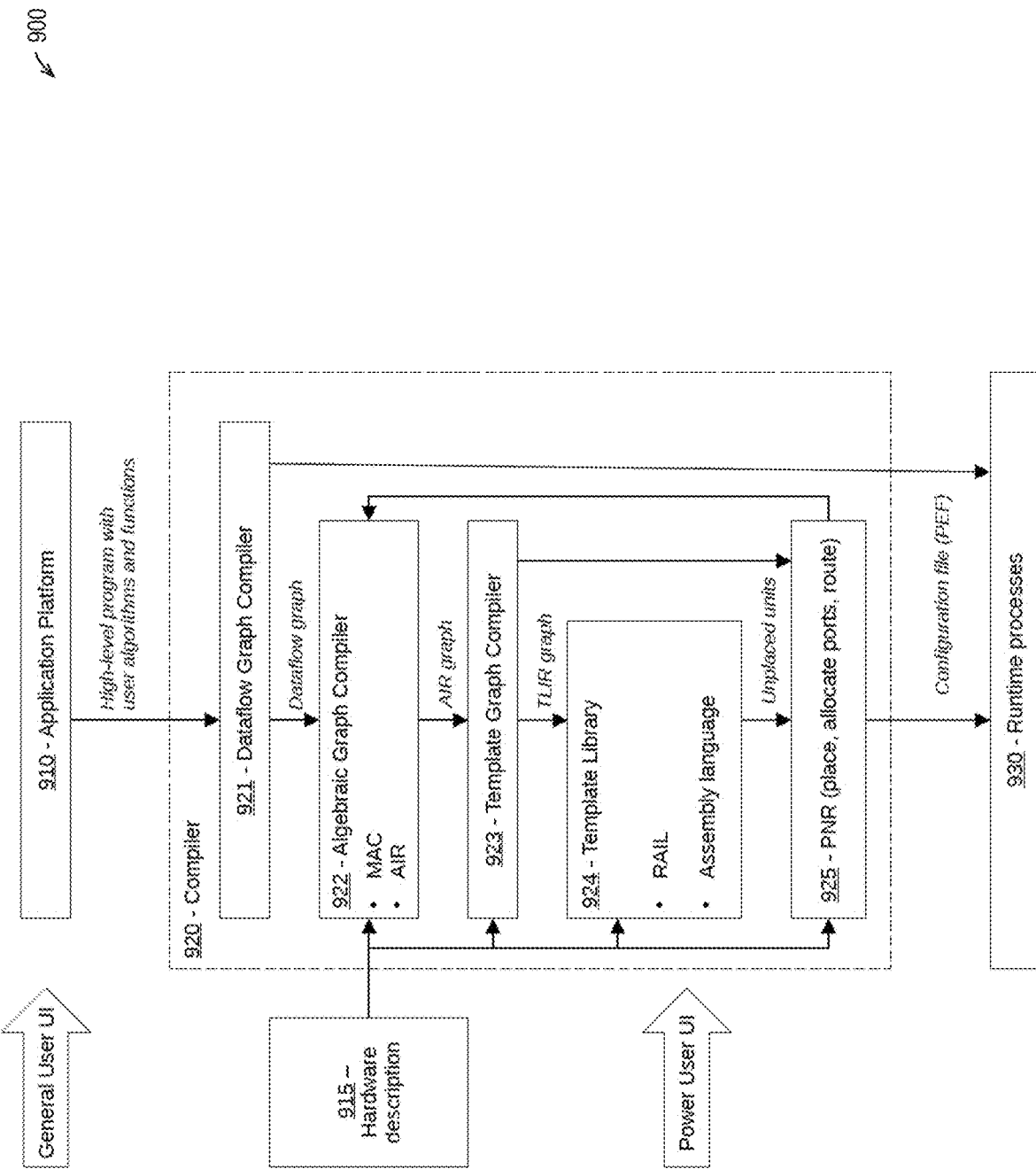
FIG. 9 is a block diagram of a compiler stack implementation suitable for generating a configuration file for a coarsely reconfigurable data processor or a CGRA processor.

FIG. 9 is a block diagram of a compiler stack 900 implementation suitable for generating a configuration file for a CGR processor. As depicted, compiler stack 900 includes several passes to convert a high-level program with user algorithms and functions, e.g., algebraic expressions and functions, to configuration data for the CGR units. Compiler stack 900 may take its input from application platform 910, or any other source of high-level program statements suitable for parallel processing, which provides a user interface for general users. Compiler stack 900 may further receive hardware description 915, for example defining the physical units in a reconfigurable data processor or CGRA processor. Application platform 910 may include libraries such as PyTorch, TensorFlow, ONNX, Caffe, and Keras to provide user-selected and configured algorithms. Application platform 910 outputs a high-level program to compiler 920, which in turn outputs a configuration file, or dataflow program, to the reconfigurable data processor or CGRA processor where the dataflow program is executed in runtime processes 930. Compiler 920 may include dataflow graph compiler 921, which may handle a dataflow graph, algebraic graph compiler 922, template graph compiler 923, template library 924, and placer and router PNR 925. In some implementations, template library 924 includes reconfigurable data unit abstract intermediate language (RAIL) and/or assembly language interfaces for power users.

Dataflow graph compiler 921 converts the high-level program with user algorithms and functions from application platform 910 to one or more dataflow graphs. The high-level program may be suitable for parallel processing, and therefore parts of the nodes of the dataflow graphs may be intrinsically parallel unless an edge in the graph indicates a dependency. Dataflow graph compiler 921 may provide code optimization steps like false data dependency elimination, dead-code elimination, and constant folding. The dataflow graphs encode the data and control dependencies of the high-level program. Dataflow graph compiler 921 may support programming a reconfigurable data processor at higher or lower-level programming languages, for example from an application platform 910 to C++ and assembly language. In some implementations, dataflow graph compiler 921 allows programmers to provide code that runs directly on the reconfigurable data processor. In other implementations, dataflow graph compiler 921 provides one or more libraries that include predefined functions like linear algebra operations, element-wise tensor operations, non-linearities, and reductions required for creating, executing, and profiling the dataflow graphs on the reconfigurable processors. Dataflow graph compiler 921 may provide an application programming interface (API) to enhance functionality available via the application platform 910.

Algebraic graph compiler 922 may include a model analyzer and compiler (MAC) level that makes high-level mapping decisions for sub-graphs of the dataflow graph based on hardware constraints. Algebraic graph compiler 922 may support various application frontends such as Samba, JAX, and TensorFlow/HLO. Algebraic graph compiler 922 may also transform the graphs via autodiff and GradNorm, perform stitching between sub-graphs, interface with template generators for performance and latency estimation, convert dataflow graph operations to arithmetic or algebraic intermediate representation (AIR) operations, perform tiling, sharding (database partitioning) and other operations, and model or estimate the parallelism that can be achieved on the dataflow graphs. Algebraic graph compiler 922 may further include an arithmetic or algebraic intermediate representation (AIR) level that translates high-level graph and mapping decisions provided by the MAC level into explicit AIR graphs.

Template graph compiler 923 may translate AIR graphs into template library intermediate representation (TLIR) graphs, optimizing for the target hardware architecture and/or into unplaced units suitable for PNR 925. Template graph compiler 923 may add further information (names, inputs, input names and dataflow descriptions) for PNR 925 and make the graph physically realizable through each performed step. Template graph compiler 923 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data, and optimize for hardware use, latency, and throughput.

Implementations may use templates for common operations. Templates may be implemented using assembly language, RAIL, or similar. RAIL is comparable to assembly language in that memory units and compute units are separately programmed but can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 924 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

PNR 925 translates and maps logical (i.e., unplaced physically realizable) CGR units to the physical chip level (e.g., a physical array of CGR units), determines physical data channels to allow for communication among the CGR units and between the CGR units and circuits coupled via the TLN, allocates ports on the CGR units and switches, provides configuration data and initialization data for the target hardware, and produces configuration files, e.g., processor-executable format (PEF) files. PNR 925 may further provide bandwidth calculations, allocate network interfaces such as AGCUs and virtual address generators (VAGs), provide configuration data that allows AGCUs and/or VAGs to perform address translation, and control ALN switches and data routing. PNR 925 may provide its functionality in multiple steps and may include multiple modules (not shown in FIG. 9) to provide the multiple steps, e.g., a placer, a router, a port allocator, and a PEF file generator. PNR 925 may receive its input data in various ways. For example, PNR 925 may receive parts of its input data from any of the earlier modules (dataflow graph compiler 921, algebraic graph compiler 922, template graph compiler 923, and/or template library 924). In some implementations, an earlier module, such as template graph compiler 923, may have the task of preparing all information for PNR 925 and no other units provide PNR input data directly.

Further implementations of compiler 920 provide for an iterative process, for example by feeding information from PNR 925 back to an earlier module, so that the earlier module can execute a new compilation step in which the earlier module uses physically realized results rather than estimates of or placeholders for physically realizable circuits. For example, PNR 925 may feed information regarding the physically realized circuits back to algebraic graph compiler 922.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a PCU. Other memory types for which the memory allocations can be made for various access patterns and layouts include cache, read-only look-up tables (LUTs), serial memories (e.g., FIFOs), and register files.

Compiler 920 binds memory allocations to unplaced memory units and binds operations specified by operation nodes in the dataflow graph to unplaced compute units, and these bindings may be specified in the configuration data. In some implementations, compiler 920 partitions parts of a dataflow graph into memory subgraphs and compute subgraphs and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 920 generates the configuration files with configuration data (e.g., a bit stream) for the placed positions and the routed data and control networks. In one implementation, the configuration data includes assigning coordinates and communication resources of the physical CGR units by placing and routing unplaced units onto the array of CGR units while maximizing bandwidth and minimizing latency.

A first example of accelerated deep learning is using a deep learning accelerator implemented in a CGRA processor to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are CGR processor ICs. The disclosed technology implements efficient distributed computing by allowing an array of accelerators (e.g., reconfigurable processors) attached to separate hosts to directly communicate with each other via buffers.

Figure 10:
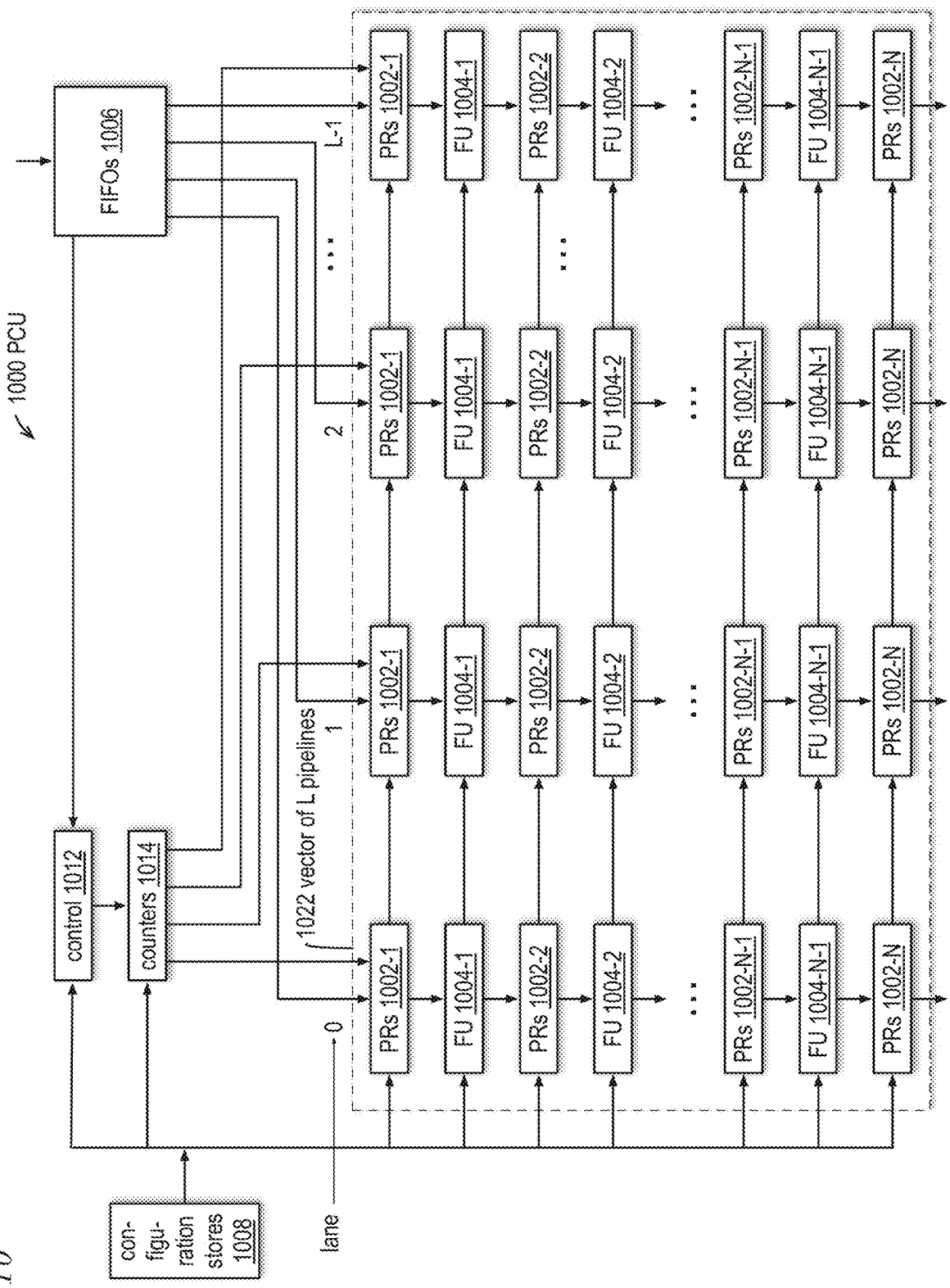
FIG. 10 is an example block diagram illustrating a pattern compute unit (PCU) of a statically reconfigurable dataflow architecture processor (SRDAP).

FIG. 10 is an example block diagram illustrating a pattern compute unit (PCU) 1000 of a statically reconfigurable dataflow architecture processor (SRDAP) (e.g., SRDAP 1200 of FIG. 12) in accordance with embodiments of the present disclosure. The SRDAP 1200 may also be referred to as a CGR array (e.g., CGR array 400 of FIG. 4) that embodies a CGR architecture (e.g., CGR architecture 300 of FIG. 3) or a CGR processor (e.g., CGR processor 110 of FIG. 1), as described above. The PCU 1000 (e.g., PCU CGR unit 401 of FIG. 4 or PCU 520 of FIG. 5) includes configuration stores 1008, a control block 1012, counters 1014, FIFOs 1006, and a vector pipeline 1022 of functional units (FUs) 1004 interleaved with pipeline registers (PRs) 1002.

The configuration stores 1008 (e.g., configuration stores 402 of FIG. 4 or configuration stores 528 of FIG. 5) are loaded with configuration data that is used to statically reconfigure the PCU 1000. More specifically, the configuration stores 1008 provide relevant portions of the configuration data to the control block 1012, the counters 1014, the PRs 1002, and the FUs 1004. The configuration data provided to a counter 1014 may include an initial value, a stride value, and a terminal value. The stride value is the amount by which the counter counts. The terminal values specifies when the counter 1014 stops counting, e.g., the maximum value in the case that the counter 1014 is statically reconfigured to count up. The configuration data provided to a control block 1012 may include FIFO-related information and state machine-related information that is used to control when data is allowed to flow through the PCU 1000, as described below. The configuration data provided to the FUs 1004 may include signals that control which operation is performed by each of the FUs 1004, e.g., MACC, multiply, add, subtract, divide, rotate, shift, Boolean AND, OR, XOR, NOT, etc., as described below. The configuration data provided to the PRs 1002 may include control signals to multiplexers (or muxes) and demultiplexers (or demuxes), as described below.

The FIFOs 1006 provide data to the vector pipeline 1022. In an embodiment, the FIFOs 1006 include vector FIFOs 1006 that receive and provide vector data, as well as scalar FIFOs 1006 that receive and provide scalar data, as described in more detail below. The FIFOs 1006 may receive data from other array elements, i.e., other PCUs 1000, PMUs 1100 (e.g., of FIG. 11 or 510 of FIG. 5), and/or switches (e.g., S 403 of FIG. 4) that interconnect the PCUs 1000 and PMUs 1100. The FIFOs 1006 may provide control signals to the control block 1012, e.g., to indicate whether a FIFO 1006 is non-empty. The control block 1012 may also receive control signals (e.g., via switches 403) from FIFOs 1006 of other array elements, e.g., to indicate whether a FIFO is full. A control block 1012 is not enabled until all FIFOs the PCU 1000 reads from are not empty and all FIFOs the PCU 1000 writes to are not full. The FIFO full and not empty signals may be routed from a consumer PCU 1000, PMU 1100, or switch 403 to a producer PCU 1000, PMU 1100, or switch 403 through the control network formed by the switches 403.

The vector pipeline 1022 includes L lanes, or individual pipelines, of FUs 1004 interleaved with PRs 1002. The L lanes are denoted 0 through L−1. The PRs 1002 provide source operands to the FUs 1004. The PRs 1002 also receive results, or destination operands, from the FUs 1004. The PRs 1002 include muxes (not shown) and demuxes (not shown). The muxes are statically reconfigured by the configuration data to specify which PRs 1002 provide source operands to each FU 1004. The demuxes are statically reconfigured by the configuration data to specify which PRs 1002 receive results from each FU 1004.

The ALN switches 403 and AGCUs (e.g., of FIG. 4) may also include configuration stores, FIFOs, control blocks, and counters similar to those of the PCUs 1000 and PMUs 1100. The switches 403 and AGCUs may be in communication with the counters and control blocks of the PCUs 1000 and PMUs 1100 via control buses of the control network of the array-level network (ALN) to exchange dataflow control information as described above. In an embodiment, counters in the switches and/or AGCUs may operate as outer loop iteration counters in the performance of an affine transformation of an input image to produce an output image.

In summary, a PCU comprises a vector pipeline of functional units statically reconfigurable to perform one or more of a set of arithmetic and logical operations on operands received from a previous pipeline stage of the PCU, from another PCU, and/or from one or more of the PMUs. The configuration data loaded into the configuration stores determines which arithmetic and logical operations are performed by the functional units. Additionally, the configuration data may control multiplexers and demultiplexers to specify which of the pipeline registers provide source operands to the functional units and which pipeline registers of the vector pipeline receive results produced by the functional units. Additionally, the configuration data determine initial values, stride values, and terminal values of counters of the PCUs. The counters may be employed as loop iterators, and the counter values may be included in the data that flows through the vector pipeline. The counters may be chained together to accomplish loop nesting.

Figure 11:
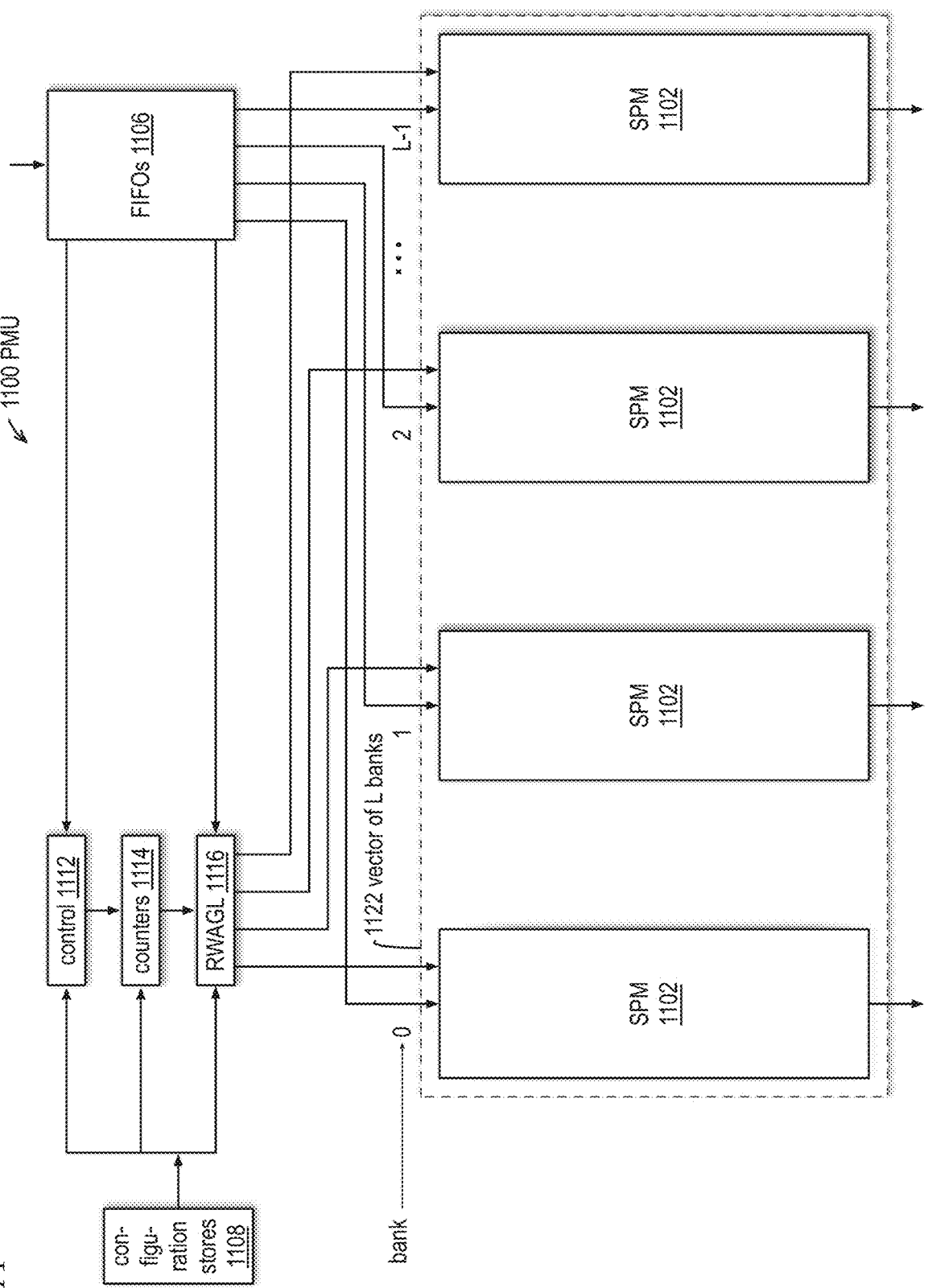
FIG. 11 is an example block diagram illustrating a pattern memory unit (PMU) of a SRDAP.

FIG. 11 is an example block diagram illustrating a pattern memory unit (PMU) 1100 of a SRDAP in accordance with embodiments of the present disclosure. The PMU 1100 (e.g., PMU CGR unit 401 of FIG. 4 or PMU 510 of FIG. 5)

includes configuration stores 1108, a control block 1112, counters 1114, and FIFOs 1106 similar to the corresponding elements of the PCU 1000 of FIG. 10. The PMU 1100 also includes scratchpad memories (SPMs) 1102 arranged as a vector of banks 1122, shown as L banks, denoted 0 through L−1, that correspond to the L lanes of a PCU 1000. The SPMs 1102 may be written with data (e.g., pixel values, pixel addresses) received from PCUs 1000, other PMUs 1100, and switches 403 via the FIFOs 1106, and the data in the SPMs 1102 may be read by PCUs 1000, other PMUs 1100, and switches 403. As described below, to perform the N-D image affine transformation, the SPMs 1102 may be pre-loaded with the pixel data, i.e., pixel values, of the input image from a memory outside the SRDAP 1200 (e.g., from the host memory 190) and then read using addresses calculated based on transformed input pixel coordinates. As also described below, other SPMs 1102 may be written with the pixel data that forms the output image, which may be subsequently stored from the SPM 1102 to a memory outside the SRDAP 1200 (e.g., to the host memory 190). Advantageously, the PMUs 1100 facilitate full throughput of dataflow through the SRDAP 1200 as it performs the N-D image affine transformation, as described in more detail below, due to their bank arrangement that matches the lane arrangement of the PCUs 1000 and due to their large size and speed, e.g., the SPMs 1102 may be high-speed SRAMs, e.g., 512 KB per PMU 1100, although other sizes of the PMUs 1100 are contemplated. The PMUs 1100 may also be used for other purposes, as described below, e.g., intermediate storage of transformed pixel coordinates, deltas used for interpolation, and bounds predication information. In an embodiment, each bank is four bytes wide, i.e., each location in an SPM 1102 holds a 4-byte word, although other embodiments are contemplated.

The PMU 1100 also includes read and write address generation logic (RWAGL) 1116 that is statically reconfigured by configuration data from the configuration stores 1108 and that may receive address generation information from the FIFOs 1106. The RWAGL 1116 generates read addresses and write addresses that are provided to each of the SPM 1102 to respectively read and write each of the SPM 1102. The read addresses and write addresses may be generated concurrently by the RWAGL 1116 to facilitate writing to and reading from the SPMs 1102 in a streaming fashion, i.e., the SPMs 1102 may be concurrently written and read, to facilitate full throughput during performance of an N-D image affine transformation. The RWAGL 1116 may be statically reconfigured to generate addresses in multiple modes.

In a first access mode, the RWAGL 1116 receives the value of a counter 1114 statically reconfigured with an initial value that specifies a bank index (or bank offset) that is the same value for all banks of the vector of banks 1122, i.e., all of the SPMs 1102. That is, the RWAGL 1116 uses the bank index to form a vector of bank indexes that together specify a row of the vector of banks 1122 since all the bank indexes have the same value in the first access mode. For example, the initial value may specify a bank index of zero such that the RWAGL 1116 generates the vector of bank indexes each having a value of zero to select row zero of the vector of banks 1122. In such example, the RWAGL 1116 may generate the vector of bank indexes to facilitate a write of a vector of data from a vector FIFO 1106 to row zero of the vector of banks 1122; or the RWAGL 1116 may generate the vector of bank indexes to facilitate a read of a vector of data from row zero of the vector of banks 1122 to output for consumption by a PCU 1000, another PMU 1100, or an AGCU. The counter 1114 may be statically reconfigured to increment the bank index until the bank index reaches a terminal value to write/read multiple vectors of data to/from multiple rows of the vector of banks 1122.

In an embodiment, a read form of the first access mode is employed to store the output image/tile from the PMU 1100 to host memory 190 in which a read counter 1114 is statically reconfigured with an initial value of zero, a stride value of one, and a terminal value that is the size of the output image/tile divided by L.

In an embodiment, a first write form of the first access mode is employed to write the output image/tile into an output PMU 1100 one vector of input pixels at a time in which a write counter 1114 is statically reconfigured with an initial value of zero, a stride value of one, and a terminal value that is the size of the output image/tile divided by L.

In an embodiment, a second write form of the first access mode is employed to pre-load the input image/tile from host memory 190 into the PMU 1100 in which the counter 1114 is statically reconfigured with an initial value of zero, a stride value of one, and a terminal value that is the size of the input image/tile divided by L. For example, the input pixels read from the host memory 190, e.g., in row major fashion, may be provided, e.g., by a switch 403, as L-vectors to the PMU 1100 and written into the SPMs 1102 such that input pixels adjacent in the x-dimension are held in adjacent locations of the PMU 1100. In an embodiment, an AGCU and one or more switches 403 are statically reconfigured to receive the input image/tile from host memory 190 and to broadcast the input image/tile to L different data_PMUs using the second write form of the first access mode to load a copy of the input image/tile into each of the L data_PMUs, as described with respect to the alternate parallelization embodiment of FIGS. 19 and 20. A third write form of the first access mode is described below with respect to the description of a third access mode.

In a second access mode, similar to the first access mode the RWAGL 1116 receives the value of a counter 1114 statically reconfigured with an initial value that specifies a bank index; however, rather than a vector of data, the PMU 1100 receives a scalar data value into a scalar FIFO 1106 that the scalar FIFO 1106 broadcasts to all banks of the vector of banks 1122. That is, the scalar data value is copied L times to create an L-vector of data that is written to the row of the vector of banks 1122 specified by the bank index. Also similar to the first access mode, the counter 1114 may be statically reconfigured to increment the bank index until reaching a terminal value to accomplish writing multiple received and broadcasted scalar data values to multiple rows of the SPMs 1102. In an embodiment (e.g., the parallelization embodiment of FIG. 15), the counter 1114 is statically reconfigured with an initial value of zero, a stride value of one, and a terminal value that is the size of the input image/tile (i.e., the number of pixels of the input image/tile), and the PMU 1100 receives a series of scalar data values that are the input pixels of the input image/tile, e.g., in a row major fashion, to load a linearized copy of the input image/tile into each bank of the vector of banks 1122 of the PMU 1100 such that, within each bank, input pixels adjacent in the x-dimension are held in adjacent indexes of the bank.

In a third access mode, the RWAGL 1116 generates a vector of bank indexes, similar to the first access mode, except that the L bank indexes are not necessarily the same value, e.g., are not generated based on a counter value. Rather, each bank index may have its own value independent of the other bank indexes of the vector of bank indexes. The PMU 1100 may receive the vector of bank indexes from a PCU 1000 or another PMU 1100, and the received vector of bank indexes may be written to a vector FIFO 1106 that subsequently provides the vector of bank indexes to the RWAGL 1116. In the first parallelization embodiment of FIG. 15, the counter 1114 is statically reconfigured to count a number of times equal to the size of the output image/tile divided by L (e.g., with an initial value of zero, a stride value of one, and a terminal value that is the size of the output image/tile divided by L, or with a stride value of L, and a terminal value that is the size of the output image/tile); a copy of the input image/tile is pre-loaded into each bank (e.g., as described above with respect to the second access mode); a PCU 1000 generates a series of vectors of flattened addresses of transformed input pixel coordinates; and the series of vectors of flattened input pixel addresses are written to the vector FIFO 1106 and subsequently provided to the RWAGL 1116, which uses them as a series of vectors of bank indexes. In such case, each flattened input pixel address is dependent upon the given affine transformation, e.g., degree of rotation and/or shrinking/stretching, such that the flattened input pixel addresses of input pixels to be gathered for adjacent output pixels may not be sequential. In this manner of parallelization, the vectors of varying-value bank indexes accommodated by the third access mode are used to gather vectors of input pixels from sparse locations within the pre-loaded copies of the input image/tile in the vector of banks 1122, and the gathered vectors of inputs pixels may be used to form a dense output image/tile. In the alternate parallelization embodiment (e.g., of FIGS. 19 and 20), switches 403 of the ALN are statically reconfigured to receive the series of vectors of flattened addresses of transformed input pixel coordinates generated by the PCU 1000 and to broadcast the series of vectors of flattened input pixel addresses to L different addr_PMUs using a third write form of the first access mode in order to write a copy of the series of vectors of flattened input pixel addresses into each of the L addr_PMUs, as described below with respect to the alternate parallelization embodiment of FIGS. 19 and 20. In the third write form of the first access mode, a write counter 1114 is statically reconfigured with an initial value of zero, a stride value of one, and a terminal value that is the size of the input image/tile divided by L.

In a fourth access mode, the RWAGL 1116 generates a scalar address to read a scalar data value from among the SPMs 1102. A statically reconfigured counter 1114 generates the scalar address, which the RWAGL 1116 may receive and generate to the SPMs 1102 to read the scalar data value. As described briefly above with respect to the third access mode, in the alternate parallelization embodiment of FIGS. 19 and 20 a copy of the series of vectors of flattened input pixel addresses is broadcast into each of the L addr_PMUs using the third write form of the first access mode. Each of the L addr_PMUs has an associated PMU number from zero to L−1. The read counter 1114 of each of the L addr_PMUs is statically reconfigured with an initial value that is the associated PMU number. The read counter 1114 of each of the L addr_PMUs is further statically reconfigured with a stride value of L, i.e., the number of PMUs 1100 into which a copy of the input image/tile is pre-loaded. The read counter 1114 of each of the L addr_PMUs is further statically reconfigured with a terminal value that is the size of the output image/tile. In this manner, each addr_PMU of the L addr_PMUs provides a series of scalar flattened input pixel addresses to its corresponding data_PMU of the L data_PMUs such that the L addr_PMUs together in parallel provide a series of L scalar flattened input pixel addresses to the L data_PMUs in which the L copies of the input image/tile have been pre-loaded as described above with respect to the first access mode. As a result, each of the scalar flattened input pixel addresses read from the L addr_PMUs using the fourth access mode is the scalar flattened address of an input pixel, and each of the input pixels is gathered to be an output pixel of the output image/tile. The L data_PMUs, operating in a fifth access mode that will now be described, use the series of L scalar flattened input pixel addresses provided by the L addr_PMUs to output the scalar addressed input pixels, which may be coalesced into input pixel vectors and used to form the output image/tile.

In a fifth access mode, similar to the fourth access mode, the RWAGL 1116 of each of the L data_PMUs generates a scalar address to read a scalar data value, which is an input pixel value, from among the SPMs 1102; however, the scalar address is provided to the RWAGL 1116 by a scalar FIFO 1106 that receives the scalar address, which is a scalar flattened input pixel address, from a corresponding addr_PMU, as described above with respect to the fourth access mode. The counter 1114 is statically reconfigured to count a number of times equal to the size of the output image/tile divided by L, e.g., with an initial value of zero, a stride value of one, and a terminal value that is the size of the output image/tile divided by L, or with a stride value of L, and a terminal value that is the size of the output image/tile. As described in more detail below with respect to the alternate parallelization embodiment, the multiple scalar input pixels read from the multiple data_PMUs may be coalesced by a tree of PCUs 1000 into a vector of input pixels for writing as a vector of output pixels to an output PMU 1100 (e.g., using the first access mode) to maintain full throughput while forming the output image/tile.

In summary, a PMU comprises a vector of scratchpad memory banks writable and readable by a PCU and/or one or more other PMUs. The configuration data loaded into the configuration stores determines in which of multiple access modes the address generation logic is statically reconfigured to access the vector of banks. Additionally, the configuration data may determine initial values, stride values, and terminal values of counters of the PMUs which may provide counts to the address generation logic. The counters may be employed as loop iterators. The counters may be chained together to accomplish loop nesting. The PMU includes a statically reconfigurable scalar addressing datapath to compute flattened addresses from the counters. The PMU may also receive a vector of addresses (e.g., computed by a PCU) for use in the first parallelization embodiment.

Figure 12:
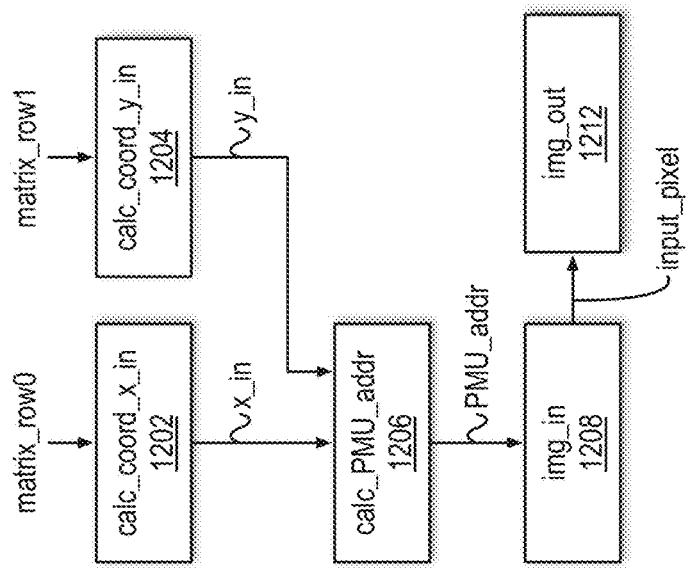
FIG. 12 is an example block diagram illustrating a SRDAP statically reconfigured to perform a 2-dimensional (2-D) affine transform on a 2-D input image to produce a 2-D output image.
Figure 13:
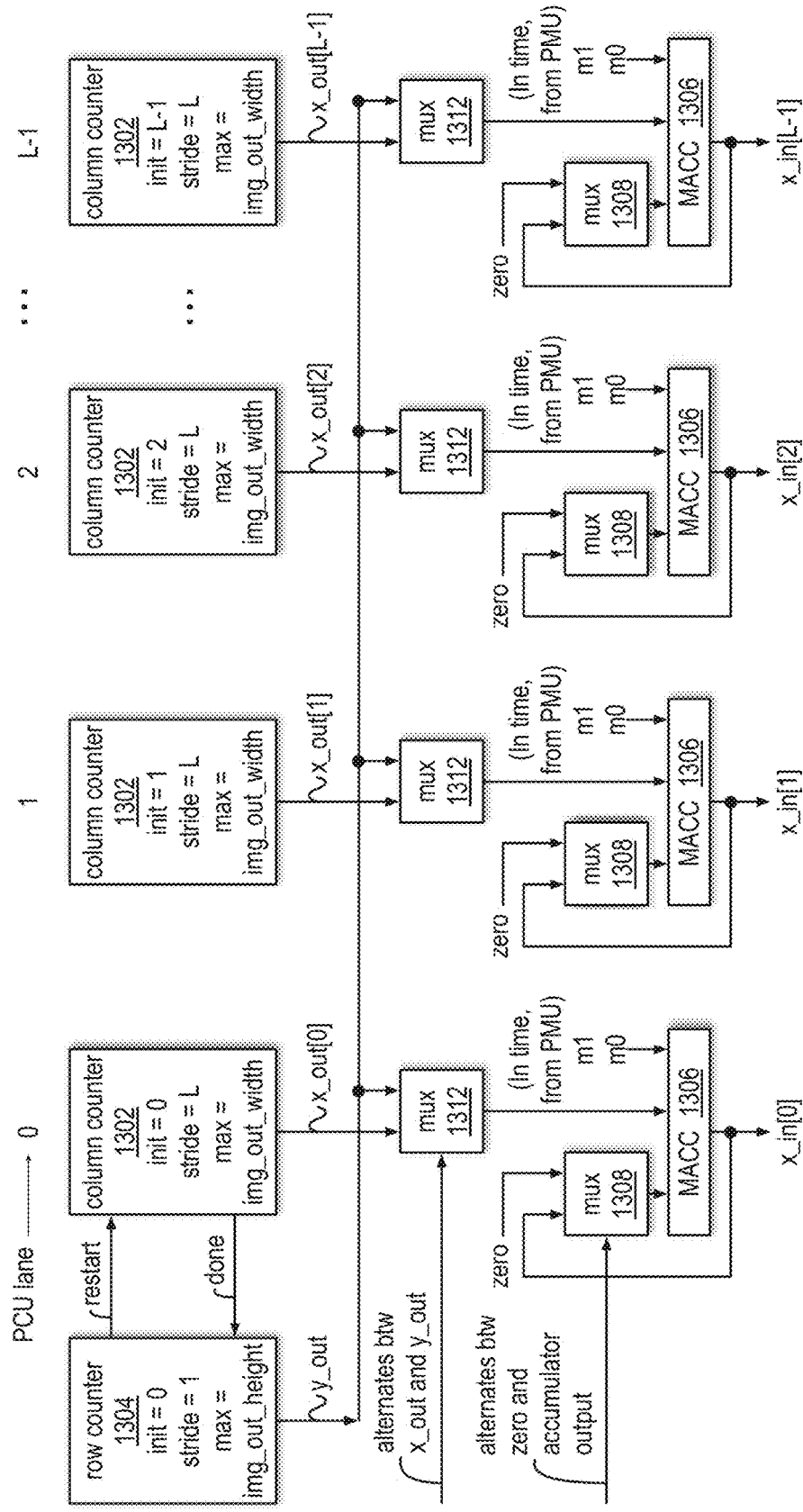
FIG. 13 is an example block diagram illustrating the calc_coord_x_in block of FIG. 12.

FIG. 12 is an example block diagram illustrating a SRDAP 1200 statically reconfigured to perform a 2-dimensional (2-D) affine transform on a 2-D input image to produce a 2-D output image in accordance with embodiments of the present disclosure. The 2-D affine transform is specified by a transform matrix, e.g., a 2-D matrix having elements m0 through m3 as shown in FIG. 13. The SRDAP 1200 includes PCUs (e.g., PCU 1000 of FIG. 10 or PCU 520 of FIG. 5), PMUs (e.g., PMU 1100 of FIG. 11 or PMU 510 of FIG. 5), and switches (e.g., S 403 of FIG. 4) that interconnect the PCUs and PMUs. The PCUs, PMUs and switches are statically reconfigured to perform the 2-D affine transform. More specifically, the PCUs, PMUs and switches include configuration stores (e.g., 402, 528, 1008, 1108 of FIGS. 4, 5, 10, 11, respectively) that may be loaded with configuration data to statically reconfigure the SRDAP 1200. The configuration data is loaded into the configuration stores prior to the flow of data through the SRDAP 1200 to perform the affine transformation on the input image, and the configuration data remains loaded in the configuration stores until the output image has been produced. The PCUs, PMUs, and switches include counters (e.g., 1014 and 1114 of FIGS. 10 and 11) that are statically reconfigured to accomplish loop iteration to perform the affine transformation. The counter values may provide a portion of the data that flows through the SRDAP 1200, e.g., output pixel coordinates, as described in more detail below.

In FIG. 12, five blocks are shown: calc_coord_x_in 1202, calc_coord_y_in 1204, calc_PMU_addr 1206, img_in 1208, and img_out 1212. Each block performs an operation and corresponds to one or more PCUs, one or more PMUs, one or more switches 403, one or more AGCUs, and/or combinations thereof. Generally, the calc_coord_x_in block 1202 receives a first row of the transform matrix and produces vectors of the x-coordinate of input pixels that are provided to the calc_PMU_addr block 1206. The first row of the transform matrix is referred to as matrix_row0 in FIG. 12 (e.g., elements m0 and m1 of FIG. 13). The vectors of the x-coordinate of input pixels are referred to as x_in in FIG. 12. Similarly, the calc_coord_y_in block 1204 receives a second row of the transform matrix and produces vectors of the y-coordinate of input pixels that are provided to the calc_PMU_addr block 1206. The second row of the transform matrix is referred to as matrix_row1 in FIG. 12 (e.g., elements m2 and m3 of FIG. 13). The vectors of the y-coordinate of input pixels are referred to as y_in in FIG. 12. The transform matrix elements may be held in a PMU that provides the rows of the elements to the calc_coord_x_in block 1202 and the calc_coord_y_in block 1204 in time, as described below. The calc_PMU_addr block 1206 uses the x_in and y_in vectors to produce vectors of addresses used to specify locations of input pixels within one or more PMUs of the img_in block 1208. The vectors of addresses are referred to as PMU_addr in FIG. 12. The img_in block 1208 provides vectors of input pixels (i.e., pixel values, as opposed to pixel coordinates) specified by the PMU_addr vectors to PMUs of the img_out block 1212. The vectors of input pixels are referred to as input_pixel in FIG. 12.

The calc_coord_x_in block 1202, an embodiment of which is described in more detail below with respect to FIG. 13, iterates over the output pixel coordinates, in a vector fashion, and applies the first row of the transform matrix to the coordinates of each output pixel to generate the x-coordinate of the corresponding input pixel used to form the output pixel. The calc_coord_y_in block 1204 performs a similar operation to the calc_coord_x_in block 1202 but applies the second row of the transform matrix to the coordinates of each output pixel to generate the y-coordinate of the corresponding input pixel used to form the output pixel, i.e., to generate the y_in vectors, rather than the x_in vectors. Advantageously, the calc_coord_x_in block 1202 and the calc_coord_y_in block 1204 are statically reconfigured as distinct groups of PCUs such that they operate in parallel to calculate x_in and y_in concurrently to facilitate full throughput of the dataflow through the SRDAP 1200, as described in more detail below.

The calculated x_in and yin values may be floating-point values that do not map perfectly to a single input pixel. That is, since each input pixel has integer coordinate values and since the calculated ordered pair (x_in[j], y_in[j]) of a given input pixel of the of an x_in vector and a yin vector may be floating-point values, the (x_in[j], y_in[j]) ordered pair may overlap, or touch, multiple input pixels, e.g., four input pixels. In an embodiment, the SRDAP 1200 is statically reconfigured to perform interpolation on values of the four touched input pixels to produce the corresponding output pixel value. In an embodiment, a stage of the calc_coord_x_in block 1202 (not shown) and the calc_coord_y_in block 1204 may perform a floor operation on each of the respective floating-point x_in[j] and y_in[j] values to generate respective integer x_in[j] and y_in[j] values.

Furthermore, some of the calculated (x_in[j], y_in[j]) values may lie outside the bounds of the input image. For example, visualize a square input image and a transform matrix that rotates the input image by 45 degrees without shrinking. Some of the calculated, i.e., rotated, input pixel coordinates (corresponding to a triangle of input pixels nearest each corner) will lie outside the bounds of the input image. In an embodiment, the SRDAP 1200 is statically reconfigured to perform bounds checking and padding. That is, the SRDAP 1200 is statically reconfigured to provide a pad value for the value of the input pixel with if the calculated coordinates and of the input pixel are outside the bounds of the input image.

The calc_PMU_addr block 1206, an embodiment of which is described in more detail below with respect to FIG. 15, flattens the 2-D (x_in, y_in) vectors into the PMU_addr vectors, which are vectors of flattened addresses, or linear (i.e., 1-dimensional) addresses, that may be used to read the input_pixel vectors from the img_in block 1208. Preferably, the input image is written into the img_in block 1208 in a linear fashion, e.g., in row major order.

The img_in block 1208 includes one or more PMUs that are pre-loaded with the input image. An embodiment of the img_in block 1208 is described in more detail below with respect to FIG. 15 that employs the second and third access modes described above with respect to FIG. 11 to accomplish parallelization. An alternate parallelization embodiment of the img_in block 1208 is described in more detail below with respect to FIGS. 19 and 20 that employs the first, fourth and fifth access modes described above with respect to FIG. 11. During operation of the SRDAP 1200 to perform the affine transform, the input_pixel vectors are read from the img_in block 1208 and written to the img_out block 1212. The img_out block 1212, an embodiment of which is described in more detail below with respect to FIG. 15, includes one or more PMUs to which the input_pixel vectors are written to form the output image.

Figure 15:
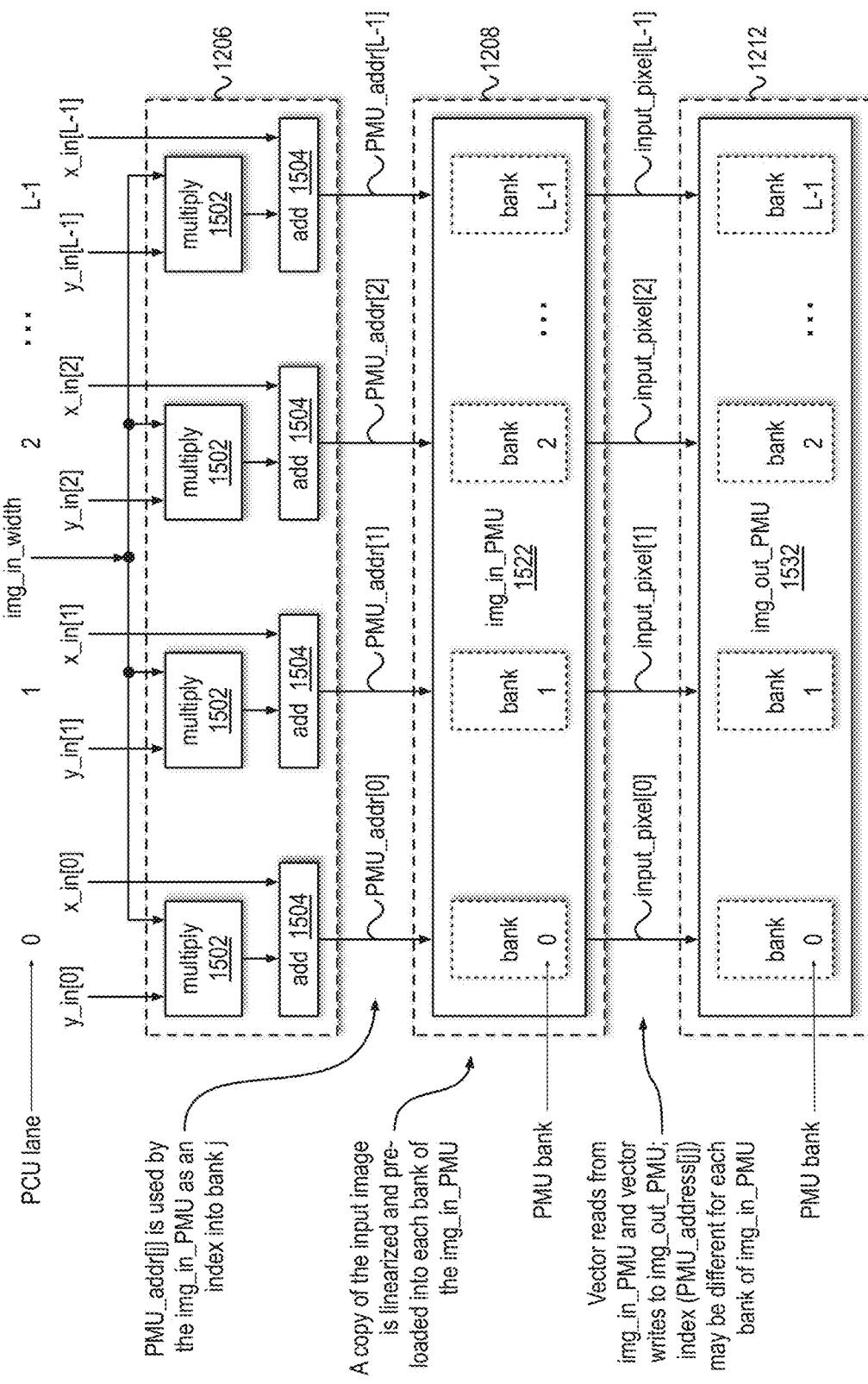
FIG. 15 is an example block diagram illustrating the calc_PMU_addr block, the img_in block, and the img_out block of FIG. 12.

In the parallelization embodiment of img_in block 1208 of FIG. 15, a copy of the input image is pre-loaded into each bank of the PMUs to support vector reads of the input_pixels in the presence of PMU_addr vectors that may be sparse, e.g., the individual flattened addresses of the PMU_addr vectors may be non-sequential. In the alternate parallelization embodiment of FIGS. 19 and 20, the img_in block 1208 may include one or more addr_PMUs holding copies of the PMU_addr vectors, one or more data_PMUs holding copies of the input image each of which receives a scalar address of PMU_addr vectors from a corresponding addr_PMU and in response provides a scalar input pixel value, and a coalescing tree of PCUs that receives the scalar input pixel values from the data_PMUs and coalesces the scalar input pixel values into the input_pixel vectors. The alternate parallelization embodiment, like the embodiment of FIG. 15, advantageously enables the dataflow through the SRDAP 1200 to run at full throughput, even though a dense iteration of the output image coordinate space may yield a sparse iteration of the input image coordinate space.

The input pixel values may be, for example, RGBA components that specify an intensity for each of red (R), blue (B), and green (G) colors, and the alpha (A) value may be employed for various functions, although other embodiments of the pixel value representations are contemplated. In an embodiment, the input pixels are floating-point values between 0 and 1.0. In another embodiment, the pixel values may represent voltages. In an embodiment, the img_in block 1208 may receive the input image from host memory 190 of FIG. 1 via memory interface 339 and one or more switches (e.g., 311-316 of FIG. 3) and one or more AGCUs/MAGCUs of FIG. 3. In the examples described, the output image is written to the img_out block 1212 in row major order such that adjacent pixels in the x-dimension lie in adjacent locations in a PMU 1100, i.e., in adjacent PMU banks.

The term "statically reconfigurable" with reference to a statically reconfigurable dataflow architecture processor (SRDAP) in the context of the present disclosure means that the configuration stores are loaded with configuration data prior to initiation of the flow of data, i.e., prior to commencement of generation of output pixel coordinates by statically reconfigurable counters, through the vector pipeline and that the configuration stores are not loaded with new configuration data until the processed data has finished flowing through the vector pipeline, i.e., the output image has been produced. The term "statically reconfigurable" with respect to a SRDAP may be further clarified by contrast with a central processing unit (CPU) or graphics processing unit (GPU) that fetches a stream of instructions that dynamically configures the execution pipelines of the CPU/GPU as each instruction of an instruction stream is executed. For example, for each CPU/GPU instruction: the source operand address fields configure multiplexers to determine which registers of the general purpose register file provide source operands to the execution pipeline, the destination operand address field configures a de-multiplexer to determine which register of the general purpose register file receives the result of the execution pipeline, and the opcode specifies which arithmetic or logical operation functional units of the execution pipeline will perform on the source operands to generate the result. In this manner, as the CPU/GPU executes the stream of instructions, the instructions dynamically configure the CPU/GPU. In contrast, the SRDAP does not fetch instructions. As a result, the SRDAP is not dynamically configured but is instead statically reconfigured. Advantageously, the SRDAP does not incur the overhead associated with scheduling execution of instructions due to implicit dependencies of operands that are written to and read from a shared register file. Instead, the SRDAP is statically reconfigured to determine which of the pipeline registers receive the results of the functional units and which of the pipeline registers provide the results as source operands to downstream functional units. Further advantageously, the SRDAP does not incur instruction fetch overhead, e.g., from an instruction cache or system memory that a CPU/GPU incurs, which may at times result in starvation of the execution units of the CPU/GPU for instructions.

In an embodiment, high-level program code that is suitable for parallel processing, developed on an Application Platform 910 as described above with respect to FIG. 9, for example, may be provided as input, along with a Hardware description 915 and optionally with power user assembly language code (e.g., RAIL code), to the Compiler 920 to generate a Configuration file, e.g., a PEF, that includes configuration data for loading into configuration registers of the SRDAP to statically reconfigure the SRDAP to perform an N-D image affine transformation. An example of the high-level program code may be written in the Spatial language as described in Koeplinger et al., "Spatial: A Language and Compiler for Application Accelerators," *Proceedings of the 39th ACM SIGPLAN Conference on Programming Language Design and Implementation* (PLDI), *Proceedings of the 43rd International Symposium on Computer Architecture*, 2018, which is incorporated by reference for all purposes. To perform the N-D image affine transformation, the Compiler 920 (e.g., PNR 925) may translate and map logical PCUs and PMUs to spatially statically reconfigure sets of PCUs and PMUs, examples of which are described below, to facilitate dataflow through the SRDAP. To perform the N-D image affine transformation, the Compiler 920 may also generate configuration data to statically reconfigure, ALN switches, AGCUs, and TLN switches of the SRDAP, as well as control blocks and counters of the PCUs, PMUs, ALN switches, AGCUs, and TLN switches, as well as address generation logic of the PMUs, as well as functional units and pipeline registers of the PCUs.

FIG. 13 is an example block diagram illustrating the calc_coord_x_in block 1202 of FIG. 12 in accordance with embodiments of the present disclosure. The calc_coord_x_in block 1202 includes a row counter 1304 and a vector pipeline (e.g., 1022 of FIG. 10) of L PCU lanes denoted 0 through L−1. The L PCU lanes operate together in parallel to, along with the row counter 1304, iterate over the coordinates of each output pixel of the output image and transform each output pixel coordinate into an input pixel coordinate, or more specifically into the x-coordinate of an input pixel. In an embodiment, the L PCU lanes comprise a set of one or more spatially statically reconfigured PCUs 1000, i.e., statically reconfigured to operate in parallel.

Each PCU lane includes a column counter 1302, a first 2-input mux 1312, a second 2-input mux 1308, and a functional unit (e.g., FU 1004 of FIG. 10) statically reconfigured to perform a multiply-accumulate (MACC) operation shown as MACC 1306. The number of PCU lanes L may be determined by the compiler 920 of FIG. 9 that generates the PEF file used to statically reconfigure the width of the calc_coord_x_in block 1202 of the SRDAP 1200. L may be the number of lanes of a single PCU 1000, or L may be the number of lanes of multiple PCUs 1000 statically reconfigured side-by-side in parallel. The L PCU lanes together generate the x_in vectors of FIG. 12, i.e., the vectors of the input pixel x-coordinates. As stated in FIG. 13, the calc_coord_y_in block 1204 of FIG. 12 comprises a set of one or more PCUs 1000 similar to those of the calc_coord_x_in block 1202, but that receive the second row of the transform matrix (e.g., elements m2 and m3) in time into the MACCs 1306, rather than the first row, and that calculate the y_in vectors of FIG. 12, i.e., vectors of y-coordinates of input pixels, rather than the x_in vectors.

The row counter 1304 is statically reconfigured with an initial value of zero, a stride of one, and a maximum value of the height of the output image, referred to as img_out_height. The row counter 1304, using its statically reconfigured values, iterates over the y-dimension of the output image to generate a y_out value that is provided as one of the two inputs to each of the L first muxes 1312. The y_out value provided to a given first mux 1312, being the y-coordinate of a given output pixel, is referred to as y_out[j]. The term y_out is also used to refer to the L-vector comprising the output of the row counter 1304, y_out, that is provided to each of the L first muxes 1312. Each of the y_out[j] values within a given y_out vector is the same, being generated by the row counter 1304 on a given clock cycle and provided to each of the first muxes 1312.

Each column counter 1302 is statically reconfigured with an initial value equal to its lane, i.e., 0 for lane 0, 1 for lane 1, and so forth to L−1 for lane L−1. Each column counter 1302 is statically reconfigured with a stride value of L and a maximum value of img_out_width, which is the width of the output image. The column counters 1302 are statically reconfigured to autonomously increment every other clock cycle once started. The column counters 1302, using their statically reconfigured values, collectively iterate over the x-dimension of the output image to generate the x-coordinate x_out[j] of each output pixel of the output image. In FIG. 13, the x_out[j] output by the column counter 1302 of lanes 0 through L−1 are shown as x_out[0], x_out[1], x_out[2] through x_out[L−1] that are provided as the other of the two inputs to each of the first muxes 1312 and that are referred to collectively as a vector x_out.

The control block 1012 (not shown, e.g., of FIG. 10) is statically reconfigured to control the muxes 1312 to alternate between selecting the x_out and y_out inputs and to control the muxes 1308 to alternate between selecting a zero value on one input and the output of the MACC 1306 on the other input. The output of the MACC 1306 is x_in[j], i.e., the x-coordinate, within the x_in vector, of an individual input pixel. When the column counter 1302 reaches its maximum value, i.e., when the column counter 1302 has iterated img_out_width divided by L times, the column counter 1302 generates a done signal to the row counter 1304. In response, the row counter 1304 increments the y_out value and generates a restart signal to the column counters 1302, in response to which the column counters 1302 iterate again over the x-coordinate values of the output image. In this manner, the row counter 1304 and the column counters 1302 are statically reconfigured to operate together to generate each of the img_out_width by img_out_height possible output pixel (x, y) coordinates of the output image and to provide the output pixel coordinates as vectors over time to the muxes 1312.

The MACC 1306 receives the output of mux 1308 and the output of mux 1312. The MACC 1306 also receives in-time in an alternating fashion the elements of the transform matrix, i.e., m0 and m1. Thus, over two consecutive clock cycles, the MACC 1306 multiplies its respective x_out[j] value by m0 and accumulates a first product with zero into the accumulator, then multiplies y_out[j] by m1 and accumulates a second product with the first product into the accumulator to produce x_in[j]=m0*x_out[j]+m1*y_out[j]. That is, over the two consecutive clock cycles, the MACC 1306 performs a dot-product of the first row of the transform matrix (m0, m1) and the output pixel coordinates (x_out[j], y_out[j]) to calculate the input pixel x-coordinate x_in[j]. In this manner, every other clock cycle, the calc_coord_x_in block 1202 produces a vector x_in of the x-coordinate of L input pixels transformed from L output pixel coordinates (x_out, y_out). FIG. 14 illustrates operation of the calc_coord_x_in block 1202 for an example output image size and statically reconfigured value of L. As explained above, every other clock cycle in parallel with the generation of an x_in by calc_coord_x_in block 1202, the calc_coord_y_in block 1204 produces a vector yin of the y-coordinate of L input pixels transformed from L output pixel coordinates (x_out, y_out). Thus, the calc_coord_x_in block 1202 and the calc_coord_y_in block 1204 each internally generate a vector of L output pixel coordinates (x_out, y_out) and together transform the L output pixel coordinates (x_out, y_out) into a vector of L input pixel coordinates (x_in, y_in) at a throughput of one every other clock cycle. More specifically, the calc_coord_x_in block 1202 and calc_coord_y_in block 1204 are statically reconfigured to generate a series of K x_in and yin vectors, respectively, where K is img_out_width*img_out_height/L. In an embodiment, the elements of the transform matrix are provided in-time to the calc_coord_x_in block 1202 and to the calc_coord_y_in block 1204 from PMUs 1100.

In an embodiment in which the transform matrix includes a third column (e.g., for achieving a translation), i.e., in which each row of the transform matrix includes a third element, the third element is provided in-time as an input to the MACC 1306 on a third clock cycle after the m0 and m1 elements, the muxes 1312 are statically reconfigured to provide a unity value every third clock cycle, the muxes 1308 are statically reconfigured to select the zero value on the first clock cycle and to select the accumulator output on the second and third clock cycles, and the column counters 1302 are statically reconfigured to autonomously increment every third clock cycle once started. The unity value corresponds to a third element of the output pixel coordinate vector. In such an embodiment, the calc_coord_x_in block 1202 and the calc_coord_y_in block 1204 each internally generate a vector of L output pixel coordinates (x_out, y_out, 1) and together transform (x_out, y_out, 1) into a vector of L input pixel coordinates (x_in, y_in) at a throughput of one every third clock cycle.

As may be observed from the description of the the calc_coord_x_in block 1202 of FIG. 13 (as well as the descriptions below of the calc_coord_x_in3 block 1602 of FIG. 17 and the calc_coord_global_x_in block 2102 of FIG. 22), unlike counter values that may be stored in GPRs of a CPU/GPU implementation that are subject to instruction dependencies and concomitant instruction scheduling, advantageously the statically reconfigured column counters 1302 of the statically reconfigured PCUs autonomously count/increment rather than being read, modified, and written by fetched instructions of a conventional CPU/GPU implementation. The absence of instruction dependencies and instruction scheduling of the described SRDAP embodiments may result in significantly higher throughput relative to a conventional CPU/GPU implementation. Similarly, other counters of the SRDAP such as the counters of the PMUs that are used to accomplish the various access modes, and counters of witches and AGCUs may count without the overheads of instruction dependencies or instruction scheduling, which may result in significantly higher throughput relative to a CPU/GPU implementation.

FIG. 14 is an example timing diagram illustrating the operation of the calc_coord_x_in block 1202 of FIG. 13 in accordance with embodiments of the present disclosure. In the example of FIG. 14, assume that the img_out_width is 128 pixels and the img_out_height is 64 pixels for a total of 8192 output pixels. In the example of FIG. 14, also assume that L is 64, e.g., four PCUs 1000 are statically reconfigured together spatially, i.e., in parallel, each PCU 1000 statically reconfigured as 16 lanes. Given the assumed values, the calc_coord_x_in block 1202 calculates 8,192 x_in[j] values in 256 clock cycles, as shown. More specifically, the 8,192 x_in[j] values are generated as 128 different x_in vectors of 64 individual x_in[j] values. Each vector of 64 individual x_in[j] values is also referred to as a 64-vector. During the same 256 clock cycles, the calc_coord_y_in block 1204 calculates the 8,192 y_in[j] values as 128 different y_in vectors of 64-vectors of 64 individual y_in[j] values. Each column shows the MACC 1306 accumulator value, i.e., x_in[j] for a given PCU 1000 lane. Accumulator values for lanes 0, j, and 63 are shown. Each row shows the MACC 1306 accumulator values in a given clock cycle for lanes 0, j, and 63. In FIG. 14, the accumulator values are shown for row 0, row 1, and row 63 of the output image. Representative example values shown in FIG. 14 include: clock 0, lane j=m0*j; clock 1, lane 63 is m0*63+m1*0, which is the x_in[j] value generated from the output pixel coordinates (63, 0); clock 7, lane j is m0*(j+L)+m1*1, which is the x_in[j] value generated from the output pixel coordinates (j+L, 1); clock 253, lane 0 is m0*0+m1*64, which is the x_in[j] value generated from the output pixel coordinates (0, 64); and clock 255, lane 63 is m0*127+m1*63, which is the x_in[j] value generated from the output pixel coordinates (127, 63).

Because in the example the img_out_width is 128 pixels and L is 64, a single row of the output image is iterated over in four clock cycles. That is, each pair of clock cycles the calc_coord_x_in block 1202 generates the x_in vector for half a row of output pixels of the output image. In an embodiment in which the L is 32 rather than 64, for example, each pair of clock cycles the calc_coord_x_in block 1202 generates the x_in vector for one-fourth a row of output pixels of the output image, and a single row of the output image is iterated over in eight clock cycles. Generally speaking, embodiments of the SRDAP described herein are capable of maintaining a throughput of one L-vector of input pixel coordinates generated per N clock cycles, one L-vector of PMU addresses generated per N clock cycles (as described below), and one L-vector of input pixels written to the output PMUs per N clock cycles (as described below), where N is the number of dimensions of the output/input image (or per N+1 clock cycles in the case that the affine transform includes a translation as described above).

FIG. 15 is an example block diagram illustrating the calc_PMU_addr block 1206, the img_in block 1208, and the img_out block 1212 of FIG. 12 in accordance with embodiments of the present disclosure. The calc_PMU_addr block 1206 comprises L lanes of a statically reconfigured PCU 1000 shown in the upper portion of FIG. 15. In an embodiment, the L PCU lanes comprise a set of one or more spatially statically reconfigured PCUs 1000. The img_in block 1208 comprises an img_in_PMU 1522 shown in the middle portion of FIG. 15 as L banks corresponding to the L PCU lanes. In an embodiment, the L img_in_PMU banks comprise a set of one or more spatially statically reconfigured PMUs 1100. The img_out block 1212 comprises an img_out_PMU 1532 shown in the bottom portion of FIG. 15 as L banks corresponding to the L PCU lanes. In an embodiment, the L img_out_PMU banks comprise a set of one or more spatially statically reconfigured PMUs 1100.

Each lane of the L lanes includes a functional unit (e.g., FU 1004 of FIG. 10) statically reconfigured as a multiply block 1502 and a FU statically reconfigured as an add block 1504. The L lanes correspond to the L lanes of the calc_coord_x_in block 1202 and the calc_coord_y_in block 1204. More specifically, one input of the multiply block 1502 of each lane receives an input pixel y-coordinate y_in[j] generated by the corresponding lane of the calc_coord_y_in block 1204, and one input of the add block 1504 of each lane receives input pixel x-coordinate x_in[j] generated by the corresponding lane of the calc_coord_x_in block 1202. The other input of the multiply block 1502 receives the width of the input image, referred to as img_in_width. The other input of the add block 1504 receives the output of the multiply block 1502, i.e., the product of the img_in_width and y_in[j]. Thus, the vector pipeline (e.g., 1022 of FIG. 10) of multiply blocks 1502 and add blocks 1504 generates an L-vector PMU_addr=y_in*img_in_width+x_in, which is a vector of flattened addresses generated from the vector of input pixel coordinates (x_in, y_in) generated by the calc_coord_x_in block 1202 and the calc_coord_y_in block 1204. More specifically, the calc_PMU_addr block 1206 is statically reconfigured to generate a series of K PMU_addr L-vectors, where K is img_out_width*img_out_height/L.

As indicated in FIG. 15, a copy of the input image is linearized and pre-loaded into each bank of the img_in_PMU 1522 prior to commencement of reads of input pixels from the img_in_PMU 1522, e.g., operating according to the second access mode as described above with respect to FIG. 11. As further indicated in FIG. 15, each PMU_addr[j] received by the img_in_PMU 1522 is used as an index in a corresponding bank j such that a different input pixel of the input image may be read from each bank in parallel. That is, the img_in_PMU 1522 operates in the third access mode as described above with respect to FIG. 11 such that the L bank index values specified by the L PMU_addrs are independent of one another and may all be different, i.e., they do not necessarily specify the same index with each bank, thereby facilitating data-dependent reads from the img_in_PMU to accommodate different affine transforms. As each PMU_addr L-vector of the series of K PMU_addr L-vectors is received into the img_in_PMU 1522 (e.g., into FIFO 1106 of FIG. 11), the vector of banks 1122 is accessed with the PMU_addr L-vector to read out an input_pixel vector, shown in FIG. 15 as individual input pixels input_pixel[0], input_pixel[1], input_pixel[2], through input_pixel[L−1] provided by corresponding banks of the L banks. In this manner, a series of K input_pixel vectors is read out of the img_in_PMU 1522.

As each input_pixel vector of the series of K input_pixel vectors is received into the img_out_PMU 1532 (e.g., into FIFO 1106 of FIG. 11), the input_pixel vector is written to the vector of banks 1122 of the img_out_PMU 1532 in the row specified by the statically reconfigured counter 1114. That is, according to operation of the first write form of the first access mode as described above with respect to FIG. 11, the series of K input_pixel vectors become a series of K vectors of output pixels written to the img_out_PMU 1532 such that the output image is formed in the img_out_PMU 1532. Once the output image is formed in the img_out_PMU 1532, the img_out_PMU 1532 signals to other elements of the SRDAP (e.g., AGCU) to store the output image, e.g., to host memory 190.

Although FIGS. 12-15 describe an SRDAP 1200 that is statically reconfigured to perform a 2-D affine transform on a 2-D input image to produce a 2-D output image, the static reconfigurability of the SRDAP 1200 may be extended to higher dimension (N) affine transforms on corresponding higher dimension input images to produce corresponding higher dimension output images. Embodiments will now be described of an SRDAP that is statically reconfigured to perform a 3-dimensional (3-D) affine transform on a 3-D input image to produce a 3-D output image, and embodiments are contemplated in which an SRDAP is statically reconfigured to perform an N-dimensional (N-D) affine transform on an N-D input image to produce an N-D output image, where N is 2, 3, 4 or greater.

Figure 16:
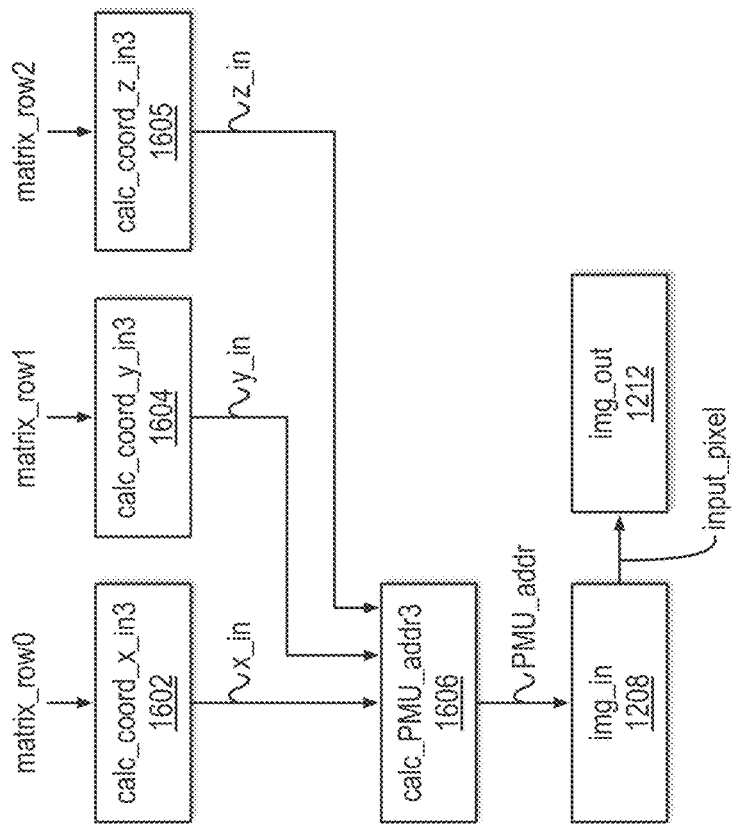
FIG. 16 is an example block diagram illustrating a SRDAP statically reconfigured to perform a 3-dimensional (3-D) affine transform on a 3-D input image to produce a 3-D output image.

FIG. 16 is an example block diagram illustrating a SRDAP 1600 statically reconfigured to perform a 3-dimensional (3-D) affine transform on a 3-D input image to produce a 3-D output image in accordance with embodiments of the present disclosure. The 3-D affine transform is specified by a transform matrix, e.g., a 3-D matrix having elements m0 through m8 as shown in FIG. 17. The SRDAP 1600 embodiment of FIG. 16 is similar in many respects to the SRDAP 1200 embodiment of FIG. 12. However, the SRDAP 1600 of FIG. 16 includes a calc_coord_x_in3 block 1602 and a calc_coord_y_in3 block 1604 that are similar to the calc_coord_x_in block 1202 and the calc_coord_y_in block 1204 of FIG. 12 but modified to perform a 3-D transform on 3-D output pixel coordinates. Additionally, the SRDAP 1600 of FIG. 16 includes a calc_PMU_addr block3 1606 similar to the calc_PMU_addr block 1206 of FIG. 15 but modified to generate flattened addresses from 3-D input pixel coordinates. Finally, the SRDAP 1600 of FIG. 16 also includes a calc_coord_z_in3 block 1605 that generates a z_in vector similar to the x_in and y_in vectors that is provided to the calc_PMU_addr3 block 1606. The calc_coord_x_in block3 1602 is described below with respect to FIG. 17, and the calc_PMU_addr3 block 1606 is described below with respect to FIG. 18.

Figure 17:
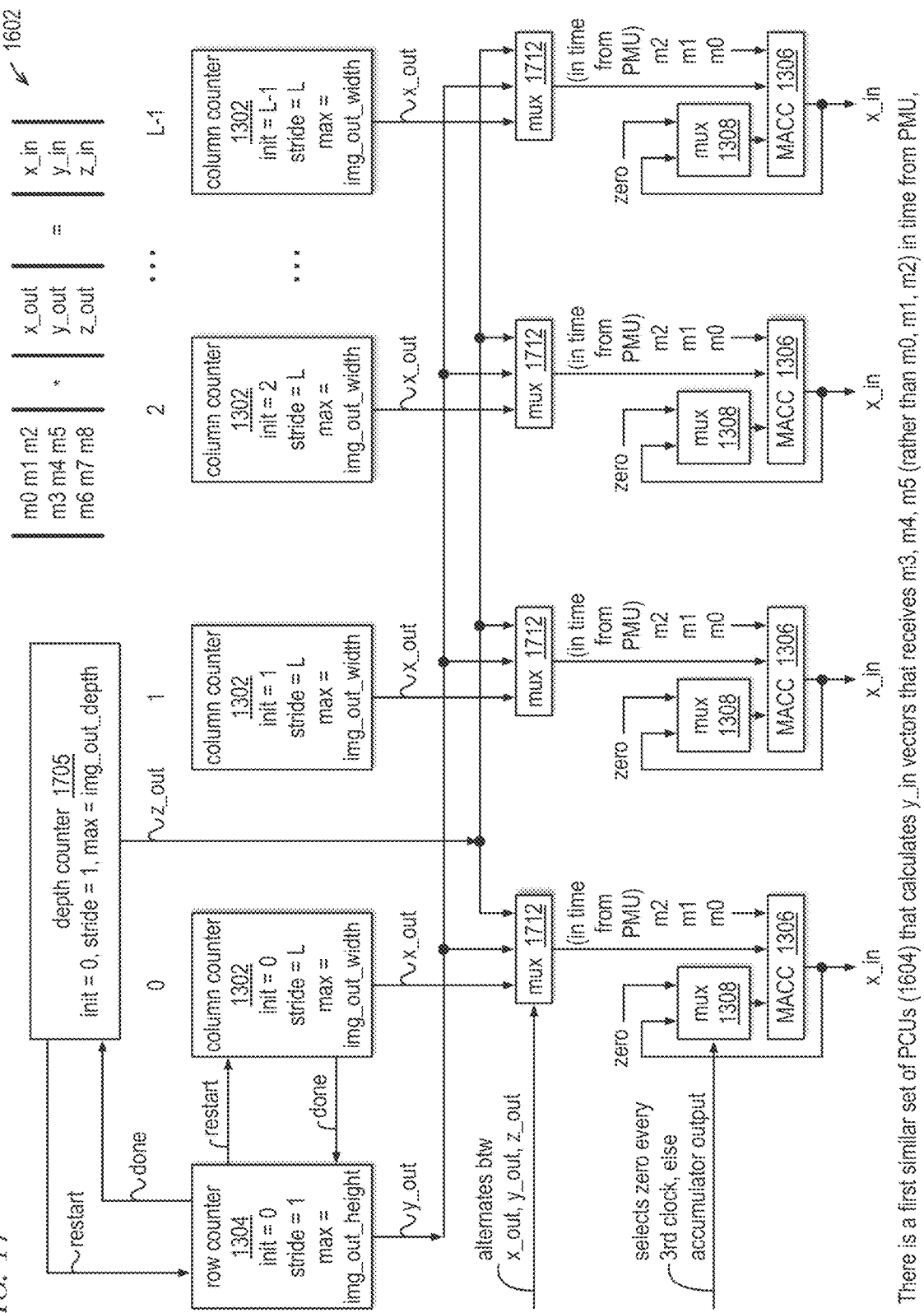
FIG. 17 is an example block diagram illustrating the calc_coord_x_in3 block of FIG. 16.

FIG. 17 is an example block diagram illustrating the calc_coord_x_in3 block 1602 of FIG. 16 in accordance with embodiments of the present disclosure. The calc_coord_x_in3 block 1602 is similar in many respects to the calc_coord_x_in block 1202 of FIG. 12. However, muxes 1312 of FIG. 12 are replaced with 3-input muxes 1712, and the calc_coord_x_in3 block 1602 also includes a depth counter 1705 that generates a z_out value that is provided to the third input of each of the muxes 1712. Additionally, FIG. 17 shows the 3-D affine transform matrix having elements m0 through m8 used to transform the vectors of 3-D output pixel coordinates x_out, y_out, and z_out into vectors of 3-D input pixel coordinates x_in, y_in, and z_in. As stated in FIG. 17, the calc_coord_y_in3 block 1604 of FIG. 16 comprises a set of one or more PCUs 1000 similar to those of the calc_coord_x_in3 block 1602, but that receive the second row of the transform matrix (e.g., elements m3, m4 and m5) in-time into the MACCs 1306, rather than the first row, and that calculate the y_in vectors of FIG. 16, i.e., vectors of y-coordinates of input pixels, rather than the x_in vectors; and the calc_coord_z_in3 block 1605 of FIG. 16 comprises a set of one or more PCUs 1000 similar to those of the calc_coord_x_in3 block 1602, but that receive the third row of the transform matrix (e.g., elements m6, m7 and m8) in-time into the MACCs 1306, rather than the first row, and that calculate the z_in vectors of FIG. 16, i.e., vectors of z-coordinates of input pixels, rather than the x_in vectors.

The depth counter 1705 is statically reconfigured with an initial value of zero, a stride of one, and a maximum value of the depth of the 3-D output image, referred to as img_out_depth. The depth counter 1705, using its statically reconfigured values, iterates over the z-dimension of the output image to generate a z_out value that is provided as one of the three inputs to each of the L muxes 1712. The z_out value provided to a given mux 1712, being the z-coordinate of a given output pixel, is referred to as z_out[j]. The term z_out is also used to refer to the L-vector comprising the output of the depth counter 1705, z_out, that is provided to each of the L muxes 1712. Each of the z_out[j] values within a given z_out vector is the same, being generated by the depth counter 1705 on a given clock cycle and provided to each of the muxes 1712.

Still further, the control block 1012 (not shown, e.g., of FIG. 10) is statically reconfigured to control the muxes 1712 to alternate between selecting the x_out, y_out, and z_out inputs and to control the muxes 1308 to select the zero value on a first clock cycle and to select the output of the MACC 1306 on second and third clock cycles. When the row counter 1304 reaches its maximum value, i.e., when the row counter 1304 has iterated img_out_height times, the row counter 1304 generates a done signal to the depth counter 1705. In response, the depth counter 1705 increments the z_out value and generates a restart signal to the row counter 1304, in response to which the row counter 1304 iterates again over the y-coordinate values of the output image. In this manner, the depth counter 1705 and the row counter 1304 and the column counters 1302 are statically reconfigured to operate together to generate each of the img_out_width by img_out_height possible output pixel (x, y, z) coordinates of the output image and to provide the output pixel coordinates as vectors overtime to the muxes 1312.

Finally, the MACC 1306 of FIG. 17 receives the output of mux 1308 and the output of mux 1712. The MACC 1306 also receives in-time in an alternating fashion the elements of the transform matrix, i.e., m0, m1, and m2. Thus, over three consecutive clock cycles, the MACC 1306 multiplies its respective x_out[j] value by m0 and accumulates a first product with zero into the accumulator, then multiplies y_out[j] by m1 and accumulates a second product with the first product into the accumulator, then multiplies z_out[j] by m2 and accumulates a third product with the first and products into the accumulator to produce x_in[j]=m0*x_out[j]+m1*y_out[j]+m2*z_out[j]. That is, over the three consecutive clock cycles, the MACC 1306 performs a dot-product of the first row of the transform matrix (m0, m1, m2) and the output pixel coordinates (x_out[j], y_out[j], z_out[j]) to calculate the input pixel x-coordinate x_in[j]. In this manner, every third clock cycle, the calc_coord_z_in3 block 1605 produces a vector x_in of the x-coordinate of L input pixels transformed from L output pixel coordinates (x_out, y_out, z_out). As explained above, every third clock cycle in parallel with the generation of an x_in by calc_coord_x_in3 block 1602, the calc_coord_y_in3 block 1604 produces a vector y_in of the y-coordinate of L input pixels transformed from L output pixel coordinates (x_out, y_out, z_out), and the calc_coord_z_in3 block 1605 produces a vector z_in of the z-coordinate of L input pixels transformed from L output pixel coordinates (x_out, y_out, z_out). Thus, the calc_coord_x_in3 block 1602, the calc_coord_y_in3 block 1604, and the calc_coord_z_in3 block 1605 each internally generate a vector of L output pixel coordinates (x_out, y_out, z_out) and together transform (x_out, y_out, z_out) into a vector of L input pixel coordinates (x_in, y_in, z_in) at a throughput of one every third clock cycle. In an embodiment, the elements of the transform matrix are provided in-time from PMUs 1100 to the calc_coord_x_in3 block 1602, to the calc_coord_y_in3 block 1604, and to the calc_coord_z_in3 block 1605.

Figure 18:
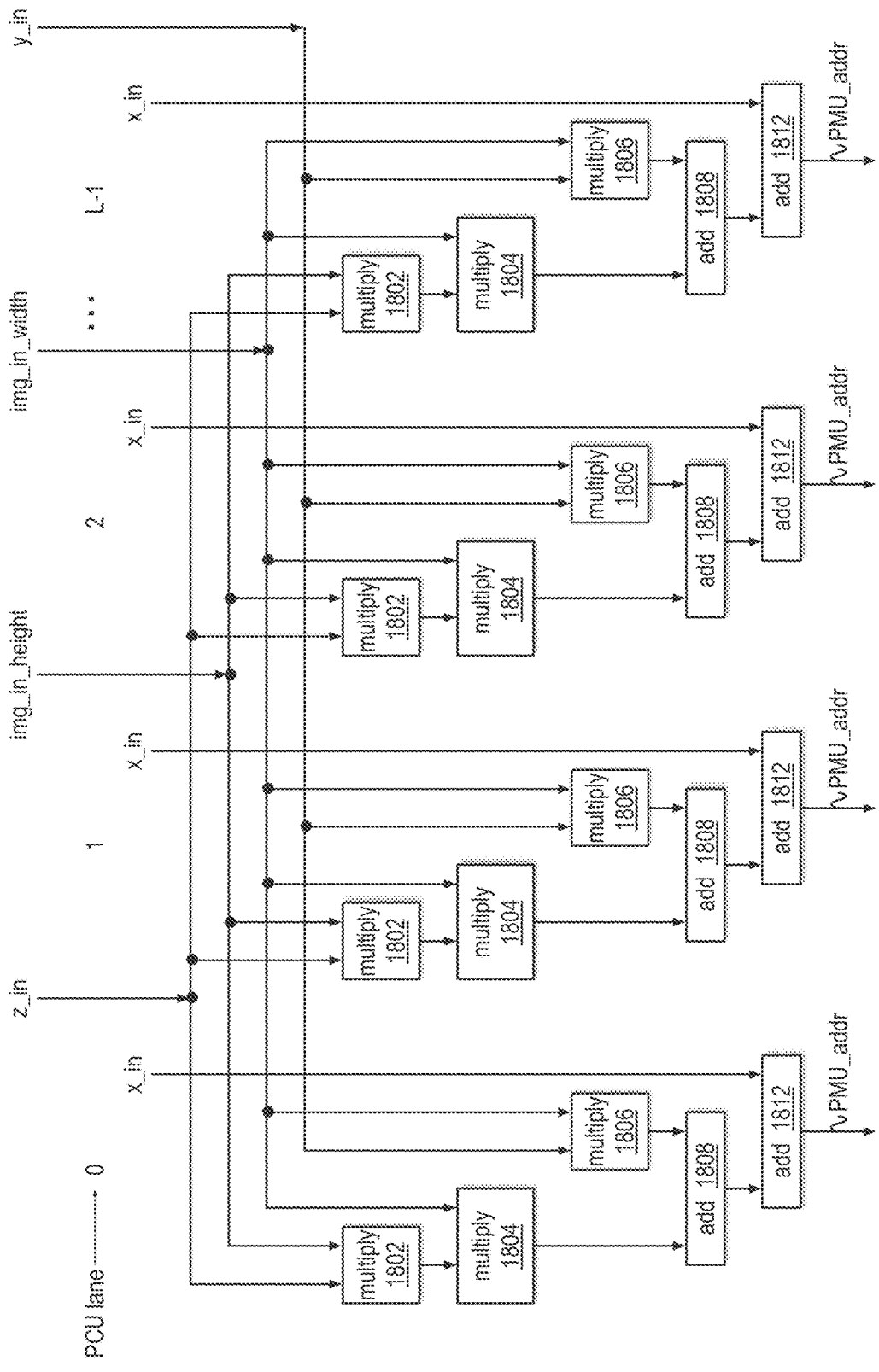
FIG. 18 is an example block diagram illustrating the calc_PMU_addr3 block of FIG. 16.

FIG. 18 is an example block diagram illustrating the calc_PMU_addr3 block 1606 of FIG. 16 in accordance with embodiments of the present disclosure. The calc_PMU_addr3 block 1606 is similar in some respects to the calc_PMU_addr block 1206 of FIG. 15 in that it comprises L lanes of a statically reconfigured PCU 1000. In an embodiment, the L PCU lanes comprise a set of one or more spatially statically reconfigured PCUs 1000. Each lane of the L lanes includes a functional unit (e.g., FU 1004 of FIG. 10) statically reconfigured as a first multiply block 1802, a FU statically reconfigured as a second multiply block 1804, a FU statically reconfigured as a third multiply block 1806, a FU statically reconfigured as a first add block 1808, and a FU statically reconfigured as a second add block 1812. The L lanes correspond to the L lanes of the calc_coord_x_in3 block 1602, the calc_coord_y_in3 block 1604, and the calc_coord_z_in3 block 1605.

One input of the first multiply block 1802 of each lane receives an input pixel z-coordinate z_in[j] generated by the corresponding lane of the calc_coord_z_in3 block 1605, and the other input of the first multiply block 1802 receives the height of the input image, referred to as img_in_height. One input of the second multiply block 1804 of each lane receives the output/product of the first multiply block 1802 of the lane, and the other input of the second multiply block 1804 receives the img_in_width. One input of the third multiply block 1806 of each lane receives an input pixel y-coordinate y_in[j] generated by the corresponding lane of the calc_coord_y_in3 block 1604, and the other input of the third multiply block 1806 receives the img_in_width. One input of the first add block 1808 of each lane receives the output/product of the second multiply block 1804 of the lane, and the other input of the first add block 1808 receives the output/product of the third multiply block 1806 of the lane. One input of the second add block 1812 of each lane receives the output/sum of the first add block 1808 of the lane, and the other input of the second add block 1812 receives the input pixel x-coordinate x_in[j] generated by the corresponding lane of the calc_coord_x_in3 block 1602. Thus, the vector pipeline (e.g., 1022 of FIG. 10) of multiply blocks 1802, 1804, and 1806 and add blocks 1808 and 1812 generates an L-vector PMU_addr=z_in*img_in_height*img_in_width+y_in*img_in_width+x_in, which is a vector of flattened addresses generated from the vector of input pixel coordinates (x_in, y_in, z_in) generated by the calc_coord_x_in3 block 1602, the calc_coord_y_in3 block 1604, and the calc_coord_z_in3 block 1605.

Similar to the manner described with respect to FIG. 15 (or to FIG. 19), the PMU_addr L-vector generated by the calc_PMU_addr3 block 1606 is received into the img_in block 1208 to access a vector of input_pixels that is written to the img_out block 1212 such that the output image is formed in the img_out block 1212. The term "dimension length" may be used generically to refer to the x-dimension width, the y-dimension height, the z-dimension depth and additional dimension quantities beyond three dimensions of an N-D output image, input image, output tile, or input tile. The image/tile dimension lengths are measured in units of a pixel. The output/input image/tile dimension lengths (e.g., img_in_width, img_in_height, img_in_depth, img_out_width, img_out_height, img_out_depth, tile_in_width, tile_in_height, tile_in_depth, tile_out_width, tile_out_height, tile_out_depth) may be provided to the compiler 920 that may generate configuration data to statically reconfigure the SRDAP for use as described herein.

Figure 19:
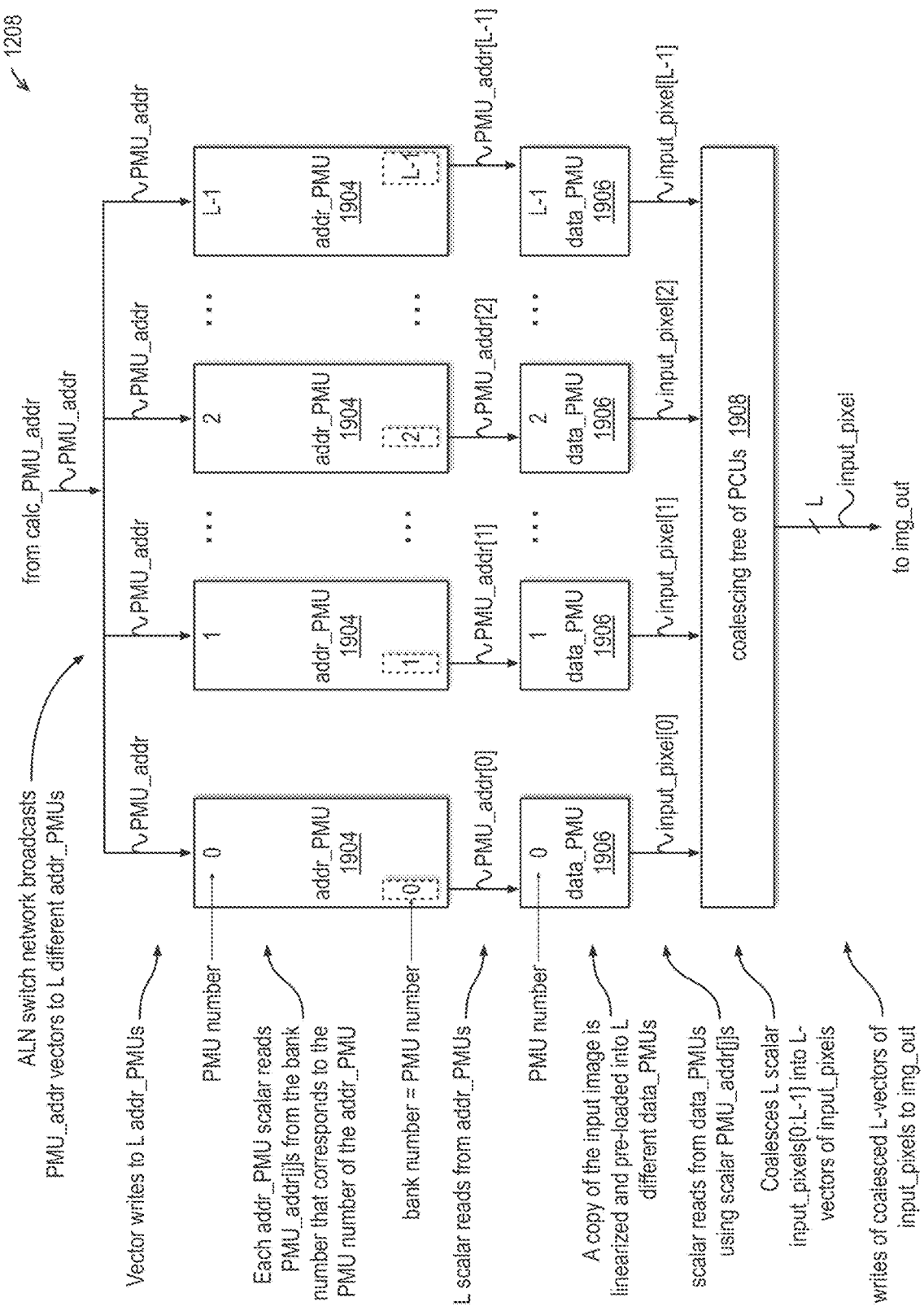
FIG. 19 is an example block diagram illustrating the img_in block of FIG. 12 in accordance with an alternate parallelization embodiment.

FIG. 19 is an example block diagram illustrating the img_in block 1208 of FIG. 12 in accordance with an alternate parallelization embodiment of the present disclosure. The img_in block 1208 of FIG. 19 includes L addr_PMUs 1904, L data_PMUs 1906, and a coalescing tree of PCUs 1908. Each addr_PMU 1904 and each data_PMU 1906 has a PMU number corresponding to one of the L PCU lanes of FIG. 13. The L PMU numbers 0 through L−1 are shown for the L addr_PMUs 1904 and L data_PMUs 1906 in FIG. 19, and the PMU number is referred to generally as "j" in FIG. 19. Like the img_in block 1208 embodiment of FIG. 15, the img_in block 1208 alternate parallelization embodiment of FIG. 19 generates L-vectors of input_pixels that are provided to the img_out block 1212. More specifically, the coalescing tree of PCUs 1908 generates the L-vectors of input_pixels in response to L input pixel scalars—i.e., scalar input_pixel[0] through scalar input_pixel[L−1]—provided by the L data_PMUs 1906, as described in more detail with respect to FIG. 20.

Switches 403 (not shown) of the ALN are statically reconfigured to receive the PMU_addr L-vectors from the calc_PMU_addr block 1206 and to broadcast the PMU_addrs to each of the addr_PMUs 1904 of the img_in block 1208. That is, each of the addr_PMUs 1904 performs a vector write of the received PMU_addr vector. More specifically, each addr_PMU 1904 is statically reconfigured according to the third write form of the first access mode (as described above with respect to FIG. 11 in the context of the third access mode) to write the series of K PMU_addr vectors generated by the calc_PMU_addrblock 1206 to K successive rows of the addr_PMU 1904, where K is img_out_width*img_out_height/L. In this manner, each of the L addr_PMUs 1904 receives a copy of the series of K PMU_addr vectors generated by the calc_PMU_addr block 1206.

Subsequent to a write of a PMU_addr vector to each of the addr_PMUs 1904, each addr_PMU 1904 performs a scalar read of a PMU_addr[j] of the written PMU_addr vector. More specifically, each addr_PMU 1904 is statically reconfigured according to the fourth access mode to read a scalar PMU_addr[j] from the bank whose bank number corresponds to the PMU number of the addr_PMU 1904, and the switches 403 of the ALN are statically reconfigured to provide the scalar PMU_addr[j] to the corresponding data_PMU[j] 1906. For example, addr_PMU[2] reads from its bank 2 and provides PMU_addr[2] to data_PMU[2], whereas addr_PMU[13] reads from its bank 13 and provides PMU_addr[13] to data_PMU[13]. In this manner, each addr_PMU[j] provides a series of K scalar PMU_addr[j] to data_PMU[j], through collectively the L addr_PMUs 1904 provide a series of K groups of L PMU_addr[j] scalars to the L data_PMUs 1906. In an embodiment, Q is the number of banks of each addr_PMU 1904 and data_PMU 1906, L is greater than Q, and the bank number corresponds to the PMU number modulo Q, i.e., bank number=j % Q. In an embodiment, each of the addr_PMUs 1904 is statically reconfigured to begin reading out a scalar PMU_addr[j] as the scalar PMU_addr[j] is written to addr_PMU 1904 in order to sustain full throughput. For example, each time the write counter 1114 counts to cause a write of a PMU_addr vector to the addr_PMU 1904, the control block 1112 may be statically reconfigured to trigger the read counter 1114 to count to cause a read of a PMU_addr[j] scalar from bank j of the addr_PMU 1904.

As shown, each of the L data_PMUs 1906 is statically reconfigured according to the second write form of the first access mode to pre-load a linearized copy of the input image, as described above with respect to FIG. 11. As each data_PMU[j] receives a scalar PMU_addr[j] from its corresponding addr_PMU[j], the data_PMU[j] performs a scalar read of an input_pixel[j] at the scalar PMU_addr[j] and outputs the scalar input_pixel[j] to the associated coalescing_PCU (e.g., a coalescing_PCU 2002 of PCU level 0 of FIG. 20) of the coalescing tree of PCUs 1908. More specifically, each addr_PMU[j] is statically reconfigured according to the fifth access mode to read a scalar input_pixel[j], and the switches 403 of the ALN are statically reconfigured to provide the scalar input_pixel[j] to the corresponding coalescing_PCU 2002. In this manner, each data_PMU[j] provides a series of K input_pixel[j] scalars to the coalescing tree of PCUs 1908, and collectively the L data_PMUs 1906 provide a series of K groups of L input_pixel[j] scalars to the coalescing tree of PCUs 1908. The coalescing tree of PCUs 1908 coalesces each group of L input_pixel[j] scalars of the series of K groups into an input_pixel L-vector for writing to the img_out block 1212, as described now with respect to FIG. 20.

Figure 20:
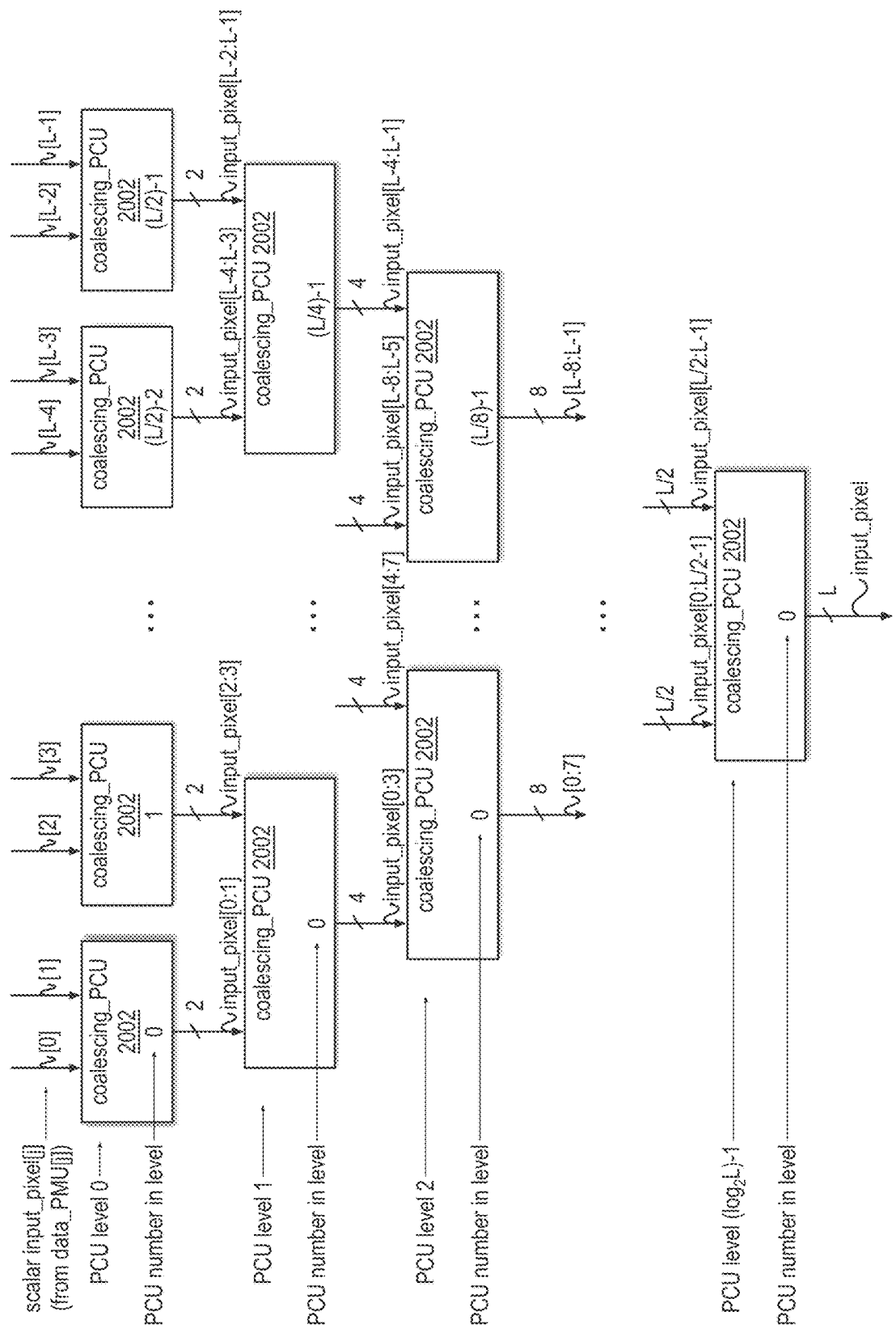
FIG. 20 is an example block diagram illustrating the coalescing tree of PCUs of FIG. 19.

FIG. 20 is an example block diagram illustrating the coalescing tree of PCUs 1908 of FIG. 19 in accordance with embodiments of the present disclosure. The coalescing tree of PCUs 1908 comprises $\log_2 L$ levels of coalescing_PCUs 2002, denoted levels 0 through $(\log_2 L)-1$, where L is the number of data_PMUs 1906 of the img_in block 1208 of FIG. 19. The number of coalescing_PCUs 2002 in a given level k is $L/2^{(k+1)}$. The number of each coalescing_PCU 2002 in each level is shown in FIG. 20 as 0 through $L/2^{(k+1)}-1$. Thus, level 0 includes PCU numbers 0 through (L/2)–1, level 1 includes PCU numbers 0 through (L/4)–1, level 2 includes PCU numbers 0 through (L/8)–1, and so forth to level $(\log_2 L)-1$ which includes PCU number 0, i.e., there is a single coalescing_PCU 2002 in level $(\log_2 L)-1$.

In level 0, each coalescing_PCU 2002 is statically reconfigured to receive two different and adjacent input_pixel[j] and input_pixel[j+1] scalars from two corresponding data_PMU[j] and data_PMU[j+1] of FIG. 19 and to coalesce them into a 2-vector input_pixel[j:j+1]. For example, coalescing_PCU[0] receives input_pixel[0] and input_pixel[1] from data_PMU[0] and data_PMU[1] and coalesces them into a 2-vector input_pixel[0:1], coalescing_PCU[1] receives input_pixel[2] and input_pixel[3] from data_PMU[2] and data_PMU[3] and coalesces them into a 2-vector input_pixel[2:3], and so forth through coalescing_PCU[(L/2)-1] receives input_pixel[L-2] and input_pixel[L-1] from data_PMU[L-2] and data_PMU[L-1] and coalesces them into a 2-vector input_pixel[L-2:L-1].

In level 1, each coalescing_PCU 2002 is statically reconfigured to receive two different and adjacent 2-vector input_pixel[j:j+1] and input_pixel[j+2:j+3] from two corresponding coalescing_PCUs 2002 of level 0 and to coalesce them into a 4-vector input_pixel[j:j+3]. For example, coalescing_PCU[0] receives input_pixel[0:1] and input_pixel[2:3] and coalesces them into a 4-vector input_pixel[0:3], coalescing_PCU[1] (not shown) receives input_pixel[4:5] and input_pixel[6:7] and coalesces them into a 4-vector input_pixel[4:7], and so forth through coalescing_PCU[(L/4)-1] receives input_pixel[L-4:L-3] and input_pixel[L-2:L-1] and coalesces them into a 4-vector input_pixel[L-4:L-1].

In level 2, each coalescing_PCU 2002 is statically reconfigured to receive two different and adjacent 4-vector input_pixel[j:j+3] and input_pixel[j+4:j+7] from two corresponding coalescing_PCUs 2002 of level 1 and to coalesce them into an 8-vector input_pixel[j:j+7]. For example, coalescing_PCU[0] receives input_pixel[0:3] and input_pixel[4:7] and coalesces them into an 8-vector input_pixel[0:7], coalescing_PCU[1] (not shown) receives input_pixel[8:11] and input_pixel[12:15] and coalesces them into an 8-vector input_pixel[8:15], and so forth through coalescing_PCU[(L/8)-1] receives input_pixel[L-8:L-5] and input_pixel[L-4:L-1] and coalesces them into an 8-vector input_pixel[L-8:L-1].

This pattern proceeds until finally in the last level $(\log_2 L)-1$, the single coalescing_PCU 2002 is statically reconfigured to receive two different and adjacent (L/2)-vector input_pixel[0:L/2-1] and input_pixel[L/2:L-1] from two corresponding coalescing_PCUs 2002 of level $(\log_2 L)-2$ and to coalesce them into the L-vector input_pixel.

The size of some input images may be too large to fit into a bank of a PMU 1100 (in the parallelization embodiment of FIG. 15) or into a data_PMU 1906 (in the alternate parallelization embodiment of FIG. 19). In such instances, embodiments are described in which the SRDAP is statically reconfigurable to perform the N-D image affine transformation in a tiled manner, or using tiling, in which the output image is subdivided into smaller N-D output tiles and the input image is subdivided into smaller N-D input tiles. Statically reconfigured counters iterate over the output image in each of the N dimensions by strides that are the respective N dimension lengths of the output tile to generate coordinates of base pixels of the output tiles. Given the base pixel of an output tile, the transform matrix is applied to the coordinates of corner pixels of each output tile—e.g., determined from the base pixel coordinates and the N dimension lengths of the output tile—to generate the coordinates of corresponding transformed corner pixels. The transformed corner pixel coordinates are used to determine the coordinates of a base pixel of the input tile, e.g., by taking the minimum coordinate value of each dimension. The coordinates of the input tile base pixel are flattened and used to load copies of the input tile into an input tile PMU, or into multiple input tile PMUs in the case of the alternate parallelization embodiment. The coordinates of pixels of each output tile are iteratively generated by other statically reconfigured counters, e.g., by column counters in a manner similar to that described above but with maximum values that are the N dimension lengths of the output tile rather than the N dimension lengths of the output image. The transform matrix is applied to the coordinates of the output pixels to generate input pixel coordinates, from which the coordinates of the base pixel of the input tile are subtracted to calculate input pixel coordinates that are local to the input tile. The local input pixel coordinates are flattened to generate addresses within the input tile PMUs from which the input pixels are gathered to form an output tile. The formed output tiles are combined to form the output image, e.g., in host memory. Tiling embodiments will now be described in more detail.

Figure 21:
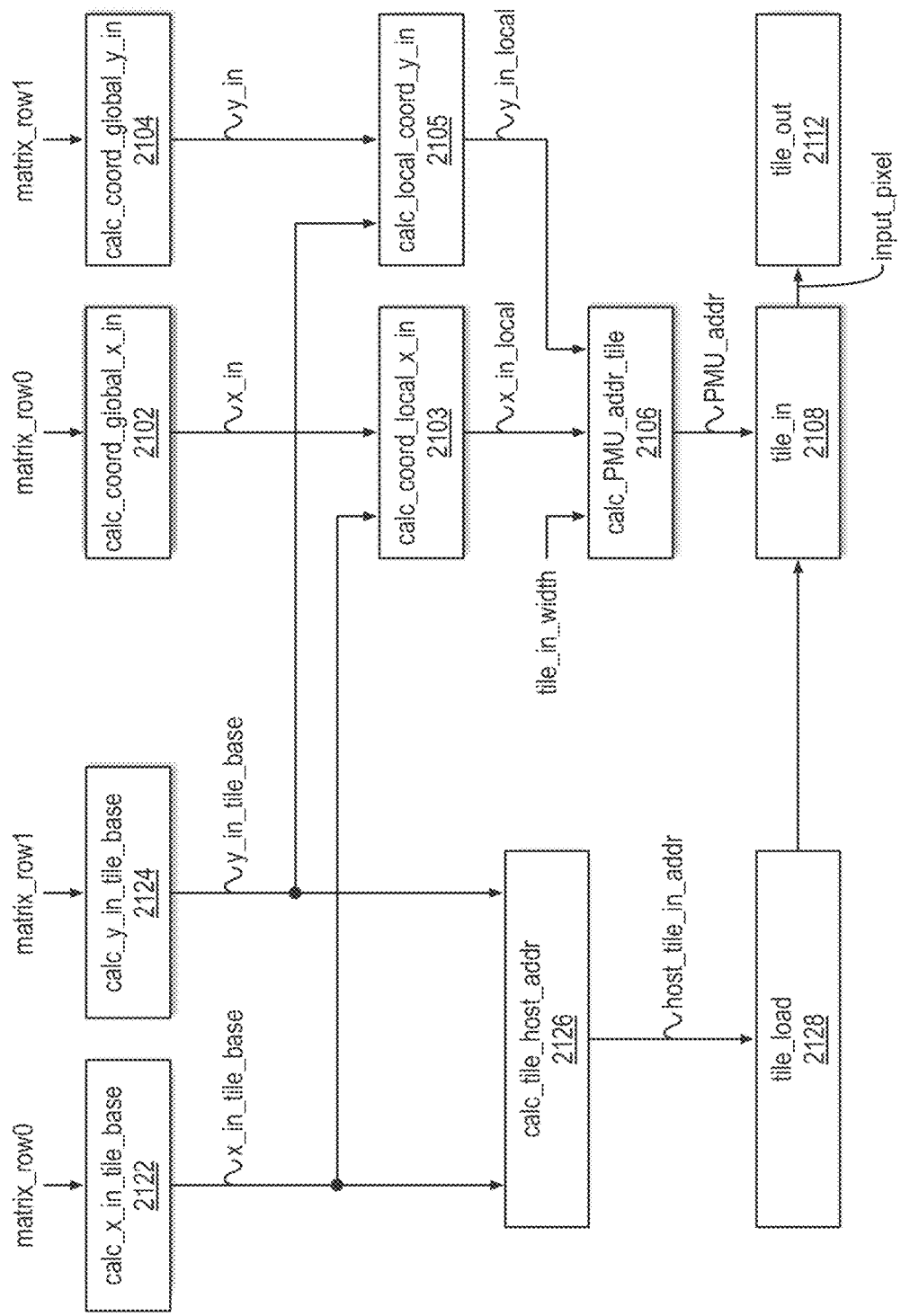
FIG. 21 is an example block diagram illustrating a SRDAP statically reconfigured to perform, in a tiled manner, a 2-dimensional (2-D) affine transform on a 2-D input image to produce a 2-D output image.

FIG. 21 is an example block diagram illustrating a SRDAP 2100 statically reconfigured to perform, in a tiled manner, a 2-dimensional (2-D) affine transform on a 2-D input image to produce a 2-D output image in accordance with embodiments of the present disclosure. In FIG. 21, the following blocks are shown: calc_coord_global_x_in 2102, calc_coord_global_y_in 2104, calc_coord_local_x_in 2103, calc_coord_local_y_in 2105, calc_PMU_addr_tile 2106, tile_in 2108, tile_out 2112, calc_x_in_tile_base 2122, calc_y_in_tile_base 2124, calc_tile_host_addr 2126, and tile_load 2128. Each block performs an operation and corresponds to one or more PCUs, one or more PMUs, one or more switches 403, one or more AGCUs, and/or combinations thereof. The blocks calc_coord_global_x_in 2102, calc_coord_global_y_in 2104, calc_coord_local_x_in 2103, calc_coord_local_y_in 2105, calc_PMU_addr_tile 2106, tile_in 2108, tile_out 2112, calc_x_in_tile_base 2122, and calc_y_in_tile_base 2124 are described in detail below with respect to FIGS. 22 through 25 but will broadly be described now.

The calc_coord_global_x_in block 2102 is statically reconfigured in many ways similarly to the calc_coord_x_in block 1202 of FIG. 12 in that it receives a first row of the transform matrix and produces vectors x_in of the x-coordinate of input pixels that are provided to the calc_coord_local_x_in block 2103. Similarly, the calc_coord_global_y_in block 2104 receives a second row of the transform matrix and produces vectors y_in of the y-coordinate of input pixels that are provided to the calc_coord_local_y_in block 2105. However, the calc_coord_global_x_in block 2102 and the calc_coord_global_y_in block 2104 iterate over each output tile to produce the x_in and y_in vectors, unlike the calc_coord_x_in block 1202 and the calc_coord_y_in block 1204 which iterate over the entire output image.

The calc_coord_local_x_in block 2103 is statically reconfigured to receive the x_in vectors and an x_in_tile_base from the calc_x_in_file_base block 2122 and to generate x_in_local vectors that are provided to the calc_

PMU_addr_file block 2106 and that specify the local x-coordinate within an input tile of input pixels. Similarly, the calc_coord_local_y_in block 2105 is statically reconfigured to receive the y_in vectors and a y_in_tile_base from the calc_y_in_tile_base block 2124 and generate y_in_local vectors that are provided to the calc_PMU_addr_tile block 2106 and that specify the local y-coordinate within an input tile of input pixels. The (x_in_tile_base, y_in_tile_base) are the coordinates of the base pixel of the current input tile. The (x_in_tile_base, y_in_tile_base) are global coordinates, i.e., they are relative to the base (or origin) pixel of the input image. The x_in vectors of FIG. 21 are also global input pixel x-coordinates that are relative to the x-coordinate of the base (or origin) pixel of the input image, in contrast to the x_in_local vectors that are local input pixel x-coordinates that are relative to the x-coordinate of the base pixel of the current input tile. Similarly, the y_in vectors of FIG. 21 are global input pixel y-coordinates that are relative to the y-coordinate of the base (or origin) pixel of the input image, in contrast to the y_in_local vectors that are local input pixel y-coordinates that are relative to the y-coordinate of a base pixel of the current input tile.

The calc_PMU_addr_tile block 2106 uses the x_in_local and y_in_local vectors along with a received tile_in_width to produce L-vectors of PMU_addrs used to specify locations of input pixels within one or more PMUs of the tile_in block 2108. The tile_in_width is the width of an input tile, and the tile_in_height is the height of an input tile. Given a set of output tile dimension lengths and a given transformation matrix, the largest possible input tile dimension lengths may be determined a priori by the programmer and provided to the compiler 920 that may generate configuration data to statically reconfigure the SRDAP to use the input tile dimension lengths. In an embodiment, the input tile dimension lengths are determined a priori to be a rectangle that bounds the shape that may result from a worst-case transformation of the output tile by the given transformation matrix. The tile_in block 2108 provides input_pixel vectors specified by the PMU_addr L-vectors to PMUs of the tile_out block 2112.

The calc_x_in_tile_base block 2122 receives the first row of the transform matrix and is statically reconfigured to produce x_in_tile_base that is provided to the calc_tile_host_addr block 2126. Similarly, the calc_y_in_tile_base block 2124 receives the second row of the transform matrix and is statically reconfigured to produce y_in_tile_base that is provided to the calc_tile_host_addr block 2126. The calc_x_in_tile_base block 2122 and calc_y_in_tile_base block 2124 provide the x_in_tile_base and y_in_tile_base prior to the loading of the next input tile described below with respect to FIG. 22.

The calc_tile_host_addr block 2126 receives and flattens the x_in_tile_base and the y_in_tile_base of the current input tile for use in generating a linear offset of the current input tile within the input image in host memory 190, host_tile_in_addr, that is provided to the tile_load block 2128. The tile_load block 2128 (e.g., statically reconfigured AGCU and switches 403) uses the linear offset to read the input tile from host memory 190 and to write it to the tile_in block 2108, e.g., to the tile_in_PMU 2422 of FIG. 24 in which a copy is broadcast to each bank thereof, or in the case of the alternate parallelization embodiment to broadcast a copy of the input tile to each of multiple data PMUs, e.g., similar to the manner described with respect to FIG. 19. Although not shown in FIG. 12 or 16, a block similar to the tile_load block 2128 may be included in the SRDAP 1200/1600 to load the input image into the img_in block 1208.

Figure 22:
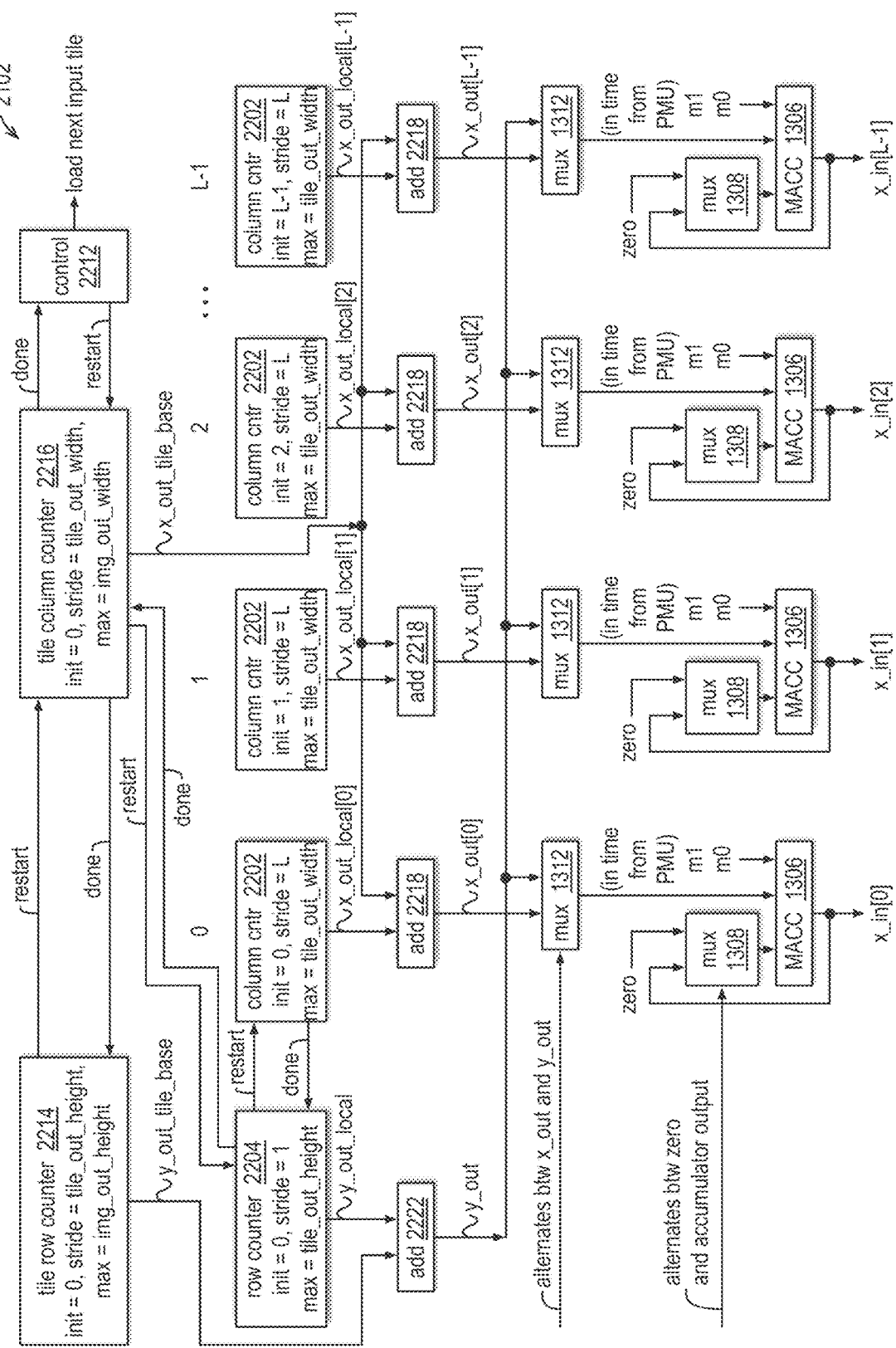
FIG. 22 is an example block diagram illustrating the calc_coord_global_x_in block of FIG. 21.

FIG. 22 is an example block diagram illustrating the calc_coord_global_x_in block 2102 of FIG. 21 in accordance with embodiments of the present disclosure. The calc_coord_global_x_in block 2102 includes a tile row counter 2214, a tile column counter 2212, a row counter 2204, a control block 2212, an add block 2222, and a vector pipeline (e.g., 1022 of FIG. 10) of L PCU lanes denoted 0 through L−1. The tile row counter 2214 outputs a y_out_tile_base value, and the tile column counter 2212 outputs an x_out_tile base value. The (x_out_tile_base, y_out_tile_base) are the coordinates of the base pixel of the current output tile among the output tiles into which the output image is subdivided. The (x_out_tile_base, y_out_tile_base) are global coordinates, i.e., they are relative to the base (or origin) pixel of the output image.

Each PCU lane includes a column counter 2202, a functional unit (e.g., FU 1004 of FIG. 10) statically reconfigured to perform an addition operation shown as add 2218, a first 2-input mux 1312, a second 2-input mux 1308, and a functional unit (e.g., FU 1004 of FIG. 10) statically reconfigured to perform a multiply-accumulate (MACC) operation shown as MACC 1306. The L PCU lanes together generate the x_in vectors of FIG. 21, i.e., the vectors of the input pixel x-coordinates. As stated in FIG. 22, the calc_coord_global_y_in block 2104 of FIG. 21 comprises a set of one or more PCUs 1000 similar to those of the calc_coord_global_x_in block 2102, but that receive the second row of the transform matrix (e.g., elements m2 and m3) in time into the MACCs 1306, rather than the first row, and that calculate the y_in vectors of FIG. 21, i.e., vectors of y-coordinates of input pixels, rather than the x_in vectors. In an embodiment, one or more of the counters (e.g., tile row counter 2214, tile column counter 2216) may be statically reconfigured within a switch 403 rather than a PCU.

The L PCU lanes operate together in parallel to, along with the row counter 2204, iterate over the coordinates of each output pixel of the current output tile and transform each output pixel coordinate into an input pixel coordinate, or more specifically into the x-coordinate of an input pixel. The tile column counter 2212 and tile row counter 2214 operate together to iterate over the output image to generate the coordinates of a base pixel of each output tile into which the output image is subdivided; whereas the row counter 2204 and column counters 2202 (described below) collectively iterate over the current output tile to generate the local coordinates of each output pixel of the current output tile. That is, the four counters 2214/2212/2204/2202 embody four nested loops. The tile row counter 2214 embodies a first and outermost loop that iterates over the y-coordinate of the output image by a stride of the output tile x-dimension length to generate the x-coordinate of output tile base pixels. The tile column counter 2212 embodies a second loop that iterates over the x-coordinate of the output image by a stride of the output tile y-dimension length to generate the y-coordinate of output tile base pixels. The row counter 2204 embodies a third loop that iterates over the local y-coordinate of the current output tile. The column counter 2202 embodies the fourth and innermost loop that iterates over the local x-coordinate of the current output tile.

The row counter 2204 is statically reconfigured with an initial value of zero, a stride of one, and a maximum value of the tile_out_height, which is the height of an output tile. The add block 2222 adds the output of the row counter 2204, y_out_local, and the y_out_tile_base to generate a y_out value. The row counter 2204, using its statically reconfigured values, iterates over the y-dimension of the output tile to, along with the add block 2222, generate a y_out value that is provided as one of the two inputs to each of the L first muxes 1312. The y_out value is the global output pixel y-coordinate, i.e., relative to the output image rather than relative to the output tile. The y_out value provided to a given first mux 1312, being the y-coordinate of a given output pixel, is referred to as y_out[j]. The term y_out is also used to refer to the L-vector comprising the output of the add block 2222, y_out, that is provided to each of the L first muxes 1312. Each of the y_out[j] values within a given y_out vector is the same, being generated by the add block 2222 on a given clock cycle and provided to each of the first muxes 1312.

Each column counter 2202 is statically reconfigured with an initial value equal to its lane, i.e., 0 for lane 0, 1 for lane 1, and so forth to L−1 for lane L−1. Each column counter 2202 is statically reconfigured with a stride value of L and a maximum value of tile_out_width, which is the width of an output tile. The column counters 2202 are statically reconfigured to autonomously increment every other clock cycle once started. The column counters 2202, using their statically reconfigured values, collectively iterate over the x-dimension of the output tile to generate an output, x_out_local[j], that is added to the x_out_tile_base by the add block 2218 to produce the sum that is the global x-coordinate x_out[j] of each output pixel of the output tile. In FIG. 22, the x_out[j] output by the add block 2218 of lanes 0 through L−1 are shown as x_out[0], x_out[1], x_out[2] through x_out[L−1] that are provided as the other of the two inputs to each of the first muxes 1312 and that are referred to collectively as a vector x_out.

The control block 2212 is statically reconfigured to control the muxes 1312 to alternate between selecting the x_out and y_out inputs and to control the muxes 1308 to alternate between selecting a zero value on one input and the output of the MACC 1306 on the other input. The output of the MACC 1306 is x_in[j], i.e., the global x-coordinate, within the x_in vector, of an individual input pixel. When the column counter 2202 reaches its maximum value, i.e., when the column counter 1302 has iterated tile_out_width divided by L times, the column counter 2202 generates a done signal to the row counter 2204. In response, the row counter 2204 increments its count, causing the y_out value to be incremented, and generates a restart signal to the column counters 2202, in response to which the column counters 2202 iterate again over the x-coordinate values of the output tile. Thus, the tile row counter 2214, the tile column counter 2212, the row counter 2204, the column counters 2202, the add block 2222, and the add blocks 2218 are statically reconfigured to operate together to generate each of the tile_out_width by tile_out_height possible output pixel (x, y) coordinates of the output tile and to provide the output pixel coordinates as vectors over time to the muxes 1312.

The MACC 1306 receives the output of mux 1308 and the output of mux 1312. The MACC 1306 also receives in-time in an alternating fashion the elements of the transform matrix, i.e., m0 and m1. Thus, over two consecutive clock cycles, the MACC 1306 multiplies its respective x_out[j] value by m0 and accumulates a first product with zero into the accumulator, then multiplies y_out[j] by m1 and accumulates a second product with the first product into the accumulator to produce x_in[j]=m0*x_out[j]+m1*y_out[j]. That is, over the two consecutive clock cycles, the MACC 1306 performs a dot-product of the first row of the transform matrix (m0, m1) and the output pixel coordinates (x_out[j], y_out[j]) to calculate the input pixel x-coordinate x_in[j]. In this manner, every other clock cycle, the calc_coord_global_x_in block 2102 produces a vector x_in of the x-co-ordinate of L input pixels transformed from L output pixel coordinates (x_out, y_out) similar to the manner described above with respect to the example of FIG. 14. As explained above, every other clock cycle in parallel with the generation of an x_in by calc_coord_global_x_in block 2102, the calc_coord_global_y_in block 2104 produces a vector y_in of the y-coordinate of L input pixels transformed from L output pixel coordinates (x_out, y_out). Thus, the calc_coord_global_x_in block 2102 and the calc_coord_global_y_in block 2104 each internally generate a vector of L output pixel coordinates (x_out, y_out) and together transform the L output pixel coordinates (x_out, y_out) into a vector of L input pixel coordinates (x_in, y_in) at a throughput of one every other clock cycle. More specifically, the calc_coord_global_x_in block 2102 and calc_coord_global_y_in block 2104 are statically reconfigured to generate a series of M x_in and y_in vectors, respectively, where M is tile_out_width*tile_out_height/L. In an embodiment, the elements of the transform matrix are provided in-time to the calc_coord_global_x_in block 2102 and to the calc_coord_global_y_in block 2104 from PMUs 1100.

The tile column counter 2212 is statically reconfigured with an initial value of zero, a stride of the tile_out_width, and a maximum value of img_out_width. The tile column counter 2212, using its statically reconfigured values, iterates over the x-dimension of the output image by the tile_out_width to generate the x_out_tile_base value for each of the output tiles into which the output image is subdivided.

The tile row counter 2214 is statically reconfigured with an initial value of zero, a stride of the tile_out_height, and a maximum value of img_out_height. The tile row counter 2214, using its statically reconfigured values, iterates over the y-dimension of the output image by the tile_out_height to generate the y_out_tile_base value for each of the output tiles into which the output image is subdivided.

When the row counter 2204 reaches its maximum value, i.e., when the row counter 2204 has iterated tile_out_height times, the row counter 2204 generates a done signal to the tile column counter 2212. In response, the tile column counter 2212 increments its count, causing the x_out_file_base value to be incremented by the tile_out_width. Further in response, if the tile column counter 2212 has reached its maximum value, i.e., when the tile column counter 2212 has iterated img_out_width/tile_out_width times, the tile column counter 2212 generates a done signal to the tile row counter 2214, and in response the tile row counter 2214 increments its count, causing the y_out_tile_base value to be incremented by the tile_out_height, and the tile row counter 2214 generates a restart signal back to the tile column counter 2212. Still further in response, the tile column counter 2212 signals to other elements of the SRDAP (e.g., AGCU) to load the next input tile, e.g., into the tile_in_PMU 2422 of FIG. 24 of the of the tile_in block 2108 of FIG. 21. Once the next input tile has been loaded, the tile column counter 2212 generates a restart signal back to the row counter 2204, and the row counter 2204 generates a restart signal back to the column counters 2202, in response to which the column counters 2202 iterate again over the x-coordinate values of the output tile. Thus, the tile row counter 2214, the tile column counter 2212, the row counter 2204, the column counters 2202, the add block 2222, and the add blocks 2218 are statically reconfigured to operate together to generate each of the img_out_width by img_out_height possible output pixel (x, y) coordinates and to provide the output pixel coordinates as vectors over time to the muxes 1312, and the muxes 1308 and MACCs 1306 are statically reconfigured to transform the vectors of output pixel coordinates into the vectors of x-coordinates of input pixels x_in.

Figure 23:
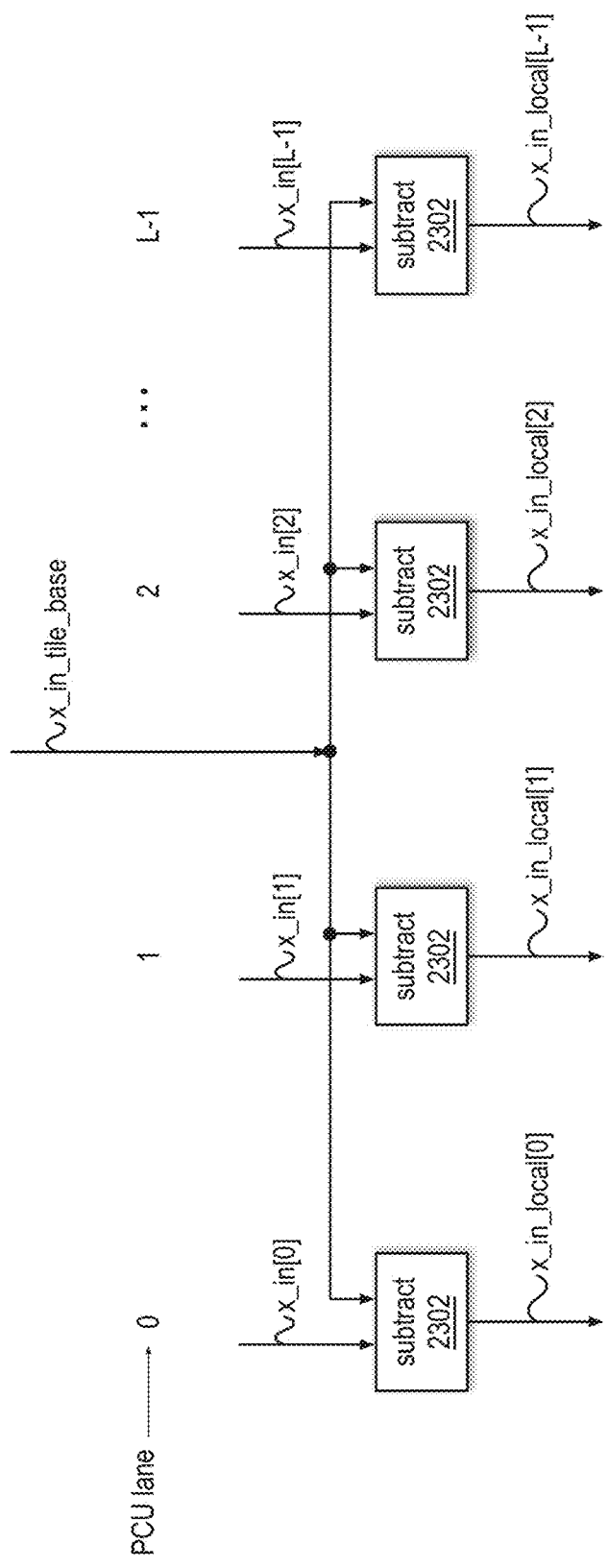
FIG. 23 is an example block diagram illustrating the calc_coord_local_x_in block of FIG. 21.

FIG. 23 is an example block diagram illustrating the calc_coord_local_x_in block 2103 of FIG. 21 in accordance with embodiments of the present disclosure. The calc_coord_local_x_in block 2103 includes a vector pipeline (e.g., 1022 of FIG. 10) of L PCU lanes denoted 0 through L−1. The L PCU lanes operate together in parallel to receive the x_in_file_base from the calc_x_in_tile_base block 2122 and the x_in vectors from the calc_coord_global_x_in block 2102 and to calculate the x_in_local vectors of FIG. 21. In an embodiment, the L PCU lanes comprise a set of one or more spatially statically reconfigured PCUs 1000, i.e., statically reconfigured to operate in parallel. Each PCU lane includes a functional unit (e.g., FU 1004 of FIG. 10) statically reconfigured to perform a subtraction operation shown as subtract block 2302. Each subtract block 2302 subtracts the x_in_file_base from the global x-coordinate of an input pixel x_in[j] to produce a difference x_in_local[j], which is the local x-coordinate of the input pixel. The L subtract blocks 2302 of L PCU lanes operate together in parallel to generate the x_in_local vectors. In an embodiment, the subtract blocks 2302 of FIG. 23 may comprise functional units of an additional stage of the one or more spatially statically reconfigured PCUs of the calc_coord_global_x_in block 2102 of FIG. 22. As stated in FIG. 23, the calc_coord_local_y_in block 2105 of FIG. 21 comprises a set of one or more PCUs 1000 similar to those of the calc_coord_local_x_in block 2103, but that calculate y_in_local vectors using the y_in vectors and the y_in_tile_base.

Figure 24:
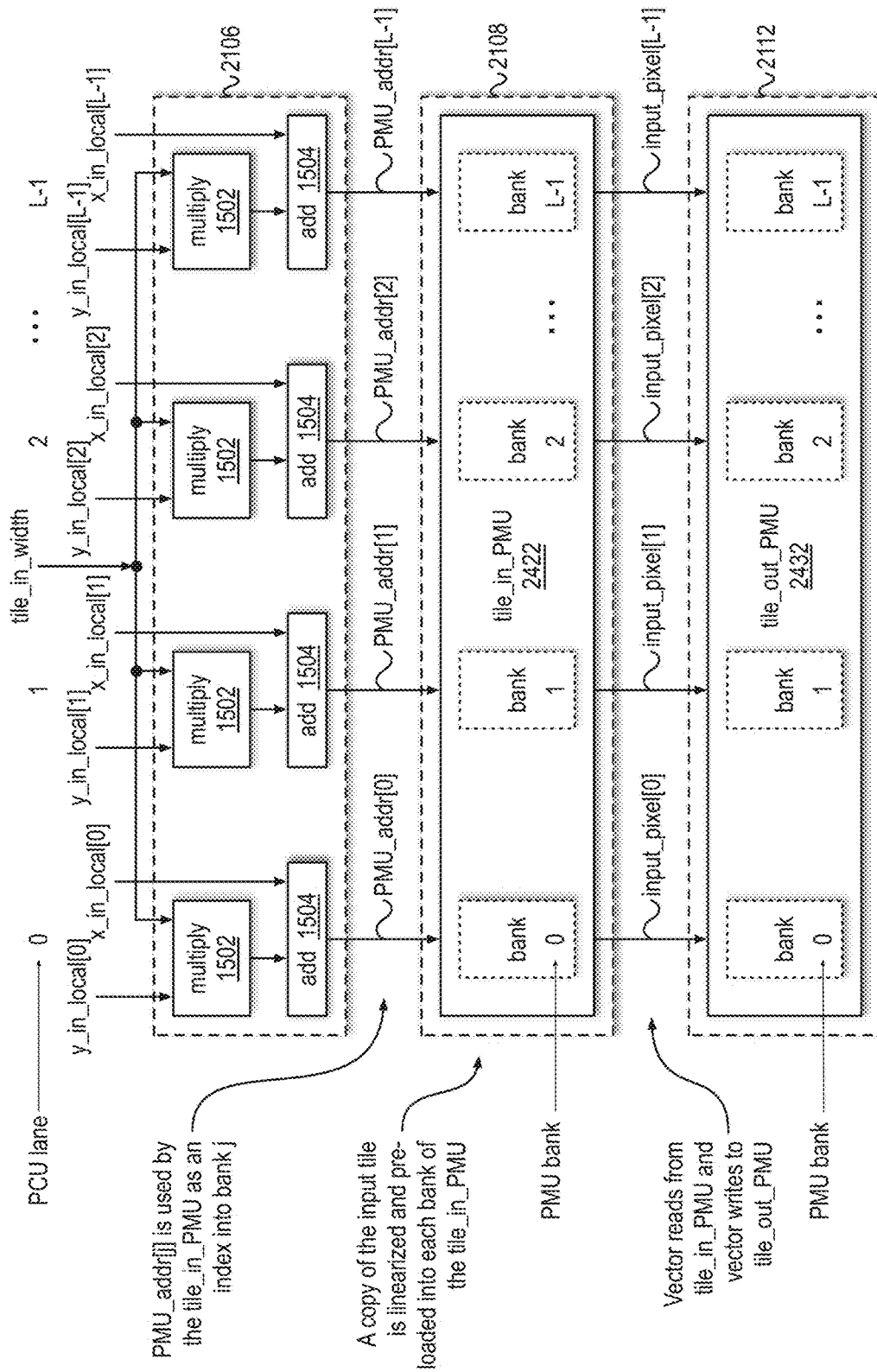
FIG. 24 is an example block diagram illustrating the calc_PMU_addr_tile block, the tile_in block, and the tile_out block of FIG. 21.

FIG. 24 is an example block diagram illustrating the calc_PMU_addr_tile block 2106, the tile_in block 2108, and the tile_out block 2112 of FIG. 21 in accordance with embodiments of the present disclosure. The calc_PMU_addr_tile block 2106 comprises L lanes of a statically reconfigured PCU 1000 shown in the upper portion of FIG. 24. In an embodiment, the L PCU lanes comprise a set of one or more spatially statically reconfigured PCUs 1000. The calc_PMU_addr_file block 2106 of FIG. 21 is similar in many respects to the calc_PMU_addr block 1206 of FIG. 13 and like-numbered elements are similar, however differences are described below. The tile_in block 2108 comprises a tile_in_PMU 2422 shown in the middle portion of FIG. 24 as L banks corresponding to the L PCU lanes. In an embodiment, the L tile_in_PMU banks comprise a set of one or more spatially statically reconfigured PMUs 1100. The tile_out block 2112 comprises a tile_out_PMU 2432 shown in the bottom portion of FIG. 24 as L banks corresponding to the L PCU lanes. In an embodiment, the L tile_out_PMU banks comprise a set of one or more spatially statically reconfigured PMUs 1100.

Each lane of the L lanes includes a functional unit (e.g., FU 1004 of FIG. 10) statically reconfigured as a multiply block 1502 and a FU statically reconfigured as an add block 1504. The L lanes correspond to the L lanes of the calc_coord_local_x_in block 2103 and the calc_coord_local_y_in block 2105. More specifically, one input of the multiply block 1502 of each lane receives a local input pixel y-coordinate y_in_local[j] generated by the corresponding lane of the calc_coord_local_y_in block 2105, and one input of the add block 1504 of each lane receives local input pixel x-coordinate x_in[j] generated by the corresponding lane of the calc_coord_local_x_in block 2103. The other input of the multiply block 1502 receives the tile_in_width. The other input of the add block 1504 receives the output of the multiply block 1502, i.e., the product of the tile_in_width and y_in_local[j]. Thus, the vector pipeline (e.g., 1022 of FIG. 10) of multiply blocks 1502 and add blocks 1504 generates an L-vector PMU_addr=y_in_local*tile_in_width+x_in_local, which is a vector of flattened addresses generated from the vector of local input pixel coordinates (x_in_local, y_in_local) generated by the calc_coord_local_x_in block 2103 and the calc_coord_local_y_in block 2105. More specifically, the calc_PMU_addr_tile block 2106 is statically reconfigured to generate a series of M PMU_addr L-vectors, where M is tile_out_width*tile_out_height/L.

As indicated in FIG. 24, a copy of the input image is linearized and pre-loaded into each bank of the tile_in_PMU 2422 prior to commencement of reads of input pixels from the tile_in_PMU 2422, e.g., operating according to the second access mode as described above with respect to FIG. 11 and/or in response to the tile column counter 2212 signaling for the load of the input tile as described above with respect to FIG. 22. As further indicated in FIG. 24, each PMU_addr[j] received by the tile_in_PMU 2422 is used as an index in a corresponding bank j such that a different input pixel of the input tile may be read from each bank in parallel. That is, the tile_in_PMU 2422 operates in the third access mode as described above with respect to FIG. 11. As each PMU_addr vector of the series of M PMU_addr vectors is received into the tile_in_PMU 2422 (e.g., into FIFO 1106 of FIG. 11), the vector of banks 1122 is accessed with the PMU_addr vector to read out an input_pixel vector, shown in FIG. 24 as individual input pixels input_pixel[0], input_pixel[1], input_pixel[2], through input_pixel[L−1] provided by corresponding banks of the L banks. In this manner, a series of M input_pixel vectors is read out of the tile_in_PMU 2422.

As each input_pixel vector of the series of M input_pixel vectors is received into the tile_out_PMU 2432 (e.g., into FIFO 1106 of FIG. 11), the input_pixel vector is written to the vector of banks 1122 of the tile_out_PMU 2432 in the row specified by the statically reconfigured counter 1114. That is, according to operation of the first write form of the first access mode as described above with respect to FIG. 11, the series of M input_pixel vectors become a series of M vectors of output pixels written to the tile_out_PMU 2432 such that the output tile is formed in the tile_out_PMU 2432. Once the output tile is formed in the tile_out_PMU 2432, the tile_out_PMU 2432 signals to other elements of the SRDAP (e.g., AGCU) to store the current output tile, e.g., to host memory 190.

Figure 25:
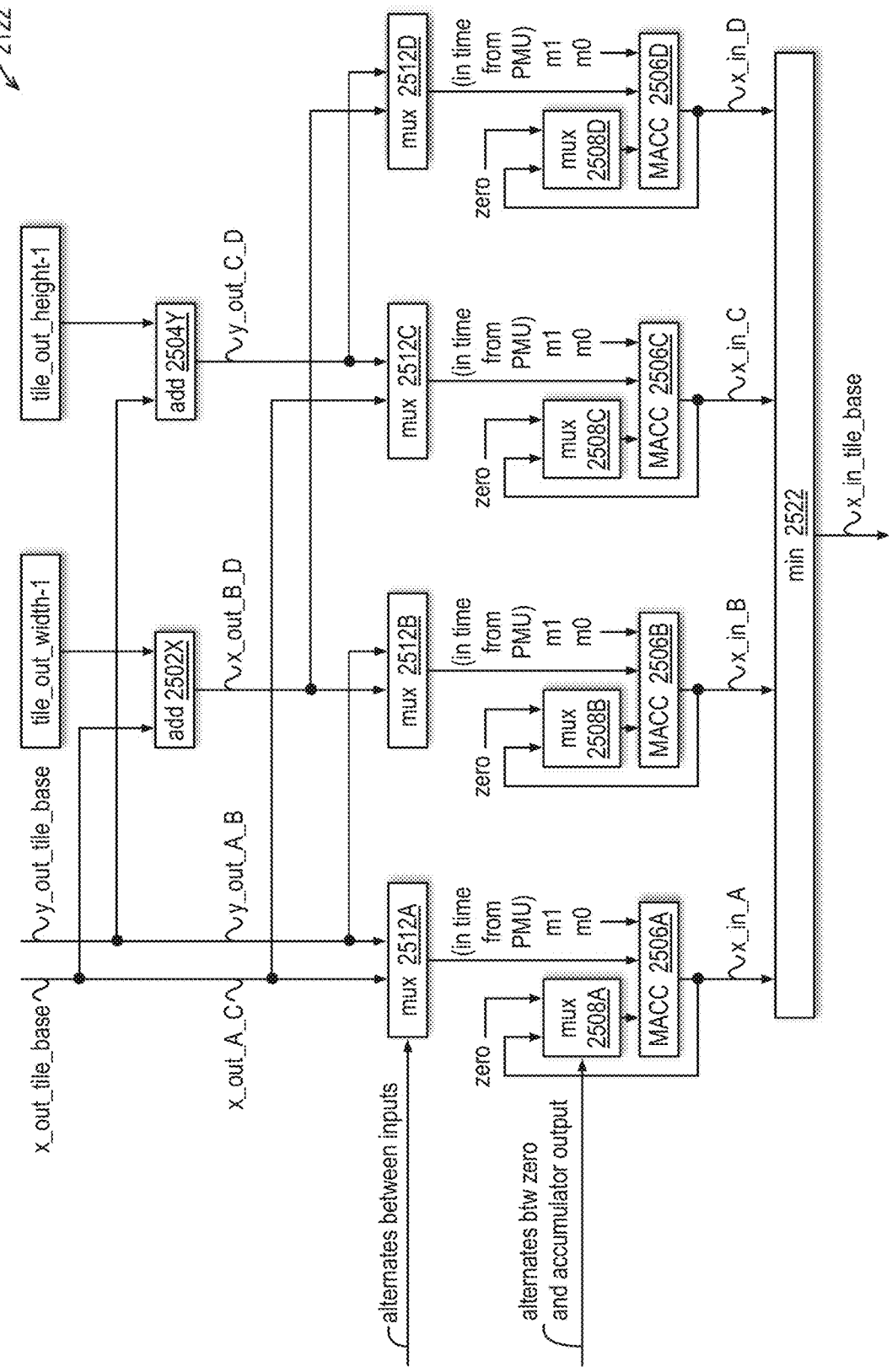
FIG. 25 is an example block diagram illustrating the calc_x_in_tile_base block of FIG. 21.

FIG. 25 is an example block diagram illustrating the calc_x_in_tile_base block 2122 of FIG. 21 in accordance with embodiments of the present disclosure. The calc_x_in_tile_base block 2122 includes statically reconfigured PCU elements comprising two add blocks 2502X and 2502Y, four muxes 2508A, 2508B, 2508C and 2508D, four muxes 2512A, 2512B, 2512C and 2512D, four MACCs 2506A, 2506B, 2506C and 2506D, and a min block 2522. The calc_x_in_file_base block 2122 generates the x_in_file_base and the calc_y_in_tile_base block 2124 generates the y_in_tile_base generally as follows with reference to the four output pixels at the corners of the output tile as pixels A, B, C, and D.

The calc_x_in_tile_base block 2122 applies the transformation matrix to the (x, y) coordinates of each of the pixels A, B, C, and D to generate an x-coordinate for each of input pixel corresponding to output pixels A, B, C, and D. In parallel, the calc_y_in_tile_base block 2124 applies the transformation matrix to the (x, y) coordinates of each of the pixels A, B, C, and D to generate a y-coordinate for each of input pixel corresponding to output pixels A, B, C, and D. The transformed input pixels may be referred to as pixels A', B', C', and D'. The coordinates of the input pixels A', B', C', and D' may then be used to determine the coordinates of a base pixel of a bounding rectangle, which is the input tile, that surrounds the transformed output tile. More specifically, the calc_x_in_file_base block 2122 then takes the smallest of the x-coordinates of input pixels A', B', C', and D' as the x-coordinate of the input tile, i.e., x_in_tile_base, and the calc_y_in_tile_base block 2124 then takes the smallest of the y-coordinates of input pixels A', B', C', and D' as the y-coordinate of the input tile, i.e., y_in_tile_base.

The calc_x_in_tile_base block 2122 receives the x_out_tile_base (also referred to in FIG. 25 as x_out_A_C) from the calc_coord_global_x_in block 2102 of FIG. 21 and receives the y_out_tile_base (also referred to in FIG. 25 as y_out_A_B) from the calc_coord_global_y_in block 2104 of FIG. 21. Add block 2502X adds the x_out_file_base and a constant value (e.g., statically reconfigured into a register of the PCU) that is one less than the tile_out_width to produce a sum referred to as x_out_B_D. Add block 2502Y adds the y_out_tile_base and a constant value (e.g., statically reconfigured into a register of the PCU) that is one less than the tile_out_height to produce a sum referred to as y_out_C_D.

Mux 2512A receives x_out_A_C and y_out_A_B and alternates between selecting the two inputs. Thus, on a first clock cycle mux 2512A outputs the x-coordinate of pixel A and on a second clock cycle outputs the y-coordinate of pixel A. Mux 2512B receives x_out_B_D and y_out_A_B and alternates between selecting the two inputs. Thus, on the first clock cycle mux 2512B outputs the x-coordinate of pixel B and on the second clock cycle outputs the y-coordinate of pixel B. Mux 2512C receives x_out_A_C and y_out_C_D and alternates between selecting the two inputs. Thus, on the first clock cycle mux 2512C outputs the x-coordinate of pixel C and on the second clock cycle outputs the y-coordinate of pixel C. Mux 2512D receives x_out_B_D and y_out_C_D and alternates between selecting the two inputs. Thus, on the first clock cycle mux 2512D outputs the x-coordinate of pixel D and on the second clock cycle outputs the y-coordinate of pixel D.

Each of the four muxes 2508 and the four MACC 2506, along with the four muxes 2512, operate similar to the manner described above with respect to each mux 1312, mux 1308 and MACC 1306 of FIG. 13 to perform a dot product of the first row of the transformation matrix and the respective (x, y) coordinates of pixels A, B, C, and D to produce the respective x-coordinates of pixels A, B, C, and D, referred to in FIG. 25 as x_in_A, x_in_B, x_in_C, and x_in_D, respectively. The min block 2522 takes the minimum of x_in_A, x_in_B, x_in_C, and x_in_D which it provides as x_in_tile_base. As stated in FIG. 25, the calc_y_in_tile_base block 2124 of FIG. 21 includes similar statically reconfigured PCU elements to those of the calc_x_in_tile_base block 2122 that calculate the y_in_tile_base of FIG. 21 using the second row of the transform matrix (e.g., elements m2 and m3) rather than the first row. In an embodiment, the calc_x_in_file_base block 2122 and calc_y_in_tile_base block 2124 generate a new x_in_file_base and y_in_tile_base after the x_out_tile_base and y_out_tile_base, if necessary, have been updated and in response to the signal from the tile column counter 2212 of FIG. 22 to load the next input tile.

As described above, the input tile base pixel coordinates (x_in_tile_base, y_in_tile_base) may be dynamically calculated, i.e., prior to the loading of each input tile, by the calc_x_in_tile_base block 2122 and calc_y_in_tile_base block 2124, whereas the N dimension lengths of the input tile may be determined a priori. However, in an alternate embodiment, the N dimension lengths of the input tile may be dynamically determined, e.g., by taking the difference of the smallest and largest x/y values of the four transformed output tile corner pixel A', B', C', and D' coordinates, which may have the benefit of reducing the size of the input tile and therefore the time associated with loading each input tile.

Figure 26:
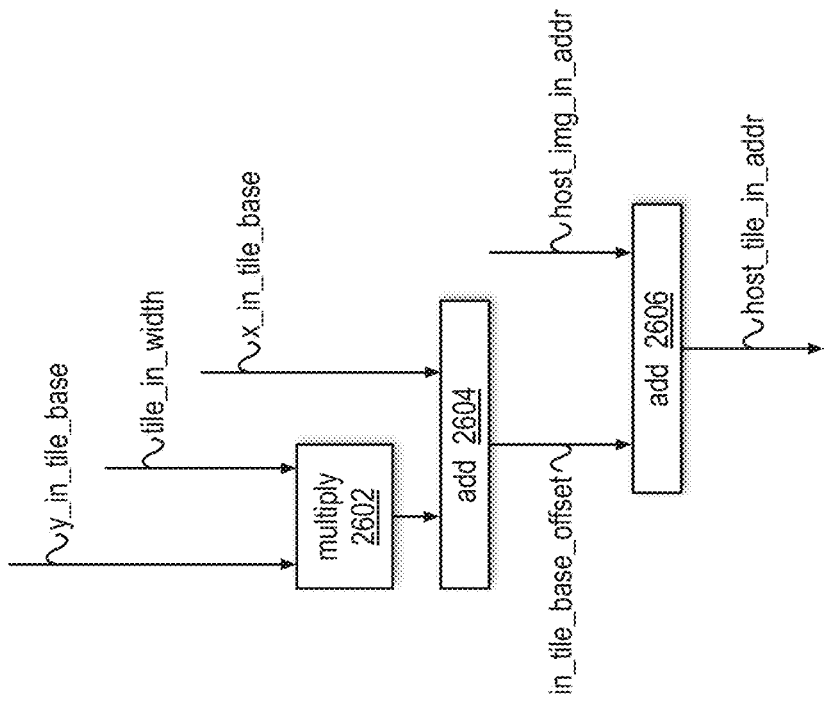
FIG. 26 is an example block diagram illustrating the calc_tile_host_addr block of FIG. 21.

FIG. 26 is an example block diagram illustrating the calc_tile_host_addr block 2126 of FIG. 21 in accordance with embodiments of the present disclosure. The calc_tile_host_addr block 2126 includes statically reconfigured PCU elements comprising a multiply block 2602, a first add block 2604, and a second add block 2606. The multiply block 2602 multiplies the y_in_tile_base by the tile_in_width and adds the product to the x_in_tile_base to generate in_tile_base_offset, which is a linear offset within the input image of the base pixel of the current input tile. The add block 2606 adds the in_tile_base_offset and a host img_in_addr to the generate the host_tile_in_addr. The host img_in_addr is the base address of the input image in host memory 190. The host_tile_in_addr is an address in host memory 190 of the current input tile that is provided to the tile_load block 2128 for loading the current input tile. In an embodiment, the statically reconfigured functional units of FIG. 26 may comprise functional units of the statically reconfigured PCUs of the calc_x_in_tile_base block 2122 of FIG. 25.

Although embodiments of a SRDAP statically reconfigured to perform an affine transform on an input image to produce an output image in a tiled manner have been described that employ the first parallelization embodiment described with respect to FIG. 15, other tiling SRDAP embodiments employ the alternate parallelization embodiment described with respect to FIGS. 19 and 20. Furthermore, although embodiments of a SRDAP statically reconfigured to perform a 2-D affine transform on an input image to produce an output image in a tiled manner have been described, other SRDAP embodiments are statically reconfigured to perform an N-D affine transform on an input image to produce an output image in a tiled manner. The terms input/output image used herein may also be understood to refer to an input/output tile unless otherwise indicated by the context.

Furthermore, although embodiments of a SRDAP 2100 statically reconfigured to perform a 2-D affine transform on a 2-D input image to produce a 2-D output image in a tiled manner have been described, the static reconfigurability of the SRDAP 2100 may be extended to higher dimension (N) affine transforms on corresponding higher dimension (N-D) input tile to produce corresponding higher dimension (N-D) output tiles, where N is 2, 3, 4 or greater. For example, the N different input tile base pixel coordinate calculation blocks may be statically reconfigured to perform their calculations with reference to output pixels at 2^N corners of the current output tile.

Features and characteristics of the embodiments of the SRDAP and its static reconfigurability to perform an N-dimensional affine transform described herein may provide various advantages over the performing of an N-dimensional affine transform by conventional general-purpose processors, e.g., CPUs or GPUs. Advantageously, the described embodiments may provide higher throughput of input to output image affine transformation than a conventional CPU/GPU because, for example, the PCUs are spatially mapped to concurrently perform the affine transform of all the N coordinates of an output pixel to the coordinates of an input pixel. That is, the PCUs and the PMUs and the switches of the SRDAP are statically reconfigured such that N different groups of PCUs perform the dot-product computations for all the N coordinates associated with the N dimensions of a given pixel in parallel, rather than in a serial fashion.

Furthermore, the static reconfigurability of the SRDAP enables the computations to be performed without various overheads associated with a conventional CPU/GPU. For example, a conventional CPU/GPU fetches instructions (e.g., from an instruction cache or, in the case of a miss in the instruction cache, from a higher-level cache or system memory) and consequently incurs instruction fetching overhead and possible instruction starvation by the execution units. In contrast, the static reconfigurability of the SRDAP means that the SRDAP does fetch instructions and advantageously does not incur instruction fetch overhead.

For another example of overheads not incurred by the SRDAP, the instructions of the instruction stream fetched by a conventional CPU/GPU have implicit data dependencies. That is, the result produced by execution of an older instruction in program order is written to a general-purpose register (GPR) of the CPU/GPU, and the CPU/GPU must decode the instruction stream to detect that a newer instruction in program order consumes the result of the older instruction as a source operand and wait to issue the newer instruction for execution until the source operand is available in the GPR (or available on a bypass bus). In contrast, the SRDAP does not have a GPR and does not incur processing overhead associated with scheduling execution of instructions due to implicit instruction operand dependencies. Furthermore, the dynamic scheduling of the instructions for issuance by a conventional CPU/GPU to the execution units may result in non-deterministic execution times, unlike embodiment of the SRDAP.

For yet another example of overheads not incurred by the SRDAP, a conventional CPU/GPU incurs control flow overhead associated with mis-predicted branch instructions, i.e., flush of instructions fetched down the wrong path and restart of the pipeline at the correct path. In contrast, the SRDAP does not execute branch instructions and therefore does not incur the overhead associated with mis-predicted branch instructions.

In exchange for the higher throughput and reduced overheads with which the SRDAP performs the affine transform of the input image to produce the output image, when the SRDAP is needed to perform a different task, the SRDAP must be statically reconfigured again before the data associated with the different task is allowed to flow through the SRDAP. In this sense, the SRDAP may be considered less general purpose than a conventional CPU/GPU. Stated alternatively, the overheads and lower throughput experienced by a conventional CPU/GPU may make it more general purpose, i.e., may enable the programmer to map more problems to a conventional CPU/GPU, whereas the statically reconfigurability of the SRDAP may have a more limited set of problems that may be mapped to it. For example, because the SRDAP does not execute branch instructions, the dataflow program is not able to choose what the next instruction is, since there are no instructions executed by the SRDAP. However, the present inventors have advantageously mapped the N-D image affine transformation to the SRDAP hardware to enjoy a speedup thereof.

Another advantage of embodiments described is that the same SRDAP hardware may be statically reconfigured to perform both neural network processing as well as the pre-processing needed to train the neural network.

As may be observed from the descriptions of the embodiments, the SRDAP may be employed to increase the population of samples available to train a neural network, e.g., to increase the prediction accuracy of the neural network. Advantageously, the embodiments described may be used to reduce the time required to enlarge the sample population. Further advantageously, embodiments described may reduce bandwidth needed between the host and the SRDAP by transferring a single copy of the image that is augmented with multiple transforms. Still further, the SRDAP may be advantageously employed to perform real-time pre-processing in latency-sensitive applications such as online inference (e.g., in which images are streamed over a network in real-time) in which data augmentation cannot be batched offline before training.

Although in some embodiments the term "image" may refer to a visual image having pixel elements that indicate color intensity, etc., the term image should be understood to refer to source data other than a visual image, and the term "pixel" should be understood to refer to an element of source data other than an element of a visual image.

Although embodiments have been described in which the source data is an image (e.g., a 2-D or 3-D image), other embodiments are contemplated in which the source data is something different than an image. For example, assume a neural network is being trained to make financial decisions, and the inputs to the neural network are numerous conditions and factors related to markets. In such a system it may be advantageous to slightly modify the samples via an affine transformation matrix to increase the number of samples available to train the network.

As mentioned above, although embodiments have been described in which the transform matrix is a square matrix, other embodiments are contemplated in which the transform matrix includes an additional column, e.g., a translation vector, and the output pixel coordinate vector includes an additional row, whose element value is unity, to facilitate an affine transform that includes a translation. The SRDAP may be statically reconfigured to perform such an operation.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods and does not intend to limit the technology to the specifically disclosed implementations and methods. The technology may be practiced using other features, elements, methods, and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a CGRA system, a System-on-Chip (SoC), or application-specific integrated circuit (ASIC). Implementations may be as a single chip, or as a multi-chip module (MCM) that packages multiple semiconductor dies in a single package. All such variations and modifications are to be considered within the ambit of the present disclosed technology the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more SRDAPs to execute a high-level program. Furthermore, one or more implementations of the technology or elements thereof can be implemented in the form of an apparatus including a memory and at least one processor that is coupled to the memory and operative to perform exemplary method steps, and/or an SRDAP that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope as set forth. Therefore, many modifications may be made to adapt a particular situation or material to the essential scope of the technology disclosed.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:
1. A statically reconfigurable dataflow architecture processor (SRDAP) to perform an N-dimensional affine transform specified by a matrix on an N-dimensional input image to produce an N-dimensional output image comprising output pixels, each output pixel having a coordinate in each of the N dimensions, wherein N is at least two, comprising:
   statically reconfigurable pattern compute units (PCUs) and pattern memory units (PMUs) interconnected by statically reconfigurable switches;
   wherein each PCU comprises a vector pipeline of functional units statically reconfigurable to perform one or more of a set of arithmetic and logical operations on operands received from a previous pipeline stage of the PCU, from another PCU, and/or from one or more of the PMUs;
   wherein each PMU comprises a memory, wherein one or more of the PMUs is loadable with the input image; and
   wherein the PCUs and PMUs are statically reconfigurable to, for all the output pixels:
   apply the affine transform matrix to vectors of the output pixel coordinates to calculate corresponding vectors of coordinates of input pixels of the input image;
   calculate, using the vectors of input pixel coordinates, corresponding vectors of PMU addresses of the input pixels;
   read values of the input pixels from the one or more PMUs at the calculated input pixel addresses; and write vectors of the input pixel values to one or more PMUs to form the output image.

2. The SRDAP of Clause 1, further comprising:
configuration stores loadable with configuration data to statically reconfigure the SRDAP.

3. The SRDAP of Clause 2,
wherein to statically reconfigure the SRDAP comprises loading the configuration stores with the configuration data prior to initiation of production of the output image without re-loading the configuration stores with the configuration data until completion of production of the output image.

4. The SRDAP of Clause 1,
wherein the affine transform matrix comprises N rows corresponding to the N dimensions;
wherein the switches are statically reconfigurable to spatially map at least a portion of the PCUs into N groups corresponding to the N dimensions; and
wherein to apply the affine transform matrix to the vectors of the output pixel coordinates to calculate the corresponding vectors of the coordinates of the input pixels of the input image, concurrently for each coordinate J of the N dimensions:
each PCU group J of the corresponding N PCU groups is statically reconfigurable to perform a dot product of a row J of the N rows and the vectors of the output pixel coordinates to calculate the corresponding vectors of the coordinate J of the input pixels.

5. The SRDAP of Clause 4, wherein to perform the dot product of the row J of the N rows and the vectors of the output pixel coordinates to calculate the corresponding vectors of the coordinate J of the input pixels, the PCU group J is statically reconfigurable to:
in time, for each element K of row J:
multiply the element K with a corresponding coordinate K of the output pixel coordinates to calculate a product; and
accumulate the product.

6. The SRDAP of Clause 1, further comprising:
wherein the PCUs comprise counters statically reconfigurable to iterate over each of the corresponding N dimensions to generate the output pixel coordinates.

7. The SRDAP of Clause 6,
wherein the vector pipeline of the PCUs that are statically reconfigurable to apply the affine transform matrix comprises a vector of lanes of the functional units; and
wherein each lane comprises an inner dimension counter of the counters statically reconfigurable to iterate over a coordinate of the output pixel associated with an inner dimension of the N dimensions.

8. The SRDAP of Clause 7,
wherein the inner dimension counter of each lane is statically reconfigurable with a different initial value of the coordinate of the output pixel associated with the inner dimension.

9. The SRDAP of Clause 7,
wherein each inner dimension counter is statically reconfigurable with a maximum value of the coordinate of the output pixel associated with the inner dimension based on a size of the inner dimension of the output image.

10. The SRDAP of Clause 7,
wherein each inner dimension counter is statically reconfigurable with a stride value of the coordinate of the output pixel associated with the inner dimension based on a number of the PCU lanes.

11. The SRDAP of Clause 7,
wherein the counters comprise N−1 outer dimension counters associated with the N−1 outer dimensions;
wherein for each outer dimension counter J of the N−1 outer dimension counters, the outer dimension counter J iterates over a coordinate J of the output pixel associated with the outer dimension J; and
wherein each PCU lane is further statically reconfigurable to receive a count of each of the N−1 outer dimension counters.

12. The SRDAP of Clause 11,
wherein each outer dimension counter is incremented when the dimension counter associated with the next most inner dimension of the N dimensions increments to a maximum value based on a size of the next most inner dimension of the output image.

13. The SRDAP of Clause 7,
wherein the memory of the one or more PMUs from which the values of the input pixels are read comprises a vector of banks corresponding to the vector of PCU lanes.

14. The SRDAP of Clause 7,
wherein the inner dimension counters count autonomously during performance of the N-dimensional affine transform without incurring processing overhead associated with scheduling execution of instructions due to implicit instruction operand dependencies.

15. The SRDAP of Clause 1,
wherein the vector pipeline further comprises staging registers intermediate the functional units; and
wherein the PCUs are statically reconfigurable to have first staging registers receive the input pixel coordinates generated by first functional units and to have the first staging registers provide the input pixel coordinates as source operands to second functional units to calculate the PMU addresses of the input pixels.

16. The SRDAP of Clause 15,
wherein the static reconfigurability of the SRDAP enables the SRDAP to perform the N-dimensional affine transform on the input image to produce the N-dimensional output image without incurring processing overhead associated with scheduling execution of instructions due to implicit instruction operand dependencies.

17. The SRDAP of Clause 1,
wherein the static reconfigurability of the SRDAP enables the SRDAP to perform the N-dimensional affine transform on the input image to produce the N-dimensional output image without incurring processing overhead associated with fetching instructions.

18. A computer-implemented method for performing an N-dimensional affine transform specified by a matrix on an N-dimensional input image to produce an N-dimensional output image comprising output pixels, each output pixel having a coordinate in each of the N dimensions, wherein N is at least two, comprising:
statically reconfiguring a statically reconfigurable dataflow architecture processor (SRDAP) that comprises pattern compute units (PCUs) and pattern memory units (PMUs) interconnected by statically reconfigurable switches, wherein each PCU comprises a vector pipeline of functional units statically reconfigurable to perform one or more of a set of arithmetic and logical operations on operands received from a previous pipeline stage of the PCU, from another PCU, and/or from one or more of the PMUs, and wherein each PMU comprises a memory, wherein one or more of the PMUs is loadable with the input image; and for all the output pixels:
applying the affine transform matrix to vectors of the output pixel coordinates to calculate corresponding vectors of coordinates of input pixels of the input image;
calculating, using the vectors of input pixel coordinates, corresponding vectors of PMU addresses of the input pixels;
reading values of the input pixels from the one or more PMUs at the calculated input pixel addresses; and
writing vectors of the input pixel values to one or more PMUs to form the output image.

19. The method of Clause 18, further comprising:
wherein said statically reconfiguring the SRDAP comprises loading configuration stores of the SRDAP with configuration data.

20. The method of Clause 19,
wherein said statically reconfiguring the SRDAP comprises loading the configuration stores with the configuration data prior to initiation of production of the output image without re-loading the configuration stores with the configuration data until completion of production of the output image.

21. The method of Clause 18,
wherein the affine transform matrix comprises N rows corresponding to the N dimensions;
wherein the switches are statically reconfigurable to spatially map at least a portion of the PCUs into N groups corresponding to the N dimensions; and
wherein said applying the affine transform matrix to the vectors of the output pixel coordinates to calculate the corresponding vectors of the coordinates of the input pixels of the input image comprises, concurrently for each coordinate J of the N dimensions:
performing, by each PCU group J of the corresponding N PCU groups, a dot product of a row J of the N rows and the vectors of the output pixel coordinates to calculate the corresponding vectors of the coordinate J of the input pixels.

22. The method of Clause 21,
wherein said performing the dot product of the row J of the N rows and the vectors of the output pixel coordinates to calculate the corresponding vectors of the coordinate J of the input pixels comprises:
in time, for each element K of row J:
multiplying, by the PCU group J, the element K with a corresponding coordinate K of the output pixel coordinates to calculate a product; and
accumulating, by the PCU group J, the product.

23. The method of Clause 18, further comprising:
iterating, by counters of the PCUs, over each of the corresponding N dimensions to generate the output pixel coordinates.

24. The method of Clause 23, further comprising:
wherein the vector pipeline of the PCUs that are statically reconfigurable to apply the affine transform matrix comprises a vector of lanes of the functional units; and
iterating, by an inner dimension counter of each lane, over a coordinate of the output pixel associated with an inner dimension of the N dimensions.

25. The method of Clause 24, further comprising:
statically reconfiguring the inner dimension counter of each lane with a different initial value of the coordinate of the output pixel associated with the inner dimension.

26. The method of Clause 24, further comprising:
statically reconfiguring the inner dimension counter with a maximum value of the coordinate of the output pixel associated with the inner dimension based on a size of the inner dimension of the output image.

27. The method of Clause 24, further comprising:
statically reconfiguring the inner dimension counter with a stride value of the coordinate of the output pixel associated with the inner dimension based on a number of the PCU lanes.

28. The method of Clause 24, further comprising:
wherein the counters comprise N−1 outer dimension counters associated with the N−1 outer dimensions;
iterating, by each outer dimension counter J of the N−1 outer dimension counters, over a coordinate J of the output pixel associated with the outer dimension J; and
receiving, by each PCU lane, a count of each of the N−1 outer dimension counters.

29. The method of Clause 28, further comprising:
incrementing each outer dimension counter when the dimension counter associated with the next most inner dimension of the N dimensions increments to a maximum value based on a size of the next most inner dimension of the output image.

30. The method of Clause 24,
wherein the memory of the one or more PMUs from which the values of the input pixels are read comprises a vector of banks corresponding to the vector of PCU lanes.

31. The method of Clause 24, further comprising:
counting, by the inner dimension counters, autonomously during performance of the N-dimensional affine transform without incurring processing overhead associated with scheduling execution of instructions due to implicit instruction operand dependencies.

32. The method of Clause 18, further comprising:
wherein the vector pipeline further comprises staging registers intermediate the functional units; and
receiving, by first staging registers of the PCUs, the input pixel coordinates generated by first functional units and providing, by the first staging registers, the input pixel coordinates as source operands to second functional units to calculate the PMU addresses of the input pixels.

33. The method of Clause 32,
wherein the static reconfigurability of the SRDAP enables the SRDAP to perform the N-dimensional affine transform on the input image to produce the N-dimensional output image without incurring processing overhead associated with scheduling execution of instructions due to implicit instruction operand dependencies.

34. The method of Clause 18,
wherein the static reconfigurability of the SRDAP enables the SRDAP to perform the N-dimensional affine transform on the input image to produce the N-dimensional output image without incurring processing overhead associated with fetching instructions.

35. A non-transitory computer-readable storage medium having computer program instructions stored thereon that are capable of causing or configuring a statically reconfigurable dataflow architecture processor (SRDAP) to perform an N-dimensional affine transform specified by a matrix on an N-dimensional input image to produce an N-dimensional output image comprising output pixels, each output pixel having a coordinate in each of the N dimensions, wherein N is at least two, comprising:
statically reconfigurable pattern compute units (PCUs) and pattern memory units (PMUs) interconnected by statically reconfigurable switches;
wherein each PCU comprises a vector pipeline of functional units statically reconfigurable to perform one or more of a set of arithmetic and logical operations on operands received from a previous pipeline stage of the PCU, from another PCU, and/or from one or more of the PMUs;
wherein each PMU comprises a memory, wherein one or more of the PMUs is loadable with the input image; and
wherein the PCUs and PMUs are statically reconfigurable to, for all the output pixels:
apply the affine transform matrix to vectors of the output pixel coordinates to calculate corresponding vectors of coordinates of input pixels of the input image;
calculate, using the vectors of input pixel coordinates, corresponding vectors of PMU addresses of the input pixels;
read values of the input pixels from the one or more PMUs at the calculated input pixel addresses; and
write vectors of the input pixel values to one or more PMUs to form the output image.

The invention claimed is:

1. A computer-implemented method for performing an N-dimensional affine transform on an N-dimensional input image to produce an N-dimensional output image comprising output pixels using a statically reconfigurable dataflow architecture processor (SRDAP) that comprises pattern compute units (PCUs) and pattern memory units (PMUs) interconnected by statically reconfigurable switches, wherein each PCU comprises a vector pipeline of functional units statically reconfigurable to perform one or more of a set of arithmetic and logical operations on operands received from a previous pipeline stage of the PCU, from another PCU, and/or from one or more of the PMUs, and wherein each PMU comprises a memory, the affine transform specified by an affine transform matrix comprising N rows corresponding to the N dimensions, each output pixel of the output image having a coordinate in each of the N dimensions, wherein N is an integer having a value of at least two, the method comprising:
statically reconfiguring the switches to spatially map at least a portion of the PCUs into N groups corresponding to the N dimensions;
applying the affine transform matrix to vectors of the coordinates of the output pixels to calculate corresponding vectors of coordinates of input pixels of the input image concurrently for each coordinate J of the N dimensions by statically reconfiguring each PCU group J of the corresponding N PCU groups to perform a dot product of a row J of the N rows and the vectors of the coordinates of the output pixel to calculate the corresponding vectors of the coordinate J of the input pixels;
calculating, using the vectors of input pixel coordinates, corresponding vectors of PMU addresses of the input pixels;
reading values of the input pixels from one or more PMUs at the calculated input pixel addresses; and
writing vectors of the input pixel values to one or more PMUs to form the output image.

2. The method of claim 1, wherein said statically reconfiguring the SRDAP comprises loading configuration stores of the SRDAP with configuration data.

3. The method of claim 2, wherein the vector pipeline further comprises staging registers intermediate the functional units, the method further comprising:
statically reconfiguring the PCUs to have first staging registers receive the input pixel coordinates generated by first functional units and to have the first staging registers provide the input pixel coordinates as source operands to second functional units to calculate the PMU addresses of the input pixels.

4. The method of claim 2, wherein the static reconfigurability of the SRDAP enables the SRDAP to perform the N-dimensional affine transform on the input image to produce the N-dimensional output image without incurring processing overhead associated with scheduling execution of instructions due to implicit instruction operand dependencies.

5. The method of claim 2, wherein the static reconfigurability of the SRDAP enables the SRDAP to perform the N-dimensional affine transform on the input image to produce the N-dimensional output image without incurring processing overhead associated with fetching instructions.

6. The method of claim 2, wherein the memory of the one or more PMUs storing the input image comprises a vector of banks corresponding to the vector of PCU lanes.

7. The method of claim 1, wherein said statically reconfiguring the SRDAP comprises loading configuration stores of the SRDAP with configuration data prior to initiation of production of the output image without re-loading the configuration stores until completion of production of the output image.

8. The method of claim 1, wherein said performance of the dot product of the row J of the N rows and the vectors of the coordinates of the output pixel to calculate the corresponding vectors of the coordinate J of the input pixels comprises statically reconfiguring the PCU group J to, in time, for each element K of row J:
multiply the element K with a corresponding coordinate K of the coordinates of the output pixel to calculate a product; and
accumulate the product.

9. A non-transitory computer-readable storage medium having computer program instructions stored thereon for configuring a statically reconfigurable dataflow architecture processor (SRDAP) that comprises pattern compute units (PCUs) and pattern memory units (PMUs) interconnected by statically reconfigurable switches, wherein each PCU comprises a vector pipeline of functional units statically reconfigurable to perform one or more of a set of arithmetic and logical operations on operands received from a previous pipeline stage of the PCU, from another PCU, and/or from one or more of the PMUs, and wherein each PMU comprises a memory, the instructions capable of causing the SRDAP to perform an N-dimensional affine transform specified by an affine transform matrix on an N-dimensional input image to produce an N-dimensional output image comprising output pixels, each output pixel having a coordinate in each of the N dimensions, wherein N is an integer having a value of at least two, by:

statically reconfiguring the switches to spatially map at least a portion of the PCUs into N groups corresponding to the N dimensions; and applying the affine transform matrix to vectors of the coordinates of the output pixels to calculate corresponding vectors of coordinates of input pixels of the input image concurrently for each coordinate J of the N dimensions by statically reconfiguring each PCU group J of the corresponding N PCU groups to perform a dot product of a row J of the N rows and the vectors of the coordinates of the output pixel to calculate the corresponding vectors of the coordinate J of the input pixels;

calculating, using the vectors of input pixel coordinates, corresponding vectors of PMU addresses of the input pixels;

reading values of the input pixels from one or more PMUs at the calculated input pixel addresses; and writing vectors of the input pixel values to one or more PMUs to form the output image.

10. A computer-implemented method for performing an N-dimensional affine transform on an N-dimensional input image to produce an N-dimensional output image comprising output pixels using a statically reconfigurable dataflow architecture processor (SRDAP) that comprises pattern compute units (PCUs) and pattern memory units (PMUs) interconnected by statically reconfigurable switches, the affine transform specified by an affine transform matrix comprising N rows corresponding to the N dimensions, each output pixel of the output image having a coordinate in each of the N dimensions, wherein each PCU comprises counters statically reconfigurable to iterate over each of the corresponding N dimensions to generate the coordinates of the output pixels and a vector pipeline of functional units statically reconfigurable to perform one or more of a set of arithmetic and logical operations on operands received from a previous pipeline stage of the PCU, from another PCU, and/or from one or more of the PMUs, and wherein each PMU comprises a memory, wherein N is an integer having a value of at least two, the method comprising:

statically reconfiguring an inner dimension counter of the counters for each lane of the vector of lanes in at least some of the PCUs to iterate over a coordinate of the output pixel associated with an inner dimension of the N dimensions; and for all the output pixels:
applying the affine transform matrix to vectors of the coordinates of the output pixel to calculate corresponding vectors of coordinates of input pixels of the input image;

calculating, using the vectors of input pixel coordinates, corresponding vectors of PMU addresses of the input pixels;

reading values of the input pixels from the one or more PMUs at the calculated input pixel addresses; and writing vectors of the input pixel values to one or more PMUs to form the output image.

11. The method of claim 10, wherein the inner dimension counter of each lane is statically reconfigurable with a different initial value of the coordinate of the output pixel associated with the inner dimension.

12. The method of claim 10, wherein each inner dimension counter is statically reconfigurable with a maximum value of the coordinate of the output pixel associated with the inner dimension based on a size of the inner dimension of the output image.

13. The method of claim 10, wherein each inner dimension counter is statically reconfigurable with a stride value of the coordinate of the output pixel associated with the inner dimension based on a number of the PCU lanes.

14. The method of claim 10, wherein the counters comprise N−1 outer dimension counters associated with the N−1 outer dimensions and for each outer dimension counter J of the N−1 outer dimension counters, the outer dimension counter J iterates over a coordinate J of the output pixel associated with the outer dimension J;

the method further comprising statically reconfiguring each PCU lane of the vector of lanes to receive a count of each of the N−1 outer dimension counters.

15. The method of claim 14, wherein each outer dimension counter is incremented when the dimension counter associated with a next most inner dimension of the N dimensions increments to a maximum value based on a size of the next most inner dimension of the output image.

16. The method of claim 10, wherein the memory of the one or more PMUs from which the values of the input pixels are read comprises a vector of banks corresponding to the vector of PCU lanes.

17. The method of claim 10, wherein the inner dimension counters count autonomously during performance of the N-dimensional affine transform without incurring processing overhead associated with scheduling execution of instructions due to implicit instruction operand dependencies.

18. The method of claim 10, wherein said statically reconfiguring the SRDAP comprises loading configuration stores of the SRDAP with configuration data.

19. The method of claim 10, wherein said statically reconfiguring the SRDAP comprises loading configuration stores of the SRDAP with configuration data prior to initiation of production of the output image without re-loading the configuration stores until completion of production of the output image.

* * * * *